United States Patent [19]
Isoyama et al.

[11] Patent Number: 6,093,503
[45] Date of Patent: *Jul. 25, 2000

[54] NON-AQUEOUS ELECTROLYTE LITHIUM SECONDARY CELL

[75] Inventors: Hirofumi Isoyama, Nagoya; Hisanao Kojima, Kariya; Satoru Suzuki, Nagoya; Jun Hasegawa, Hekinan, all of Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,474

[22] Filed: Sep. 4, 1997

Related U.S. Application Data

[60] Continuation of application No. 08/487,322, Jun. 7, 1995, abandoned, which is a division of application No. 08/386,363, Feb. 9, 1995, Pat. No. 5,494,762, which is a continuation of application No. 08/114,226, Sep. 1, 1993, abandoned.

[30] Foreign Application Priority Data

Sep. 1, 1992 [JP] Japan .................................. 4-233841
Dec. 15, 1992 [JP] Japan .................................. 4-334673

[51] Int. Cl.⁷ .................................................. H01M 2/00
[52] U.S. Cl. .............................. 429/61; 429/64; 429/90; 429/62; 429/48; 429/121; 429/231.95
[58] Field of Search ............................... 429/7, 8, 61, 64, 429/90, 48, 231.1, 231.95, 121, 122, 62

[56] References Cited

U.S. PATENT DOCUMENTS

| | | |
|---|---|---|
| 4,056,885 | 11/1977 | Rao . |
| 4,239,840 | 12/1980 | Puri ........................................ 429/159 |
| 4,269,905 | 5/1981 | Wedlake ..................................... 429/8 |
| 4,668,595 | 5/1987 | Yoshino et al. . |
| 5,028,500 | 7/1991 | Fong . |
| 5,154,990 | 10/1992 | Yoshino et al. . |
| 5,238,760 | 8/1993 | Takahashi et al. . |
| 5,284,721 | 2/1994 | Beard . |
| 5,344,726 | 9/1994 | Tanaka . |
| 5,352,538 | 10/1994 | Fujimoto et al. . |
| 5,352,545 | 10/1994 | Furukawa et al. ........................ 429/57 |
| 5,401,598 | 3/1995 | Miyabayashi et al. . |

FOREIGN PATENT DOCUMENTS

| | | |
|---|---|---|
| 53-75434 | 7/1978 | Japan . |
| 62-35832 | 2/1987 | Japan . |
| 62-90863 | 4/1987 | Japan . |
| 63-178449 | 7/1988 | Japan . |
| 63-222072 | 9/1988 | Japan . |
| 63-226019 | 9/1988 | Japan . |
| 2-139860 | 5/1990 | Japan . |
| 2-139861 | 5/1990 | Japan . |
| 2-172163 | 7/1990 | Japan . |
| 2-183963 | 7/1990 | Japan . |
| 3-196467 | 8/1991 | Japan . |
| 4-6072 | 2/1992 | Japan . |
| 4-171677 | 6/1992 | Japan . |
| 4-328244 | 11/1992 | Japan . |
| 4-328245 | 11/1992 | Japan . |
| 4-359862 | 12/1992 | Japan . |
| 4-368778 | 12/1992 | Japan . |
| 4-370662 | 12/1992 | Japan . |
| 5-101818 | 4/1993 | Japan . |
| 4-6072 | 12/1993 | Japan . |

OTHER PUBLICATIONS

M.M. Thackeray, et al, "Lithoum Insertion into Manganese Spinels", Mat. Res. Bull, vol. 18 pp. 461–472, 1983 Pergamon Press Ltd. No month.

Primary Examiner—Maria Nuzzolillo
Assistant Examiner—J. O'Malley
Attorney, Agent, or Firm—Pillsbury Madison & Sutro LLP

[57] ABSTRACT

A device for protecting a cell is described comprising a cell body arranged in a container which has opening and closing means to open and close the cell body from the exterior atmosphere of the container. The device also has a sensor for sensing an impact to the cell body. When the impact is above a predetermined value, a barrier fluid is sprayed into the interior of the container. The opening and closing means of the container is operated in response to the spraying of the barrier fluid.

16 Claims, 35 Drawing Sheets

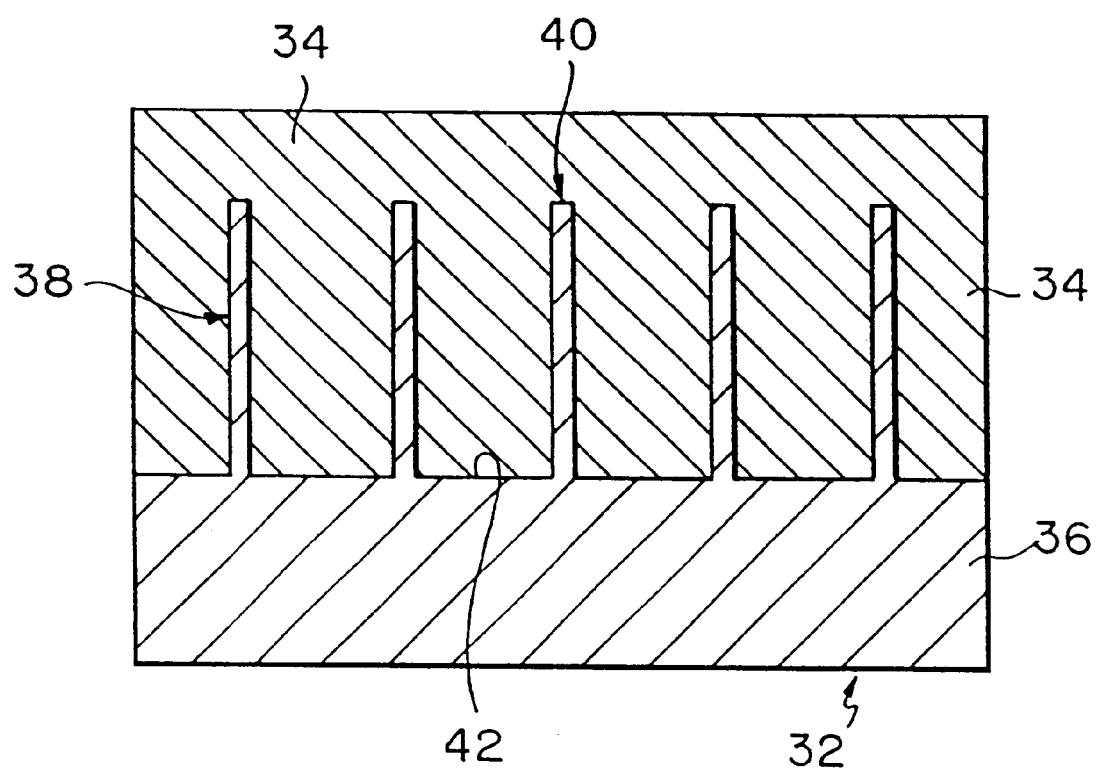

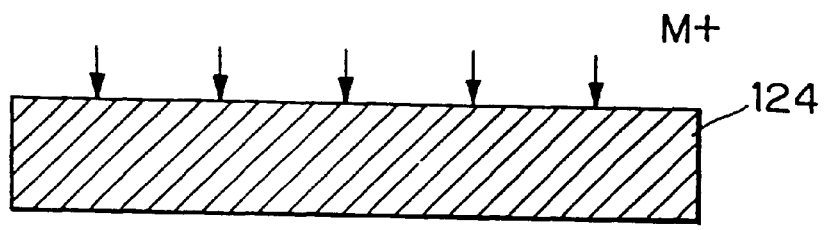
Fig. 33A
ION IMPLANTATION
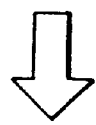
Fig. 33B
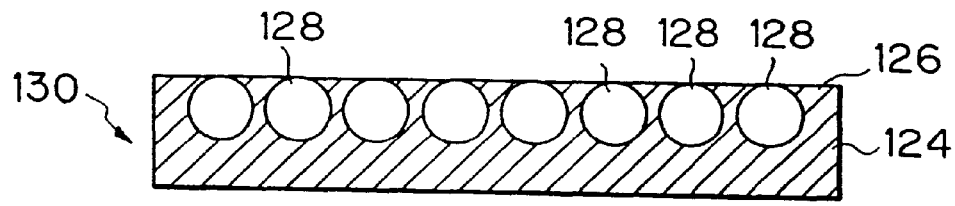
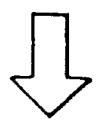
Fig. 33C
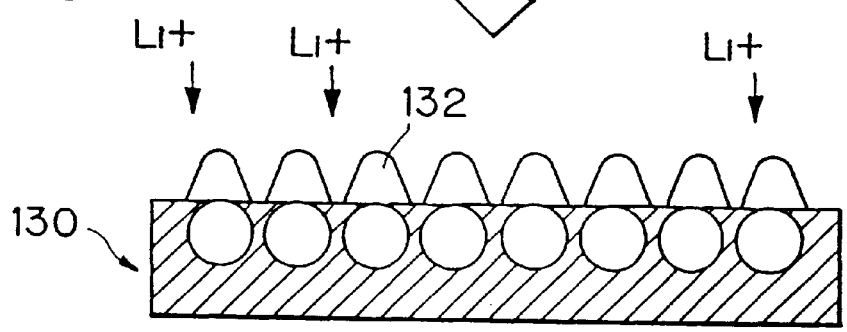
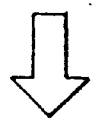
Fig. 33D
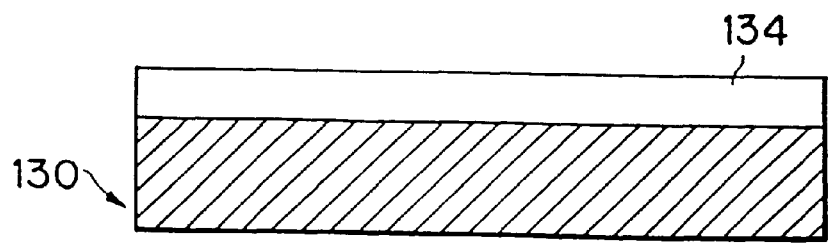

Fig. 36A
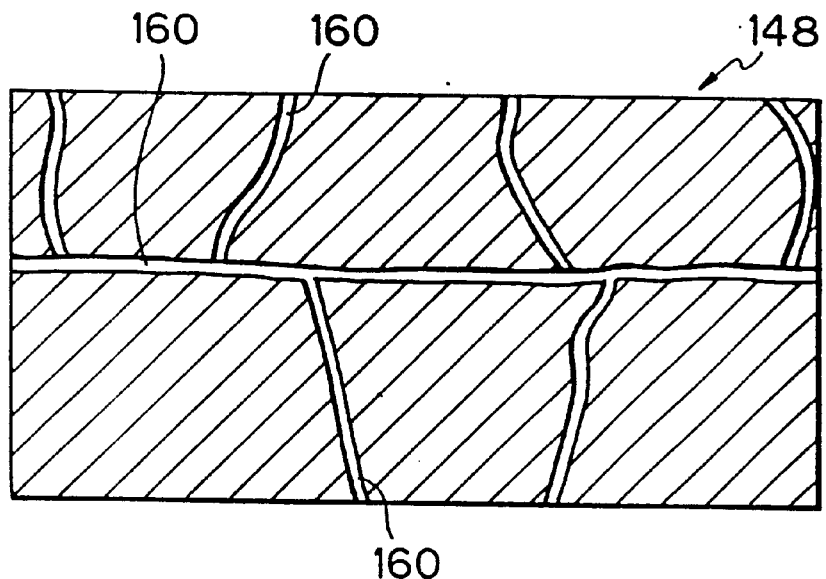
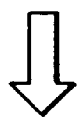
Fig. 36B
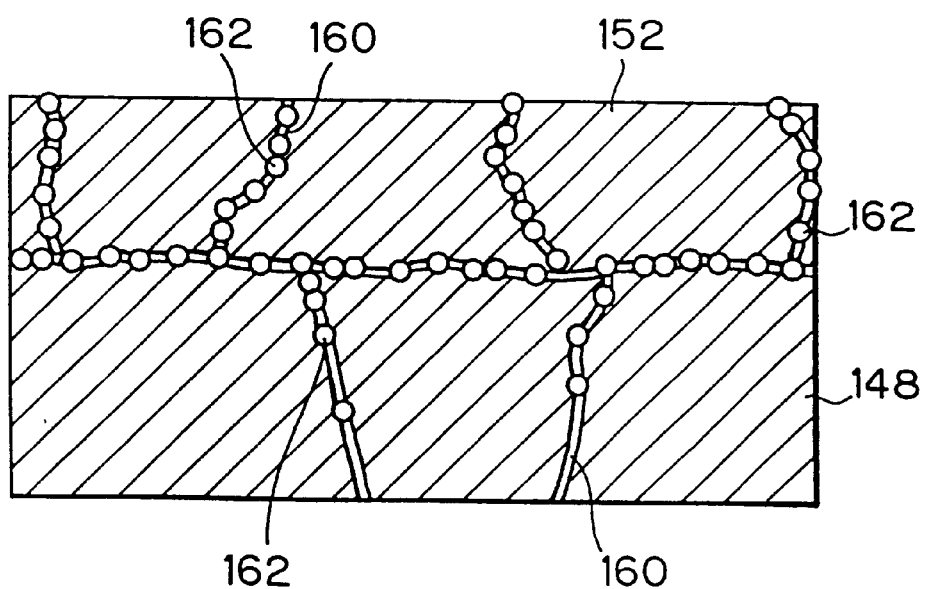

NON-AQUEOUS ELECTROLYTE LITHIUM SECONDARY CELL

This application is a continuation of application Ser. No. 08/487,322, filed Jun. 7, 1995, now abandoned, which was a division of application Ser. No. 08/386,363, filed Feb. 9, 1995, now U.S. Pat. No. 5,494,762, which was a continuation of application Ser. No. 08/114,226, filed Sep. 1, 1993, now abandoned.

BACKGROUND OF THE INVENTION

1. Field of the Invention

The present invention relates to a nonaqueous electrolyte secondary cell, to a lithium secondary cell capable of offering a high discharge energy density in the discharging of a high current.

2. Description of Related Art

A lithium metal, which exhibits the basest potential and the highest energy density per unit weight, has attracted attention as a negative active material in secondary cell systems directed toward an increase in energy density. On the other hand, a lithium-containing metal oxide capable of providing a high energy density, such as $LiMn_2O_4$, particularly a compound having a spinel structure, has attracted attention as an active material in a positive electrode as opposed to the negative electrode. Such a lithium secondary cell is reported, for example, in Japanese Unexamined Patent Publication (Kokai) No. 2-139860.

As described in Japanese Unexamined Patent Publication (Kokai) No. 62-90863, carbon materials too are used as the negative active material in the above-described cells. The carbon materials can serve to prevent the occurrence of dendrites and provide cells that are safe and excellent in cycle life.

The above-described lithium secondary cells, however, could not yet exhibit satisfactory discharge and charge characteristics.

An object of the present invention is to solve the above-described problems and provide a secondary cell with a nonaqueous electrolyte that can offer a high discharge energy density in the discharging of a high current.

SUMMARY OF THE INVENTION

In order to attain the above-described object, the present invention improves the positive electrode, negative electrode, separator and charging method of a lithium secondary cell with a nonaqueous electrolyte and, at the same time, proposes safety measures of the cell.

(1) A metallic compound capable of occluding or releasing lithium and having an acicular microstructure is used as the positive active material (first aspect).

(2) The positive electrode comprises a conductive substrate and, provided on the conductive substrate, a positive active material comprising a lithium-containing metal oxide crystal grown into such a columnar form that the axis is inclined at the angle $0° \leq \theta < 90°$ (wherein θ represents the angle of inclination of the axis) to the normal direction of the surface of the substrate (second aspect).

(3) The positive electrode comprises a conductive substrate and a positive active material layer provided on the surface of the conductive substrate, the positive active material layer comprising a $LiMn_2O_4$ crystal in a single crystal form at least in the direction of thickness of the layer from the surface of the substrate (third aspect).

(4) The positive electrode comprises a collector core and a positive active material covering the surface of the collector core, the collector core comprising a collector material selected from the group consisting of a metal, a carbon fiber and a graphite fiber and having a surface provided with a collector protrusion protruded into the positive active material (fourth aspect).

(5) The positive electrode comprises a collector core and a positive active material covering the surface of the collector core, the collector core comprising a collector material selected from the group consisting of a metal, a carbon fiber and a graphite fiber, the positive active material containing a conductive chip (fifth aspect).

(6) The positive active material comprises a metallic compound powder capable of occluding or releasing lithium, comprising a single crystal or an aggregate of a plurality of single crystals and having a particle diameter in the range of from 1 to 20 μm with the single crystal having a grain diameter in the range of from 0.1 to 20 μm (sixth aspect).

(7) The positive active material comprises a metallic compound powder capable of occluding or releasing lithium and comprising a Li—Cu—Mn—O-based lithium compound having a Cu to Mn molar ratio of 0.2 or less (seventh aspect).

(8) The positive active material comprises a metallic compound powder capable of occluding or releasing lithium, comprising an aggregate of polycrystal grains and containing an ultrafine powder, said ultrafine powder being present within the grains and/or at grain boundaries (eighth aspect).

(9) The negative electrode wherein at least the surface portion of the lithium secondary cell comprises metallic lithium constituting a matrix and a metallic element other than lithium or a cluster of the metallic element dispersed and held in the matrix and exposed on the surface of the negative electrode (ninth aspect).

(10) The negative electrode wherein at least the surface portion of the lithium secondary cell comprises a lithium alloy or a metal other than lithium, the surface of the negative electrode being uneven and having recesses and protrusions each having an average width of 10 μm or less (tenth aspect).

(11) The negative electrode comprises metallic lithium and having on its surface a lithium ion conductive layer comprising any one of a solid electrolyte, an amorphous layer, a fine grain layer and a dissimilar element diffused layer (eleventh aspect).

(12) A secondary cell with a nonaqueous electrolyte, comprising an electrode and an electrolyte, characterized in that the electrode comprises a sinter produced by mixing a carbon material with a thermosetting resin, heating the mixture to completely cure the thermosetting resin and sintering the cured product (twelfth aspect).

(13) The secondary cell with a nonaqueous electrolyte is provided with a separator comprising a hydrophilic material or a material subjected to a hydrophilization treatment (thirteenth aspect).

(14) A constant-voltage pulse charging method for a metallic lithium secondary cell, comprising charging a metallic lithium secondary cell while turning a constant voltage on and off, characterized in that the off period is prolonged when the cell is in a low voltage state, and shortened with an increase in the voltage of the cell (fourteenth aspect).

(15) A lithium secondary cell characterized by comprising:

a cell body comprising a cell container and, held in the cell container, a negative electrode using lithium or a lithium alloy as a negative active material, a positive electrode and an electrolyte interposed between said negative electrode and the positive electrode;

a sensor for sensing a predetermined impact force or a higher impact force; and a barrier spray means for spraying a barrier fluid within or around the cell body upon being instructed by said sensor (fifteenth aspect).

These aspects may be used alone or in combination.

BRIEF DESCRIPTION OF THE DRAWINGS

FIG. 13 is a cross-sectional view of a positive electrode in Example 11;

FIGS. 33A to 33D are conceptual diagrams of a lithium deposit layer of a negative electrode for a lithium secondary cell in Example 28;

FIGS. 36A and 36B are explanatory views showing the formation of a dissimilar element diffused layer in Example 34;

DETAILED DESCRIPTION OF THE PREFERRED EMBODIMENTS

Figure 1:
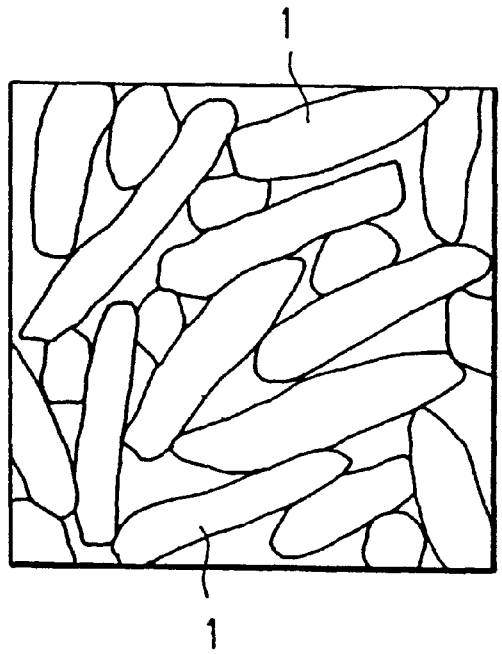
FIG. 1 is an explanatory view of a microstructure of a metallic compound produced in Example 1.

With respect to each aspect of the present invention, preferred embodiments, function and effect and examples thereof will now be described in detail. Constructions of the secondary cell with a nonaqueous electrolyte other than those specified in each aspect of the present invention are known in the art or disclosed in the other aspects of the present invention. A conventional general construction of the second cell with a nonaqueous electrolyte will now be briefly described.

The positive electrode material include carbon materials, metal oxide materials and conductive polymer materials. Preferably, it comprises a metallic compound capable of occluding or releasing lithium.

Examples of the material capable of occluding or releasing lithium include metallic compounds containing lithium, such as $LiMn_2O_4$, $Li_xMnO_2$, $Li_2Mn_3O_4$, $LiCoO_2$, $LiNiO_2$, $LiFeO_2$ and $LiV_3O_8$, and metallic compounds not containing lithium, such as $V_2MoO_8$, $Cu_2V_2O_7$, $MoO_3$, $V_2O_5$, $Cr_2O_3$, $MnO_2$, $TiS_2$ and $MoS_2$. In general, they are directly deposited on a collector comprising a conductive material by sputtering or other method or alternatively are adhered on to the collector using a conductive agent or a binder to form a positive electrode.

Examples of the collector include a thin film of carbon, carbon fibers, graphite fibers, metals, conductive polymers and other materials having a good electric conductivity. Examples of the conducive agent include carbon materials and metals. Examples of the binder include teflon and polyvinylidene fluoride.

The negative electrode preferably comprises lithium or a lithium alloy, a metallic compound capable of occluding or releasing lithium, a carbon material or other material. Examples of the metallic compound capable of occluding or releasing lithium are as described above.

The nonaqueous electrolyte interposed between the positive electrode and the negative electrode typically comprises an electrolyte solution prepared by dissolving a lithium salt, such as $LiPF_6$, $LiClO_4$, $LiBF_4$, $LiAsF_6$ or $LiCF_3SO_3$, in propylene carbonate, diethyl carbonate, dimethoxyethane, γ-butyrolactone or the like.

A separator is generally interposed between the positive electrode and the negative electrode, and porous membranes, nonwoven fabrics, etc., of polyolefins or other materials are used as the separator.

There is no particular limitation on the form of the cell, and the cell may be in the form of a unit cell comprising a set of a positive electrode, a negative electrode and an electrolyte, an assembled cell comprising a plurality of cells and an integrated cell comprising a plurality of assembled cells. The shape of the cell may be any of a button, a coin, a square or a rectangle, a cylinder and a pin. The material for the container too is not particularly limited, and representative examples thereof include stainless steel and iron materials plated with nickel.

According to the present invention, the following improvement and device become possible in the above-described secondary cell with a nonaqueous electrolyte.
Improvement in Electrode, Mainly in Positive Electrode The following aspects of the present invention have been mainly made with a view to improving the positive electrode and, therefore, can be favorably applied to the positive electrode. However, they are applicable also to the negative electrode. Although the present invention will now be described in terms of the application to the positive electrode, it should be understood that the electrode, as such, may be used as a negative electrode with a known positive electrode or alternatively the following electrodes (first to eighth aspects) may be used as both the positive electrode and negative electrode.

(1) According to the first aspect of the present invention, a metallic compound capable of occluding or releasing lithium and having an acicular microstructure is used as the positive active material.

In a secondary cell with a nonaqueous electrolyte using lithium or a lithium alloy as the electrode, studies have hitherto been made on the use of $MnO_2$, $V_2O_5$, etc., as the electrode active material. $MnO_2$, however, unfavorably gives rise to a significant reduction in the capacity because charge-discharge cycles destroy the crystal structure.

In order to solve this problem, a proposal has been made regarding the use of a lithium double oxide, such as $LiMn_2O_4$, produced by previously doping an electrode active material with a lithium ion (see Material Research Bulletin, 18 (1983), 461–472).

$LiMn_2O_4$ has a spinel-type cubic crystal structure and can be generally produced by sintering a mixture of a lithium salt powder with a manganese oxide powder.

Figure 2:
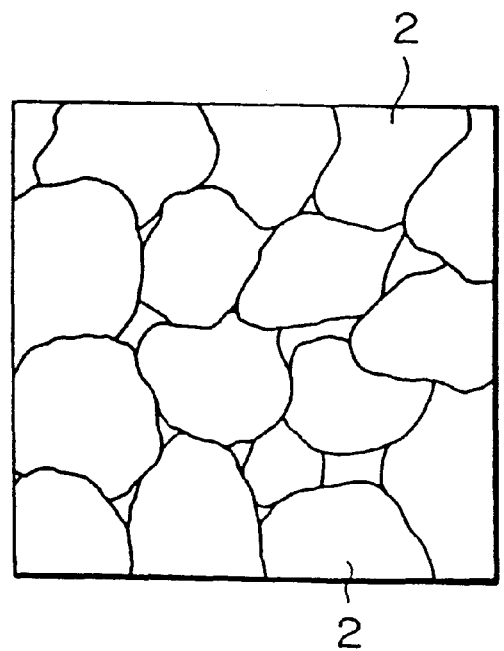
FIG. 2 is an explanatory view of a microstructure of a comparative metallic compound produced in Example 1.

In this case, a powder of $LiMn_2O_4$ has a spherical microstructure, and the particle diameter is generally in the range of from several μm to several tens of μm (see FIG. 2).

The use of the above-described electrode active material, however, unfavorably lowers the charge-discharge energy density of the electrode.

Specifically, when the $LiMn_2O_4$ powder is prepared by the above-described method, that is, by mixing a lithium salt powder with a manganese oxide powder and sintering the mixture, raw material powders of lithium and manganese prepared by the conventional method are not in a regulated shape and at least one of the two powders is a spherical powder. Further, in general, the resultant $LiMn_2O_4$ powder is also in the form of a spherical powder having a particle diameter in the range of from several pm to several tens of μm. The $LiMn_2O_4$ powder comprises an aggregate of polycrystals and has many crystal defects and grain boundaries. For this reason, when this powder is used as the electrode active material, the migration of lithium ion from the surface of the powder to the center portion is suppressed. This lowers the apparent migration rate of the lithium ion in the electrode. Therefore, in particular, even though a high current discharge is intended, the lithium migration rate is determined by the crystal defects and grain boundaries. As a result, the high current discharge becomes impossible, and only part of the lithium ion implanted into the electrode active material during charging can be released.

Such a problem occurs during charging in addition to discharging. For example, rapid charging becomes impossible.

In view of the above-described problems of the prior art, the first aspect of the present invention provides an electrode for a cell with a nonaqueous electrolyte that can offer a high charge-discharge energy density.

In the first aspect of the present invention, it is preferred for the metallic compound having an acicular microstructure to have a major axis in the range of from 0.1 to 100 μm and an aspect ratio in the range of from 2 to 500. When the major axis and the aspect ratio are outside the above respective ranges, the metallic compound becomes particulate or fibrous, which makes it difficult to attain the object of the present invention.

The metallic compound having an acicular microstructure can be produced, for example, either by adding and mixing an ultrafine powder with a powder of raw materials for the metallic compound and heating and sintering the mixture, or by adding and mixing an ultrafine powder with a solution of raw materials for the metallic compound and heat-treating the mixture, thereby depositing a metallic compound on the surface of the ultrafine powder particles.

The ultrafine powder used in the production of the metallic compound having an acicular structure should be non-reactive with the powder or solution of raw materials and serve as a nucleus in the formation and growth of the metallic compound. The particle diameter of the ultrafine powder is preferably 1 μm or less. It is desirably 0.5 μm or less, still desirably 0.2 μm or less. When the particle diameter exceeds 1 μm, it becomes difficult to provide a metallic compound having an acicular microstructure. Examples of the ultrafine powder include powders of hexagonal SiC, $Si_3N_4$, $TiO_2$ and $Al_2O_3$. It is also possible to use, as the ultrafine powder, a powder which, as such, has an acicular microstructure. Examples of such powders include acicular $TiO_2$, acicular CuO and acicular ZnO.

The powder of raw materials for the metallic compound used in the production of the metallic compound should form a metallic compound capable of occluding or releasing lithium in the electrolyte upon being sintered.

Examples of the powder of raw materials include a mixed powder comprising a lithium-containing powder and a metal oxide power, a powder of a precursor prepared by precipitation from a solution of raw materials, and other powders. Examples of the lithium-containing powder include LiI, LiOH and $Li_2Co_3$. Examples of the metal oxide powder to be mixed with the lithium-containing powder include $MnO_2$, NiO and $Co_2O_3$. Examples of the precursor powder include a complex metallic compound precursor containing lithium and manganese produced by vapor growth, sol-gel or other processes. Examples of the other powders include powders of $V_2O_5$, $MoO_3$, $Fe_2O_3$ and CuO.

Examples of the metallic compound capable of occluding or releasing lithium include metallic compounds containing lithium, such as $LiMn_2O_4$, $Li_xMnO_2$, $Li_xMn_3O_4$, $LiCoO_2$, $LiNiO_2$, $LiFeO_2$ and $LiV_3O_8$. Further examples of the metallic compound capable of occluding or releasing lithium include metallic compounds not containing lithium, such as $V_2MoO_8$, $Cu_2V_2O_7$, $MoO_3$, $V_2O_5$, $Cr_2O_5$, $MnO_2$, $TiS_2$ and $MoS_2$.

The amount of addition of the ultrafine powder is preferably in the range of from 0.1 to 40% by volume based on the total amount of the ultrafine powder and the powder of raw materials. When it is smaller than 0.1% by volume, the effect of forming the acicular structure is small. On the other hand, when it exceeds 40% by volume, less additional effect corresponding to the amount of addition can be attained. Further, in this case, there is a possibility that by-products occur.

In the heat sintering, although the sintering may be effected under atmospheric pressure, it is also possible to use pressure sintering under pressure, such as hot press sintering and hot isostatic press (HIP) sintering. The heat sintering temperature is in the range of from 300 to 1200° C. This can accelerate the sintering reaction. The selection of sintering conditions can provide a metallic compound having minimized crystal defects and grain boundaries in individual acicular powder particles and capable of occluding or releasing lithium.

It is also possible to provide the metallic compound having an acicular microstructure, for example, by a method which comprises adding a chelating agent to a solution containing a metallic ion of the metallic compound and subjecting the mixture to precipitation and heat sintering.

In the electrode for a cell with a nonaqueous electrolyte according to the first aspect of the present invention, the metallic compound used in the electrode active material has an acicular microstructure. Further, the metallic compound can occlude lithium present in the electrolyte during discharging and release lithium during charging. When this electrode active material is incorporated into a cell and charging and discharging are effected, since the microstructure of the metallic compound is acicular, the distance between the surface and the center portion is small. This increases the apparent migration rate of lithium in the metallic compound capable of occluding or releasing lithium. Therefore, lithium can easily migrate from the surface to the center portion and vice versa.

Further, since the metallic compound has an acicular microstructure, the specific surface area becomes higher than the spherical powder. For this reason, the area of contact of the metallic compound with the electrolyte is so large that lithium can be incorporated into the metallic compound with a high efficiency. As described above, in the electrode active material, the apparent migration rate of lithium in the electrode active material becomes high by virtue of the effect of the metallic compound having an acicular crystal. Therefore, in the electrode for a cell with a nonaqueous electrolyte according to the present invention, it becomes easy to effect charging and discharging of a high current, which increases the charge-discharge energy density. Thus, the first aspect of the present invention can provide an electrode for a cell with a nonaqueous electrolyte capable of offering a high charge-discharge density.

(2) In the second aspect of the present invention, the positive electrode comprises a conductive substrate and, provided on the conductive substrate, a positive active material comprising a lithium-containing metal oxide crystal grown into such a columnar form that the axis is inclined at the angle $0° \leq \theta < 90°$ (wherein θ represents the angle of inclination of the axis) to the normal direction of the surface of the substrate.

$MnO_2$ and LiOH are mixed with each other, and the mixture is sintered to provide a $LiMn_2O_4$ powder, that is used as $LiMn_2O_4$ constituting the positive electrode of the lithium secondary cell. The $LiMn_2O_4$ powder is mixed with a binder and a conductive agent to provide a mixture that is then molded into a sheet as the positive electrode. In the positive electrode thus provided, the $LiMn_2O_4$, as such, has crystal defects and many grain boundaries, and, at the same time, an amorphous region comprising a binder and a conductive agent incorporated into the $LiMn_2O_4$ powder inhibits the migration of lithium. This lowers the apparent migration rate of the lithium ion in the positive electrode. In particular, even when high current discharging is intended, the crystal defects, grain boundaries and amorphous region which determine the migration rate of the lithium ion are large, so that it becomes impossible to effect high current discharging, and only part of the lithium incorporated into the positive electrode during charging can be taken out of the positive electrolyte. The present inventors have found that an increase of the discharge current density with the use of the above-described conventional positive electrode lowers the discharge capacity.

The above-described problem occurs during charging in addition to discharging. For example, rapid charging becomes impossible.

The second and third aspects of the present invention solve the above-described problem, that is, enhance the apparent migration density of the lithium ion and provide a positive electrode for a secondary cell that can offer a high discharge energy density in the discharging of a high current.

In the second aspect of the present invention, a metallic sheet of Ni, Al, Cu, stainless steel or the like or a material comprising other conductive material can be used as the substrate of the positive electrode. The size and shape of the substrate may be arbitrary depending upon the applications.

Examples of the lithium-containing metal oxide include $LiMn_2O_4$, $Li_xWO_3$, $LiCoO_2$, $Li_2MnO_2$, $Li_2Mn_3O_4$, $LiNi_{0.4}CoO_{0.5}O_2$, $Li_{0.5}MnO_2$ and $LiV_2O_5$.

Figure 7:
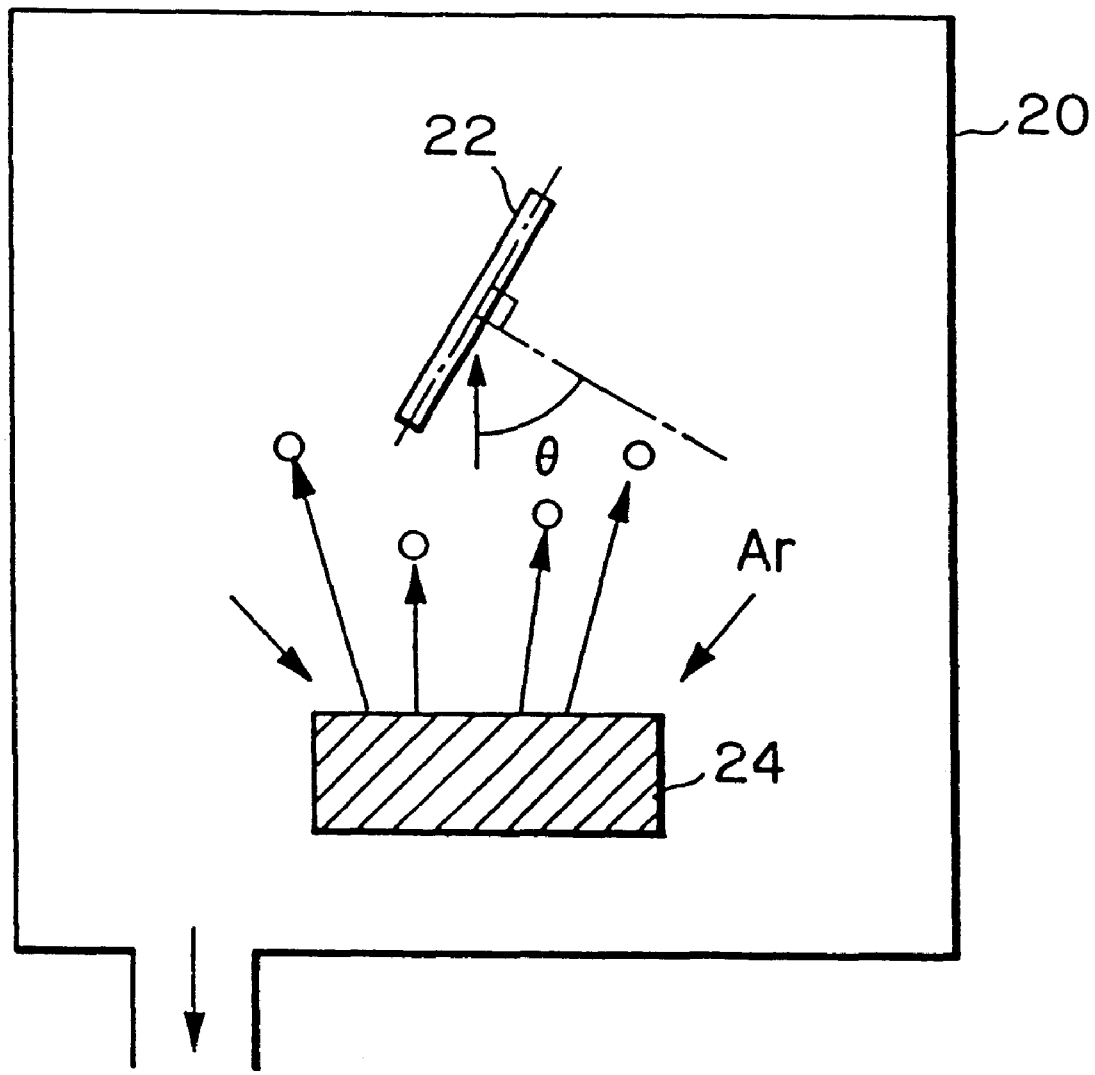
FIG. 7 is an explanatory schematic view of a deposition apparatus for an oblique incident vacuum deposition which forms a columnar protrusion of a positive electrode for a lithium secondary cell in Example 9.

Oblique incident vacuum deposition in vacuum deposition film formation can be used as means for growing the metal oxide into a columnar form that the angle θ thereof to the normal direction of the surface of the substrate is $0° \leq θ < 90°$. As schematically shown in FIG. 7, in this method, the relative position between a substrate 2 and a target 24 in a vacuum vessel 20 is specified so that the angle θ of the normal of the substrate 22 to the incident direction of depositing particles is $0° \leq θ < 90°$, and an energy, such as an ion beam, is then applied to the target 24 to beat and drive out constituent element particles of target 24 that are deposited on the substrate 22. The oblique incident vacuum deposition causes the substrate to bristle with columnar protrusions having a diameter of about several nm. The direction in which the protrusions extend is coincident with the incidental direction. Therefore, the inclination of the columnar protrusions against the surface of the substrate increases with increasing the angle θ of the normal to the incident direction of the deposition particles. Further, there is a tendency for the space between adjacent columnar protrusions to increase with an increase in θ. However, when the θ value is excessively large, homogeneous deposition on the surface of the substrate becomes difficult. For this reason, a preferable angle θ is in the range of from about 5° to 80°.

The metal oxide constituting the positive active material, as such, may be used as the target. Alternatively, use may be made of a plurality of targets respectively containing constituent elements. Further, it is also possible to use a method which comprises vacuum-depositing an oxide of metal(s) alone to form protrusions on the substrate and causing lithium to be absorbed into to the protrusions.

In order to broaden the space between the columnar protrusions, it is also preferred to effect etching with a suitable etching agent.

In the positive electrode for a lithium secondary cell according to the second aspect of the present invention, the surface of the substrate bristles with protrusions as the positive active material. It is a matter of course that a space is formed between the protrusions. An electrolyte carrying a lithium ion penetrates into the space. That is, the electrolyte penetrates into a deep portion away from the surface of the positive electrode. This contributes to a significant increase in the apparent area of contact of the surface of the positive electrode with the electrolyte, which facilitates the transmission of the lithium ion between the positive active material and the electrolyte.

Further, since neither binder nor conductive agent is used in the columnar positive active material, there is no possibility that the transmission of the lithium ion is inhibited by the binder and conductive agent.

Further, in the positive electrode for a secondary cell, the surface of the substrate, on which the positive electrode is formed, bristles with columnar protrusions of a lithium-containing metal oxide constituting the positive active material. This causes spaces to be formed between the columnar protrusions of the positive active material. The spaces are filled with the electrolyte. This renders the area of contact of the positive electrode with the electrolyte very large. For this reason, even though an electric double layer, which inhibits the migration of the lithium ion, exists between the electrolyte and the positive active material, this can be compensated for by the large contact area. Further, since the section of the columnar protrusions is very small, the lithium atom held on the surface of the columnar protrusions can relatively easily migrate to the center portion of the columnar protrusions.

These functions in the second aspect of the present invention enhance the apparent migration rate of the lithium ion and facilitate discharging and charging of a high current. Further, even when a high current is flown, the lowering in the energy density is small.

(3) In the third aspect of the present invention, the positive electrode comprises a conductive substrate and a positive active material layer provided on the surface of the conductive substrate, said positive active material layer comprising a $LiMn_2O_4$ crystal in a single crystal form at least in the direction of thickness of said layer from the surface of the substrate.

Specifically, according to this aspect of the present invention, in the positive electrode, a $LiMn_2O_4$ crystal formed on the surface of substrate is used as the positive active material. Although this crystal is preferably a single crystal, it is possible for a thin film constituting the positive active material to comprise a single crystal in its thicknesswise direction with a plurality of crystals in its direction extending over the surface of the substrate.

Figure 9:
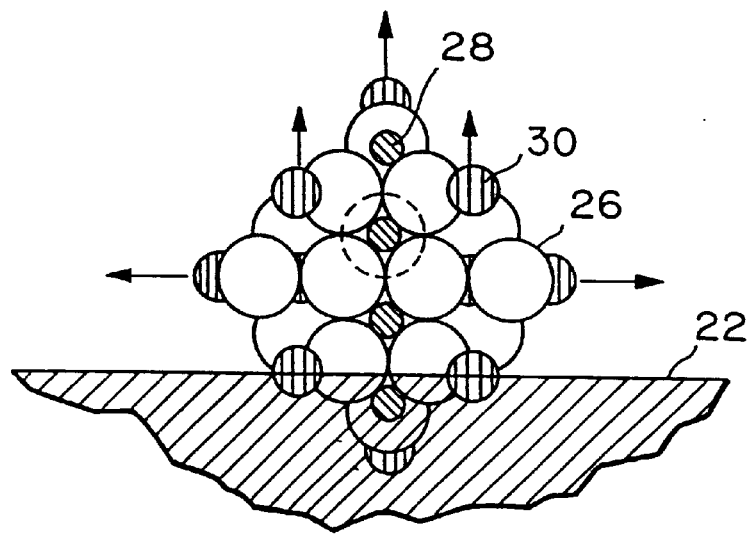
FIG. 9 is a diagram showing the atomic arrangement of a $LiMn_2O_4$ single crystal in Example 10.
Figure 10:
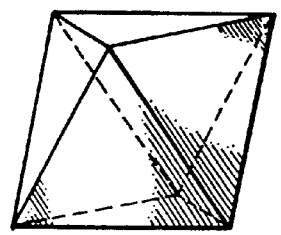
FIG. 10 is an explanatory perspective view of an octahedron for the arrangement of oxygen and manganese of a $LiMn_2O_4$ single crystal in Example 10.
Figure 11:
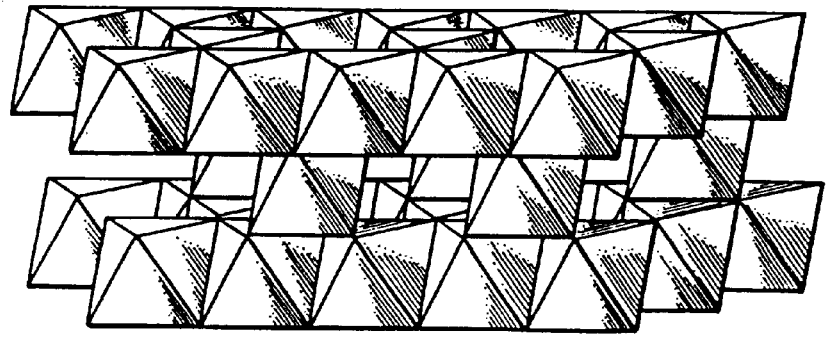
FIG. 11 is a perspective view showing the arrangement of an octahedron of a $LiMn_2O_4$ single crystal in Example 10.

As shown in FIG. 9, the single crystal of $LiMn_2O_4$ comprises an oxygen atom 11 represented by a white ball, a manganese atom 12 represented by a black ball and a lithium atom 13 represented by a ball surrounded with a broken line, and octahedrons as shown in FIG. 10 range in a row to form an octahedron frame shown in FIG. 11. Each vertex of the octahedron is occupied by an oxygen atom, and a manganese atom exists in the center of the octahedron. The lithium atom exists in a space extending in the three-dimensional direction of the octahedron frame. Arrows shown in FIG. 9 represent these spaces. The lithium atoms migrate through these tunnel spaces extending in three-dimensional directions. During charging, the lithium atom contained in the electrolyte enters the tunnel spaces of crystals and advance toward the interior of the crystals. On the other hand, during discharging, the lithium ion is released from these spaces into the electrolyte.

In the present specification, although the expression "single crystal of $LiMn_2O_4$" is used, the lithium atom goes in and out from the crystals. Therefore, strictly speaking, the expression "single crystal of $LiMn_2O_4$" is not correct. In this connection, it is noted that the octahedron frame extending in a three-dimensional manner shown in FIG. 11 is regarded as one single crystal and one $LiMn_2O_4$ single crystal.

Since the tunnel space present in the one $LiMn_2O_4$ single crystal continuously extends in a three-dimensional manner, the lithium atom easily reaches and can be held in a deep portion of the crystal and can migrate from the deep portion of the crystal to the surface of the crystal. In the thin film of the positive electrode for a lithium secondary cell according to the third aspect of the present invention, since only one single crystal exists in the thicknesswise direction of the thin film, the lithium atom held on the surface of the thin film in contact with the electrolyte can easily pass through the tunnel space of the single crystal and migrate to a deep portion of the thin film on the opposite side of the thin film near the substrate.

Further, it is considered that part of the Mn in $LiMn_2O_4$ may be replaced with another element or a layer of a substance having a lattice constant different from $LiMn_2O_4$ may be introduced into the laminated structure of $LiMn_2O_4$ to intentionally apply a strain to the $LiMn_2O_4$ crystal to widen the tunnel space for the purpose of improving the migration of the lithium atom. Further, it is also considered that the fatigue failure strength of the crystal in a thin film form may be improved by forming such a inclined structure that only the outermost layer of the crystal in a thin film form in contact with the electrolyte is rendered amorphous.

In the positive electrode for the lithium secondary cell, the positive active material comprises a $LiMn_2O_4$ crystal in a thin film form formed on the surface of the substrate. The $LiMn_2O_4$ crystal in a thin film comprises one single crystal in the thicknesswise direction of the thin film. That is, a plurality of single crystals are not laminated on top of another in the thicknesswise direction. This enables the lithium ions held on the surface of the positive electrode to easily pass through the tunnel space within the crystal. For this reason, the apparent mobility of the lithium ions is high.

The mobility of the lithium ions is so high that discharging and charging of a high current become possible. Further, even when a high current is flowed, the lowering in the energy density is small.

Further, since the thin film of the active material in its thicknesswise direction comprises a single crystal, neither grain boundaries nor crystal defects exist in the thicknesswise direction. Further, it is a matter of course that no material, which inhibits the migration of the lithium ions, such as a binder, is present. These too serve to enhance the mobility of the lithium ion. If defects exist within the $LiMn_2O_4$ particles, when the lithium ions go in and out due to the charging and discharging of the cell, the expansion and shrinkage of the crystal cause a strain energy to be accumulated in the defect portions of the crystal, which gives rise to destruction or grain size reduction of the crystal structure. This causes shortening of the service life of the cell. Since the crystal in a film formed according to the present invention is in a single crystal form, the above-described defect is absent, so that the crystal structure is less susceptible to destruction. Further, the grain size reduction is also less liable to occur. Therefore, in the positive electrode according to the third aspect of the present invention, a charge-discharge cycle life of about 500 times can be expected.

(4) In the fourth aspect of the present invention, the positive electrode comprises a collector core and a positive active material covering the surface of the collector core, said collector core comprising a collector material selected from the group consisting of a metal, a carbon fiber and a graphite fiber and having a surface provided with a collector protrusion protruded into the positive active material.

In the cell with a nonaqueous electrolyte using lithium or a lithium compound as the negative electrode, the use of $MnO_2$ and $V_2O_5$ as the positive active material has hitherto been studied. These metallic compounds give rise to breaking of the crystal structure in the charging and discharging, which significantly lowers the energy capacity of the cell. In order to solve this problem, a proposal has been made for the use of a lithium compound oxide into which lithium was previously incorporated compound and, for example, the use of $LiMn_2O_4$ as the positive active material is reported (see Material Research Bulletin, 18, (1983), 461–472). $LiMn_2O_4$ has a spinel-type cubic crystal structure and is generally produced by sintering a mixture of a lithium salt powder with a manganese oxide powder.

The positive active material is generally produced by mixing $LiMn_2O_4$ with a conductive agent and a binder and subjecting the mixture to press molding on a collector core. The conductive agent comprises a particulate carbon material.

In the above-described conventional positive electrode, there occurs a nonuniform conductive agent distribution in the positive active material or a variation in the electric conductivity in plane and in the thicknesswise direction of the positive electrode due to lack of electrical connection between the conductive agents. For this reason, the positive electrode reaction becomes nonuniform during charging and discharging, which gives rise to a lowering in the energy capacity. Further, since the conductive agent has a lower electric conductivity than the collector material for the collector core, the voltage drop attributable to the internal resistance is so significant that the energy capacity unfavorably lowers, and this problem is significant in the charging and discharging of a high current.

In view of the above-described problems of the prior art, the fourth and fifth aspects of the present invention provide a positive electrode for a cell with a nonaqueous electrolyte that can offer a high energy capacity in the charging and discharging.

In the fourth aspect of the present invention, the most noticeable feature is that the collector core has on its surface a collector protrusion protruded into the positive active material.

An oxide semiconductor provided by oxidizing the collector core may be used as the collector protrusion.

The collector protrusion may comprise an uneven material, a network material, a loop material or the like.

The term "uneven material" is intended to mean that the collector protrusion comprises a recessed portion and a protruded portion and is in the form of a stripe, a lattice, a honeycomb and the like.

The uneven portions can be formed by chemical processing, such as a photographic technique and an etching technique, machining, such as pressing, and the like.

The difference in level between the protruded portion and the recessed portion is preferably in the range of from 2 to 150 $\mu$m. When the difference in the level is less than 2 $\mu$m, there is a possibility that the effect of improving the electric conductivity becomes small. On the other hand, when it exceeds 150 $\mu$m, there is a possibility that the volume occupied by the protruded portion is increased to lower the energy capacity.

The network material is intended to mean one wherein the collector core, as such, is in a mesh form. The network material is formed by molding the collector material in a wire form, a thread form and a fibrous form and incorporating these collector materials in a network form.

The loop material is intended to mean one wherein a wire comprising the collector material is intermittently adhered to the surface of the collector core. That is, the wire is adhered to the surface of the collector core with the wire partially protruded into the positive active material. The wire forms a collector protrusion in an intermittent or continuous form on the surface of the collector core.

The level difference in the loop material is preferably in the range of from 20 to 150 $\mu$m. When the level difference in the loop material is less than 20 $\mu$m, there is a possibility that the charge-discharge capacity lowers. On the other hand, when it exceeds 150 $\mu$m, there is a possibility that the energy capacity lowers.

The oxide semiconductor include CuO, TiO$_2$ and ZnO and is formed, for example, by forming an acicular material, such as whisker, on the surface of each metallic sheet.

The thickness of the positive active material for covering the collector core is preferably in the range of from 25 to 200 μm. When it is less than 25 μm, the proportion of the positive active material in the positive electrode lowers, so that there is a possibility that the energy capacity lowers. When it exceeds 200 μm, there is a possibility that the effect of improving the electric conductivity is lowered.

The collector material comprises any one of a metal, a carbon fiber and a graphite fiber. Examples of the metal include Al, Cu, Ni, Ti, stainless steel and Al-1% Si.

The positive electrode comprises a positive active material of a metallic compound capable of occluding or releasing lithium, a collector core, a conductive agent, a binder, etc.

Although the metallic compound may be any of the above-described compounds, it is preferably a metallic compound containing lithium. This can prevent breaking of the crystal structure of the metallic compound attributable to charge-discharge cycles.

According to the fourth aspect of the present invention, in the collector core, use is made of a collector material comprising any one of a metal, a carbon fiber and a graphite fiber. The collector material preferably comprises an electron conductive material. Also when the collector protrusion comprises an oxide semiconductor, the collector core serves as an excellent electron transfer path. On the other hand, the positive active material covering the surface of the collector core becomes the origin of the oxidation and reduction reactions.

In the fourth aspect of the present invention, the collector core has on its surface a collector protrusion in an uneven form protruded into the positive active material. For this reason, this shortens the distance of migration of electrons to the origin of the oxidation and reduction reactions. Further, since the surface of the collector core has a collector protrusion, the electron transfer within the positive active material becomes homogeneous. This can reduce the internal resistance.

Since the collector core has on its surface a collector protrusion protruded into the positive active material, the surface area is large, which increases the area of release of electrons present in the collector core into the positive active material. This enables a large amount of electrons to be released at a time.

Therefore, it becomes possible to inhibit the heterogeneous oxidation and reduction reactions and the voltage drop attributable to the internal resistance, which contributes to an increase in the energy capacity.

(5) According to the fifth aspect of the present invention, the positive electrode comprises a collector core and a positive active material covering the surface of the collector core, said collector core comprising a collector material selected from the group consisting of a metal, a carbon fiber and a graphite fiber, said positive active material containing a conductive chip.

The most noticeable feature in the fifth aspect of the present invention is that the positive active material contains many conductive chips.

The conductive chip may comprise, for example, a laminate formed by laminating a foil of the above-described metallic compound on a conductive foil of the above-described collector material.

The thickness of the conductive foil in the laminate is preferably in the range of from 0.001 to 10 μm. When it is less than 0.001 μm, there is a possibility that the energy capacity lowers due to an increase in the internal resistance. On the other hand, when it exceeds 10 μm, the volume occupied by the conductive foil chip becomes so large that the energy capacity is likely to lower.

In the laminate, the thickness of the compound foil of the metallic compound is in the range of from 0.01 to 100 μm. When it is less than 0.01 μm, there is a possibility that the energy capacity lowers. On the other hand, when it exceeds 100 μm, the effect of improving the electric conductivity becomes so small that the charge-discharge capacity is likely to lower.

The thickness of the positive active material is preferably in the range of from 0.02 to 200 μm. When it is less than 0.02 μm, the energy capacity is likely to lower. On the other hand, when it exceeds 200 μm, the effect of improving the electric conductivity becomes so small that the charge-discharge capacity is likely to lower.

The conductive chip may be produced, for example, by vapor deposition. Specifically, a metallic compound and a collector material are alternately vapor-deposited on a temporary substrate for vapor deposition. This causes a compound foil and a conductive foil to be alternately laminated on the substrate (see FIG. 20). Then, the laminate comprising the compound foil and the conductive foil is peeled from the substrate and ground into chips. Thereafter, the chips are mixed with a binder to form a positive active material that is then adhered to the surface of the collector core (see FIG. 19).

Glass, Si, Al, stainless steel, paper, urethane, etc. may be used as the temporary substrate. The surface of the temporary substrate may be even or uneven. When the temporary substrate has an uneven surface, the laminate may be in an acicular or cubic form.

Further, the metallic compound may be coated on the surface of the conductive foil to provide the laminate.

The conducive chip may comprise a fiber comprising the above-described collector material. The diameter of the fiber is preferably in the range of from 2 to 7 μm. When it is less than 2 μm, the effect of improving the electric conductivity is likely to become small. On the other hand, when it exceeds 7 μm, the volume occupied by the fiber is increased, so that there is a possibility that the energy capacity lowers.

The aspect ratio of the fiber is preferably in the range of from 5 to 70. When it is less than 5, the connection between fibers becomes so insufficient that the charge-discharge capacity lowers. On the other hand, when it exceeds 70, the volume occupied by the fiber is increased, so that there is a possibility that the energy capacity lowers.

In the incorporation of the conductive chip in the positive active material, it is preferred for the fiber to be contained in an amount of 2 to 15% by weight. When the fiber content is less than 2% by weight, there is a possibility that the energy capacity lowers. On the other hand, when it exceeds 15% by weight, the charge-discharge capacity is likely to lower.

It is also possible to use, as the conductive chip, a coating of a conductive material that partially covers the surface of the metallic compound grains.

The thickness of the coating is preferably in the range of from 0.001 to 1 μm. When it is less than 0.001 μm, there is a possibility that the effect of improving the electric conductivity lowers. On the other hand, when it exceeds 1 μm, the volume occupied by the coating is increased, so that the energy capacity is likely to lower.

The coverage is preferably in the range of from to 10 to 60%. When it is less than 10%, the connection between the coatings becomes so insufficient that the charge-discharge capacity is likely to lower. On the other hand, when it exceeds 60%, the area for the electrode reaction becomes so small that the energy capacity is likely to lower.

The term "coverage" used herein is intended to mean the percentage of surface area of the crystal grain covered with the coating based on the total surface area of the grain.

The coating may be formed, for example, by electroless plating. Specifically, a coating of Cu, Ni, Au or the like may be formed by immersing a powder of the metallic compound in a plating solution containing a metal. The thickness and coverage of the coating may be properly regulated by the plating time, plating temperature, etc.

According to the fifth aspect of the present invention, the positive active material contains the above-described conductive chip in a laminate, fiber, coating or other form.

This renders the electronic conduction within the positive active material uniform, so that the internal resistance can be lowered. Therefore, the nonuniform oxidation and reduction reactions and lowering in the voltage drop attributable to the internal resistance can be inhibited, which contributes to an increase in the energy capacity. Further, it is possible to attain the same effect as the fourth aspect of the present invention.

As described above, the fourth and fifth aspects of the present invention can provide a positive electrode for a cell with a nonaqueous electrolyte that can offer a high energy capacity in the charging and discharging.

(6) According to the sixth aspect of the present invention, the positive active material comprises a metallic compound powder capable of occluding or releasing lithium, comprising a single crystal or an aggregate of a plurality of single crystals and having a particle diameter in the range of from 1 to 20 $\mu$m with the single crystal having a grain diameter in the range of from 0.1 to 20 $\mu$m.

As described above, the lithium secondary cell can offer the highest energy density per unit weight and unit volume. The cell capacity of the lithium secondary cell greatly depends upon the current density in the discharging, and an increase in the current density unfavorably gives rise to a rapid lowering in the cell capacity.

Lithium-containing metal oxides capable of offering a high energy density, such as $LiMn_2O_4$, particularly spinel-type compounds have attracted attention as the metal oxide used in the positive active material. In the positive active material, when charging and discharging are effected in a wide range, since the manganese ion becomes trivalent, a strain occurs in the crystal lattice due to the Jahn-Teller effect. This has led to a possibility that the repetition of charge-discharge cycles breaks the crystal lattice to lower the cell capacity.

In view of the above-described problems of the prior art, the sixth and seventh aspects of the present invention provide a positive electrode for a lithium secondary cell that is excellent in cell capacity and charge-discharge cycle characteristics.

In the sixth aspect of the present invention, the metallic compound powder capable of occluding or releasing lithium comprises a single crystal or an aggregate of a plurality of single crystals. In the number of the single crystals constituting the metallic compound powder is as small as possible, and the metallic compound powder has a structure close to a single crystal. The conductive agent is incorporated for the purpose of imparting an electronic conductivity to the positive active material. The particle diameter of the metallic compound powder should be in the range of from 1 to 20 $\mu$m. When it is less than 1 $\mu$m, since the conductive agent should be used in a large amount, which gives rise to a problem that the amount of the positive active material is reduced. On the other hand, when it exceeds 20 $\mu$m, since the area of contact of the metallic compound powder with the electrolyte becomes so small that the occlusion of the lithium ion is unfavorably inhibited.

The grain diameter of the single crystal should be in the range of from 0.1 to 20 $\mu$m. When it is less than 0.1 $\mu$m, the number of grain boundaries in the metallic compound comprises an aggregate of single crystals, so that a strain occurs in the crystal lattice. On the other hand, when it exceeds 20 $\mu$m, the area of contact of the metallic compound powder with the electrolyte becomes so small that the occlusion of the lithium ion is unfavorably inhibited.

The metallic compound powder (such as $LiMn_2O_4$, $Li_xMnO_2$, $LiCoO_2$, $LiNiO_2$, $LiFeO_2$ or $LiV_3O_8$) is produced, for example, by heat-sintering a raw material constituting the metallic compound powder and a lithium salt. In order to synthesize a metallic compound powder, wherein the number of grain boundaries is small, it is preferred for the lithium salt to be mixed in an amount in the range of from 0.1 to 2% based on the total amount of the raw material and lithium salt. Examples of the lithium salt include LiCl, $Li_2SO_4$, $LiNO_3$, $LiClO_4$ and $Li_3PO_4$. Examples of the raw material constituting the metallic compound powder include a mixture of LiOH with $MnO_2$.

The positive electrode for the lithium secondary cell comprises a collector and a positive electrode material covering the collector. The positive electrode material may be produced by kneading the metallic compound powder with a conductive agent, a binder, etc., or stirring these materials in a liquid phase. A carbon material, a metal, etc., are used as the conductive agent. A fluororesin, such as teflon, is used as the binder. A thin film of carbon, a carbon fiber, a graphite fiber, a metal, a conductive polymer and other materials having a good electric conductivity are used as the collector.

In the positive electrode for a lithium secondary cell according to the sixth aspect of the present invention, the metallic compound powder comprises a single crystal or an aggregate of a plurality of single crystals wherein the number of single crystals is as small as possible. The particle diameter of the metallic compound powder and the grain diameter of the single crystal are in the above-described respective ranges. This renders the number of grain boundaries much smaller than that in the case of the conventional polycrystal grains, so that the lithium ion can be easily migrated to the center of the positive active material. Therefore, in the positive active material, the giving and receiving of electrons through the medium of the lithium ion actively occur. This contributes to an improvement in the utilization factor of the positive active material, which increases the cell capacity. Further, the positive active material can easily migrate many lithium ions, so that, as described above, the cell capacity is excellent independently of the current density. Therefore, even in the case of the discharging of a high current, the lowering in the cell capacity is small, and the charge-discharge cycle characteristics are also excellent.

(7) According to the seventh aspect of the present invention, the positive active material comprises a metallic compound powder capable of occluding or releasing lithium and comprising a Li—Cu—Mn—O-based lithium compound having a Cu to Mn molar ratio of 0.2 or less.

In the metallic compound powder, it is important that the Cu to Mn molar ratio (Cu/Mn) be 0.2 or less. When the molar ratio exceeds 0.2, it becomes difficult for Cu to be dissolved in a solid solution form, which leads to precipitation of impurities. This lowers not only the capacity per unit weight but also the efficiency. The molar ratio (Cu/Mn) is still preferably in the range of from 0.01 to 0.1. In this case, the initial capacity can be increased.

In the positive electrode for a lithium secondary cell according to the seventh aspect of the present invention, the metallic compound powder comprises a Li—Cu—Mn—O-based lithium compound containing Cu and having a Cu to Mn molar ratio of 0.2 or less. The presence of the $Cu^{2+}$ ion causes the crystal lattice of the metallic compound powder to strain in an anisotropic manner. Further, also when Mn is reduced to $Mn^{3+}$, the crystal is likely to strain in an anisotropic manner. At that time, the direction of the strain due to the $Cu^{2+}$ is different from that of the strain due to the $Mn^{3+}$, the strains are compensated for by each other. For this reason, it is considered that the positive active material of the present invention is not significantly deteriorated even when the charge-discharge cycle is repeated. Further, since the metallic compound powder contains copper, the crystal is stabilized. This too is considered to contribute to excellent charge-discharge cycle characteristics of the positive active material.

Thus, the sixth and seventh aspects of the present invention can provide a positive electrode for a lithium secondary cell that is excellent in cell capacity and charge-discharge cycle characteristics.

(8) According to the eighth aspect of the present invention, the positive active material comprises a metallic compound powder capable of occluding or releasing lithium, comprising an aggregate of polycrystal grains and containing an ultrafine powder, said ultrafine powder being present within the crystal grains and/or at crystal grain boundaries.

As described above, a proposal has been made regarding the use of a lithium compound oxide, into which lithium has been previously incorporated, such as $LiMn_2O_4$, as the metallic compound (see Material Research Bulletin, 18 (1983), 461–472). The metallic compound powder comprising $LiMn_2O_4$ is in the form of an aggregate of polycrystal grains. The polycrystal grain has a spinel-type cubic crystal structure. The particle diameter of the metallic compound powder is generally in the range of from several $\mu$m to several tens of $\mu$m. The metallic compound powder may be produced by mixing a lithium salt powder with a manganese oxide powder and sintering the mixture.

When a cell with a nonaqueous electrolyte using the metallic compound as the electrode active material is subjected to charging and discharging, the lithium ion goes in and out from the electrode active material. This causes the polycrystal grain in the $LiMn_2O_4$ powder to be expanded and shrunken.

For this reason, crystal defects occur in the metallic compound powder. Further, a strain is accumulated in the grain boundaries, which gives rise to grain size reduction and breaking of the crystal structure, so that the charge-discharge cycle life of the electrode for a cell with a nonaqueous electrolyte becomes shortened.

In view of the above-described problems of the prior art, the eighth aspect of the present invention aims to provide an electrode for a cell with a nonaqueous electrolyte through the prevention of the grain size reduction and breaking of the crystal structure attributable to charging and discharging.

Figure 30:
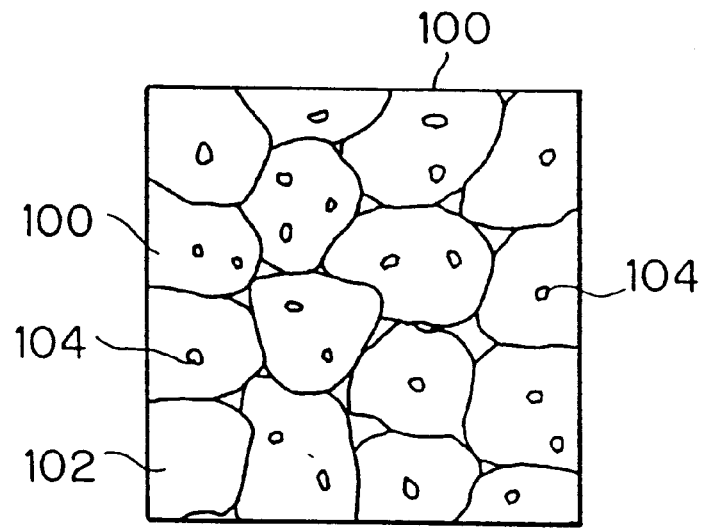
FIG. 30 is an explanatory view of a microstructure of a metallic compound in Example 23.
Figure 31:
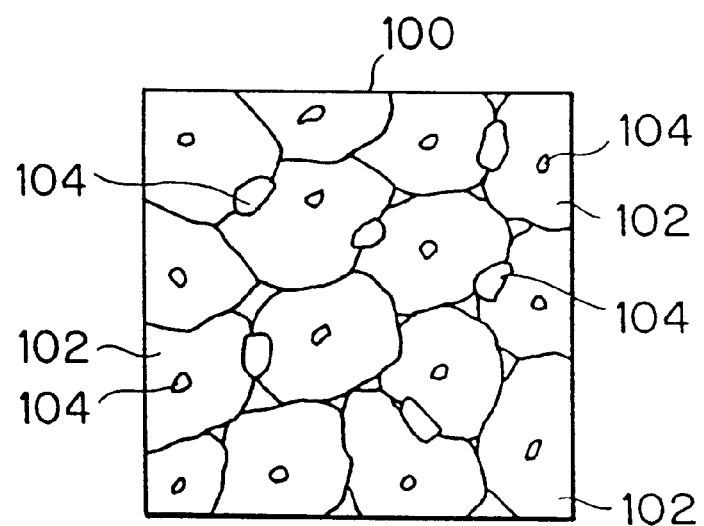
FIG. 31 is an explanatory view of a microstructure of a metallic compound in Example 24.

The most noticeable feature of the eighth aspect of the present invention is that the ultrafine powder is present within the polycrystal grains and/or at grain boundaries (see FIGS. 30 and 31).

The particle diameter of the ultrafine powder is preferably 3 $\mu$m or less. It is preferably 0.5 $\mu$m or less, still preferably 0.2 $\mu$m or less, for the purpose of homogenizing the dispersion of the ultrafine powder. When the particle diameter exceeds 3 $\mu$m, it becomes difficult to incorporate the ultrafine powder into the metallic compound.

The ultrafine powder should be nonreactive with the polycrystal grains. Examples of such ultrafine powder include powders of $Si_3N_4$, SiC, $Al_2O_3$, etc.

The metallic compound capable of occluding or releasing lithium is preferably a lithium-containing compound.

Further, the content of the ultrafine powder is preferably in the range of from 0.1 to 40% by volume based on the total content of the ultrafine powder and the metallic compound. When the ultrafine powder content is less than 0.1% by volume, it is difficult to attain the effect of the present invention. On the other hand, when it exceeds 40% by volume, there is a possibility that by-products are formed.

The metallic compound powder containing the ultrafine powder may be produced, for example, by adding and mixing the ultrafine powder with raw materials of the metallic compound and heat-sintering the mixture. Alternatively, it may be produced by adding and mixing the ultrafine powder with a solution containing metallic ions of the metallic compound, forming a precipitate and heat-sintering the precipitate.

In the heat sintering, although the sintering may be effected under atmospheric pressure, it is also possible to effect sintering under pressure, for example, by hot press sintering and hot isostatic press (HIP) sintering. The heat sintering temperature is in the range of from 300 to 1200° C. This can accelerate the sintering reaction.

In the electrode for a cell with a nonaqueous electrolyte according to the eighth aspect of the present invention, in the metallic compound powder used in the electrode active material, the ultrafine powder are present within the crystal grains and/or at crystal grain boundaries. Further, the size of the ultrafine powder particles is smaller than that of the polycrystal grains. Therefore, when the electrode active material is incorporated into a cell and charging and discharging are effected, the expansion and shrinkage of the polycrystal grains attributable to the going-in and going-out of the lithium ion are inhibited by the ultrafine powder. Specifically, the ultrafine powder serves as a cushion for alleviating the expansion and shrinkage of the polycrystal grain. Therefore, no crystal structure of the polycrystal grain is broken, so that there is no possibility that the metallic compound powder, which comprises an aggregate of the polycrystal grains, is subjected to grain size reduction. This prolongs the cycle life of the electrode for a cell with a nonaqueous electrolyte.

Thus, the eighth aspect of the present invention can prevent the grain size reduction and breaking of the crystal structure of the electrode active material attributable to the charging and discharging and provide an electrode for a cell with a nonaqueous electrolyte that can offer a long charge-discharge cycle life.

Although the first to eighth aspects of the present invention have been described in terms of the positive electrode, they can be applied to both the positive and negative electrodes.

Improvement in Negative Electrode (9) (10) In the lithium secondary cell wherein the lithium metal, as such, is used as the negative electrode, it is considered that a lithium dendrite formed by the dissolution and deposition of the lithium metal attributable to the charging and discharging lowers the charge-discharge efficiency of the negative electrode, which shortens the charge-discharge cycle life. Further, there is a possibility that the dendrite grown to a large size breaks through the separator and comes into contact with the positive electrode to give rise to short circuiting.

The ninth and tenth aspects of the present invention aim to solve the above-described problems, i.e. inhabits the growth of large dendrites, to provide a negative electrode for a lithium secondary cell that can offer a high charge-discharge efficiency and a high charge-discharge cycle life.

In order to accomplish this aim, a known principle is applied that, in the growth of crystals, a large crystal is provided when the number of crystalline nuclei is small while the crystal becomes small when the number of crystalline nuclei is large. Specifically, a number of crystalline nuclei serving as the origin of the growth of crystals are formed in the negative electrode to form a number of crystals, thereby preventing the formation of large dendrites.

According to the ninth aspect of the present invention, the negative electrode, at least at its surface portion of the lithium secondary cell, comprises metallic lithium constituting a matrix and a metallic element other than lithium or a cluster of the metallic element dispersed and held in the matrix and exposed on the surface of the negative electrode (ninth aspect).

According to the tenth aspect of the present invention, the negative electrode, at least at its surface portion of the lithium secondary cell, comprises a lithium alloy or a metal other than lithium, the surface of said negative electrode being uneven and having recesses and protrusions each having an average width of 10 µm or less.

In both the ninth and tenth aspects of the present invention, a lithium metal sheet or a sheet material made of other conductive material may be used as the substrate for the negative electrode. The size and shape of the substrate may be properly selected depending upon the applications.

In the ninth aspect of the present invention, the substrate, at least at its surface portion, comprises metallic lithium constituting a matrix and a metallic element other than lithium or a cluster of the metallic element dispersed and held in the matrix and exposed on the surface of the negative electrode. Aluminum, lead, magnesium, tin, indium, zinc, silver, gallium, etc. may be used as the metal element other than lithium. The metallic element and metallic cluster may be dispersed and held in the lithium matrix by an ion implantation method wherein a metallic element is ionized and implanted into the substrate at its surface portion or a method wherein a strong energy is applied to a target of the metal to sputter and drive the metal into the surface of the substrate.

The proportion of the dissimilar metallic element exposed on the surface of the substrate is preferably in the range of from about $10^{11}$ to $10^{13}$ grains per mm$^2$. The number of grains of the dissimilar metallic element exposed on the surface of the lithium matrix may be one or alternatively several tens to several hundreds as in the cluster.

The dissimilar metallic element at its portion exposed to the surface of the lithium matrix constitutes a nucleation site in the desposition of lithium.

In the negative electrode according to the tenth aspect of the present invention, the substrate at least at its surface portion comprises a lithium alloy or a metal other than lithium. The negative electrode has a fine uneven surface wherein the average width of recesses and protrusions is 10 µm or less. It is known that a number of nucleation sites of the crystal are formed at the kink of the substrate. This invention has been made based on this finding, and fine recesses and protrusions are formed on the surface of the substrate to form a number of nucleation sites. The fine even surface of the substrate may be formed, for example, by photolithography that is used for the production of semiconductors. Specifically, after a mask pattern is formed on the surface of the substrate by the photolithography, a very fine geometrical uneven portion may be formed by ion etching.

The term "very fine" used herein is intended to mean that the average width of each of the recesses and protrusions is 10 µm or less, preferably in the range of from 0.25 to 5 µm. Although the recess and protrusion may be in a continuous groove or protrusion form, a two-dimensional uneven portion is preferred.

An alternative method is to apply a low or medium energy ion to form a fine uneven portion on the surface of the substrate.

In the negative electrode for a lithium secondary cell according to these aspects of the present invention, the exposure of a dissimilar metal or the presence of a very fine kink serving as a very large number of nucleation sites is observed on the surface of the substrate for the formation of the negative electrode. In an early stage of the charging, lithium is preferentially deposited at the exposed dissimilar metal and fine kink to form a number of lithium crystal nuclei. Continuation of the deposition of lithium causes adjacent lithium crystals to come into contact with one another to become an integral form, thereby forming a lithium layer. The whole surface of the lithium layer serves as the crystal growth face. Therefore, when the charging is further continued, lithium is equally deposited on the whole surface of the lithium layer to increase only the thickness of the lithium layer. This inhibits the occurrence of a phenomenon, such as the formation of dendrites, wherein the crystal is partially protruded.

Thus, in the above-described negative electrodes for a lithium secondary cell, since the growth of the dendrites can be inhibited, the charge-discharge cycle life is long and rapid charging becomes possible.

(11) According to the eleventh aspect of the present invention, the negative electrode comprises metallic lithium and having on its surface a lithium ion conductive layer comprising any one of a solid electrolyte, an amorphous layer, a fine grain layer and a dissimilar metal diffused layer.

As described above, in the lithium metal used in the negative electrode, when charging and discharging are repeated, dendrites are formed on the surface of the negative electrode during charging, which deteriorates the charge-discharge cycle characteristics. The formation of lithium dendrites is derived from the heterogeneous surface energy due to grain boundaries and the like of the lithium metal in the negative electrode.

For this reason, in order to solve this problem, a proposal has been made regarding the formation of a lithium alloy coating comprising Li and the like on the surface of the negative electrode (see, for example, Japanese Unexamined Patent Publication (Kokai) Nos. 53-75434 and 63-178449). In this negative electrode, in some alloy ratios, the potential difference between the negative electrode and the positive electrode becomes so small that there occurs a lowering in the voltage drop of the cell. For this reason, the lithium secondary cell cannot be used at a high voltage. This in turn gives rise to a lowering in the energy density of the lithium secondary cell.

In view of the above-described problems of the prior art, the eleventh aspect of the present invention aim to provide a lithium secondary cell that can inhibit the formation of dendrites, has a low internal resistance and a high cell voltage and is excellent in charge-discharge cycle characteristics.

In this aspect of the present invention, the most noticeable feature is that the negative electrode has on its surface the above-described lithium ion conductive layer.

The lithium ion conductive layer is formed on the surface of the negative electrode at its portion facing the nonaqueous electrolyte. The lithium ion conductive layer is formed in the form of a coating on the surface of the negative electrode, such as the solid electrolyte layer, or formed in the surface per se of the substrate, i.e., in the form of the an amorphous layer, a fine grain layer or a dissimilar metal diffused layer.

The solid electrolyte layer is provided by forming a coating of the solid electrolyte layer, such as $P_2S_5$—$Li_2S$—LiI, on the surface of the lithium metal as the negative electrode.

Specifically, the solid electrolyte layer is formed from Li (lithium) and at least one first additive element selected from the group consisting of P (phosphorus), S (sulfur), Cl (chlorine), I (iodine), Fe (iron), Mn (manganese) and Mg (magnesium). In this case, a vitreous solid electrolyte layer is formed.

It is also possible to form the solid electrolyte layer from Li, O (oxygen) and at least one second additive element selected from the group consisting of P (phosphorus), Si (silicon), V (vanadium), As (arsenic), Ge (germanium) and Ti (titanium). In this case, a ceramic solid electrolyte layer is formed.

In the formation of these two types of solid electrolyte layers, use is made of, for example, an amorphous material of $P_2S_5$—$Li_2S$—LiI or a combination of $Li_3PO_4$ with $Li_3SiO_4$ that is sputtered on the surface of the lithium metal.

The above-described amorphous layer comprises lithium metal in an amorphous form. The amorphous layer may be formed by implanting, for example, P (phosphorus) or B (boron), into the lithium metal at its surface portion. Specifically, the ion implantation of P or the like breaks crystal grain boundaries of the lithium metal to render the lithium metal amorphous.

The above-described crystal fine grain layer comprises lithium metal the surface of which has been brought to a fine grained state.

The fine crystal grain layer may be formed, for example, by pouring and casting a molten lithium metal on a collector having a low temperature. According to this method, a negative electrode of lithium metal refined to the interior thereof can be provided.

The above-described dissimilar element diffused layer has such a structure that the following third additive element is dispersed on the surface of the lithium metal.

Specifically, the dissimilar element diffused layer is formed by implanting at least one third additive element selected from the group consisting of P (phosphorus), B (boron), N (nitrogen) and F (fluorine) into the negative electrode at its surface portion and conducting a heat treatment to diffuse the implanted element.

In this case, the implanted dissimilar metal as the third additive element is diffusion-migrated to the defect portion of the lithium metal by the heat treatment (see FIG. 36). This causes the defect portion of the lithium metal having a high energy to be filled with the third additive element, so that the surface energy is homogenized.

In any of the above-described lithium ion conductive layers, the thickness is preferably in the range of from 0.1 to 3 μm. When it is less than 0.1 μm, the effect of inhibiting the formation of dendrites is small. On the other hand, when it exceeds 3 μm, there is a possibility that the conduction of the lithium ion into the negative electrode is lowered.

A metallic compound capable of occluding or releasing lithium, such as $LiMn_2O_4$, is used as the positive electrode.

Further, the nonaqueous electrolyte comprises PC (propylene carbonate) and, added thereto, $LiClO_4$.

In the eleventh aspect of the present invention, the lithium ion conductive layer is provided on the surface of the lithium metal as the negative electrode. When the lithium ion is passed from the positive active material through the nonaqueous electrolyte and precipitated on the lithium metal of the negative electrode in the charging of the lithium secondary cell, the lithium ion conductive layer prevents the lithium ion from being locally concentrated. This enables lithium to be substantially homogeneously precipitated on the surface of the negative electrode. That is, it is considered that the lithium ion conductive layer serves to homogenize or disperse the surface energy of the negative electrode. Therefore, the formation of dendrites on the surface of the negative electrode during the charging can be inhibited.

The lithium ion conductive layer is formed in an adhered state as a thin layer on the surface of the negative electrode or within the additive element layer of the negative electrode. This enables a high ion conductivity to be exhibited between the positive electrode and the negative electrode even when a nonaqueous electrolyte and a separator are interposed between the positive electrode and the negative electrode. Therefore, the internal resistance of the cell is low, and the safety against short circuiting can be ensured. Further, as opposed to the prior art, since the lithium metal as the negative active material is not alloyed, there occurs no lowering in the voltage of the cell. Therefore, the voltage of the cell is high, and the charge-discharge cycle characteristics are also excellent. Thus, the eleventh aspect of the present invention can provide a lithium secondary cell that has a low internal resistance, can inhibit the formation of dendrites, has a high cell voltage and is excellent in charge-discharge cycle characteristics.

Improvement in Electrode

(12) The twelfth aspect of the present invention provides a secondary cell with a nonaqueous electrolyte, comprising an electrode and an electrolyte, wherein said electrode comprises a sinter produced by mixing a carbon material with a thermosetting resin, heating the mixture to completely cure the thermosetting resin and sintering the cured product.

A carbon material is used as the negative active material in the above-described electrode (see Japanese Unexamined Patent Publication (Kokai) No. 62-90863). This is because the carbon material prevents the occurrence of dendrites to realize a cell excellent in safety and cycle life. A cell has hitherto been prepared from a carbon material by mixing a carbon powder with a binder comprising a resin, such as polytetrafluoroethylene, and molding the mixing.

Although this method is simple, since the resin binder has an insulating property, there occur problems such as a lowering in the electric conductivity of the electrode and unsatisfactory contact of the electrolyte with the electrode. Further, the resin binder, as such, often reacts with the electrolyte. In this case, it becomes difficult to resist a change in the volume of the carbon material attributable to the repetition of the charging and discharging and maintain the binding strength.

On the other hand, it has been proposed to use, as the binder, a fibrous material, such as a carbon fiber, coated with a olefin copolymer rubber (see Japanese Unexamined Patent Publication (Kokai) No. 3-196467). Also in this case, since the binder has an insulating property, a satisfactory electric conductivity cannot be imparted to the electrode.

In view of the above-described problems, the twelfth aspherical surface aims to provide a secondary cell with a nonaqueous electrolyte that is excellent in electric conductivity and can exhibit a high charge-discharge effect.

In this aspect of the present invention, the sinter is porous, and particles of the carbon material and particles of a carbonized product (char) of the thermosetting resin are sintered to each other. The electrolyte is impregnated into voids of the sinter.

Examples of the thermosetting resin include phenolic resins, furan resins and polyimide resins. Examples of the carbon material include pitch coke powder, graphite, powders of carbonized product (char) of thermosetting resins and carbon fibers.

The thermosetting resin content is preferably in the range of from 10 to 40% by weight based on the mixture of the thermosetting resin with the carbon material. When it is less than 10% by weight, there is a possibility that the binding property of the sinter lowers. On the other hand, when it exceeds 40% by weight, characteristics of the sinter, such as cell capacity, are deteriorated.

When both the materials are mixed with each other, it is possible to added a minor amount (3 to 5%) of a binder, such as polytetrafluoroethylene or polyethylene. This enables the powder, as such, to be simply molded into an electrode by press molding or other method prior to curing of the thermosetting resin. Separately, it is also possible to use a method which comprises mixing a liquid thermosetting resin as a starting material with the carbon material to provide a mixture in a paste form that is coated in a thin film form to provide an electrode.

The mixture of the carbon material with the thermosetting resin is once heated to completely cure the thermosetting resin to provide a cured product. In this case, the heating temperature is preferably in the range of from 150 to 280° C.

Thereafter, the cured product is heated in an inert gas atmosphere, such as argon or nitrogen. This cause the thermosetting resin to be carbonized and sintered to the carbon material. The heating temperature is preferably in the range of from 500 to 1500° C. from the view point of carbonization.

This aspect of the present invention can be applied to not only the negative electrode but also the positive electrode.

In this aspect of the present invention, a mixture of the thermosetting resin with the carbon material is once heat-cured and then fired in an inert atmosphere. Therefore, when the sintering is effected, the carbon material particles are already in such a state that they are strongly bound to each other with the cured resin, so that the molding (electrode) of the mixture is not broken during firing. Further, since the thermosetting resin is carbonized by heating it in an inert atmosphere, the resultant sinter is strong.

Further, since the sinter comprises the carbon material particles and the carbide particles bonded to each other, voids are present between the particles, so that the sinter is porous.

Therefore, when the sinter is used as the electrode for the secondary cell, the electrolyte penetrates into the voids to exhibit an excellent function as a cell. Further, since the electrode comprises the carbon material and the carbonized product (char), it has an excellent electric conductivity. Further, since the carbonized product (char) too serves as an active material, the capacity of the electrode can be improved with a high efficiency.

Further, since the electrode comprises the carbon material and the carbonized product (char), it is stable and not attacked by the electrolyte, which enables a high charge-discharge effect to be attained for a long period of time. Consequently, the secondary cell with a nonaqueous electrolyte can be used for a long period of time.

Thus, the above-described aspect of the present invention can provide a secondary cell that is excellent in electric conductivity and can exhibit a high charge-discharge effect for a long period of time.

Improvement in Separator

(13) According to the thirteenth aspect of the present invention, the secondary cell with a nonaqueous electrolyte is provided with a separator comprising a hydrophilic material or a material subjected to a hydrophilization treatment.

In the conventional lithium secondary cell using a carbon material as the negative electrode, a polyolefin resin is used as the separator from the view point of stability against the nonaqueous electrolyte. Since the separator comprising a polyolefin resin has a high surface tension and is hydrophobic, the nonaqueous electrolyte should have a low viscosity or surface tension. This is because excellent cell performance cannot be attained when the wettability of the separator by the nonaqueous electrolyte is unsatisfactory.

Further, the nonaqueous electrolyte should have a low viscosity and a high dielectric constant from the view point of the wettability of the separator by the nonaqueous electrolyte and the ionic conductivity. At the present time, however, the nonaqueous electrolyte is available only in the form of a solvent having a high viscosity and a high dielectric constant or a solvent having a low viscosity and a low dielectric constant. For this reason, a nonaqueous electrolyte comprising a mixture of both the solvents has been used in the art.

For example, in a lithium ion secondary cell disclosed in Japanese Unexamined Patent Publication (Kokai) No. 2-172163, propylene carbonate as the solvent having a high viscosity and a high dielectric constant and a diethyl carbonate as the solvent having a low viscosity and a low dielectric constant are mixed with each other for use as the nonaqueous electrolyte.

However, the nonaqueous electrolyte used in the above-described lithium ion secondary cell, as such, cannot be applied to the secondary cell with a nonaqueous electrolyte using lithium or a lithium alloy as the negative electrode.

For example, it is considered that use is made of the above-described separator comprising a hydrophobic polyolefin resin and the diethyl carbonate is added even in a minor amount to the nonaqueous electrolyte for the purpose of lowering the viscosity of the nonaqueous electrolyte. In this case, however, when charging and discharging are repeated several times at the best, the lithium or lithium alloy as the negative electrode is blackened, which unfavorably gives rise to a rapid lowering in the cell capacity. Further, the solvent having a low viscosity and a low dielectric constant generally has a problem of lack of thermal stability due to its low boiling point.

On the other hand, nonaqueous electrolytes, such as propylene carbonate, ethylene carbonate and γ-butyrolactone, has an advantage that a deterioration in the charge-discharge characteristics is small in the secondary cell with a nonaqueous electrolyte using lithium or a lithium alloy as the energy capacity. Since, however, these nonaqueous electrolytes have a high surface tension, the wettability of the separator by the polyolefin resin is poor.

In view of the above-described problems, the thirteenth aspect of the present invention aims to provide a secondary cell with a nonaqueous electrolyte that is excellent in wettability of the separator by the nonaqueous electrolyte and has excellent cell capacity and charge-discharge characteristics.

The most noticeable feature of the thirteenth aspect of the present invention is that the separator comprises a hydrophilic material or a material subjected to a hydrophilization treatment.

Examples of the above-described separator include materials which, as such, are hydrophilic, such as cellulosic porous films or nonwoven fabrics, and materials subjected to a hydrophilization treatment, such as hydrophilized porous films of polyolefin resins, such as polypropylene and polyethylene, and hydrophilized nonwoven fabrics of polyolefin resins.

Examples of the above-described nonaqueous electrolyte include solvents having a high viscosity and a high dielectric constant, such as propylene carbonate, ethylene carbonate, γ-butyrolactone and diethoxybutane, and a mixed solution comprising these nonaqueous electrolytes.

Metallic compounds capable of occluding or releasing lithium, for example, $LiMn_2O_4$ and $LiMnO_2$, may be used as the positive active material.

Lithium metal or a lithium alloy is used as the negative active material. Examples of the lithium alloy include a lithium-aluminum alloy, a lithium-lead alloy and a lithium-silicon alloy.

In the secondary cell with a nonaqueous electrolyte according to the thirteenth aspect of the present invention, use is made of a separator comprising a hydrophilic material or a material having a surface subjected to a hydrophilic treatment. This contributes to an improvement in the wettability of the separator by the nonaqueous electrolyte. Therefore, when the nonaqueous electrolyte has a high viscosity or surface tension, the separator can be easily wetted by the nonaqueous electrolyte, so that, even when the separator is interposed between the positive electrode and the negative electrode, the ionic conductivity is high and excellent cell capacity and charge-discharge characteristics can be attained.

Thus, the thirteenth aspect of the present invention can provide a secondary cell with a nonaqueous electrolyte that is excellent in wettability of the separator by the nonaqueous electrolyte and has excellent cell capacity and charge-discharge characteristics.

Charging Method

(14) According to the fourteenth aspect of the present invention, there is provided a constant-voltage pulse charging method for a metallic lithium secondary cell, comprising charging a metallic lithium secondary cell while turning a constant voltage "on" and "off", wherein the "off" period is prolonged when the cell is in a low voltage state, and shortened along with an increase in the voltage of the cell.

The method for charging a secondary cell include, besides a constant-current method and a constant-voltage method wherein charging is effected while applying a continuous current or voltage, and a current pulse method and a voltage pulse method wherein charging is effected while intermittently applying a voltage or a current.

The metallic lithium secondary cell has a problem that the repetition of charging and discharging causes the precipitation of the metallic lithium in a treelike form (lithium dendrites) to deteriorate the cell capacity and cycle life. Further, the occurrence of dendrites gives rise to elimination of the metallic lithium from the plate or short circuiting between electrodes, that is, is a large problem also from the viewpoint of safety.

It is known that the nucleation of the dendrites is likely to occur in an early stage of the charging and the formation of the dendrites is accelerated when a high current is continuously flowed in an early stage of the charging. In the early stage of the charging, since the voltage of the cell is low, when charging is effected at a constant voltage, a high current is continuously flowed, so that dendrites are easily precipitated.

In view of the above-described problems, the fourteenth aspect of the present invention aims to provide a method for charging a metallic lithium secondary cell that enables charging to be rapidly effected with the formation of dendrites prevented.

In the fourteenth aspect of the present invention, the most noticeable feature is that, in a constant-voltage pulse charging method, the "off" period is prolonged when the cell is in a low voltage state, and shortened along with an increase in the voltage of the cell.

The above-described method for charging a metallic lithium secondary cell can be realized, for example, by comparing a standard voltage comprising a chopping wave or a sawtooth wave at a fixed cycle having a constant wave height with a detected voltage proportional to the voltage of the cell and turning the application of the voltage "on" only when the absolute value of the detected voltage exceeds the absolute value of the standard voltage.

This can be easily realized at a low cost by combining a chopping wave or sawtooth wave oscillation circuit, a cell voltage detection circuit, a comparison circuit, such as a comparator, a constant-voltage oscillation circuit and other relatively simple general-purpose circuits.

In the charging method according to this aspect of the present invention, the cell is charged with an intermittent constant-voltage pulse. Therefore, the charge current does not become a continuous current but is repeatedly turned "on" and "off". The provision of the "off" period in the charge current can significantly reduce the formation of dendrites. Further, the constant-voltage pulse applied to the cell prolongs the "off" period in an early stage of the charging where the cell voltage is low. Therefore, the average value of the charge current (substantially proportional to the difference between the applied voltage and the cell voltage) does not become a particularly large value and can be regulated at a relatively low value, which inhibits the formation of dendrites. Further, since a high current is flowed in a short time by the voltage pulse, the average current can be increased, so that rapid charging becomes possible.

As described above, the fourteenth aspect of the present invention can provide a method for charging a metallic lithium secondary cell that enables charging to be rapidly effected with the formation of dendrites prevented.

Safety Measures of Battery

(15) According to the fifteenth aspect of the present invention, there is provided a lithium secondary cell comprising:

a cell body comprising a cell container and, held in said battery container, a negative electrode using lithium or a lithium alloy as a negative active material, a positive electrode and an electrolyte interposed between said negative electrode and said positive electrode;

a sensor for sensing a predetermined impact force or a higher impact force; and a barrier spray means for spraying a barrier fluid within or around said cell body upon being instructed by said sensor.

Although the lithium metal has excellent properties as the negative active material, it is very active. For this reason, it is considered that, when the lithium secondary cell is broken by an accident or an unforeseen disaster, the lithium as the electrode active material reacts with water present outside the cell to generate heat and, at the same time, to evolve hydrogen.

Accordingly, in order to provide a safer lithium secondary cell that enables the contact of lithium with water present outside the cell to be prevented even when the lithium secondary cell is broken by an accident or an unforeseen disaster and, therefore, gives rise to neither generation of heat nor evolution of hydrogen, the present inventors have repeatedly made studies on a method for separating the released metallic lithium from water present outside the cell when the lithium secondary cell is broken, which has led to the completion of the fifteenth aspect of the present invention.

The lithium secondary cell comprises a cell body, a sensor and barrier spray means. The cell body, which usually serves as the lithium secondary cell, comprises a cell container and, held in the cell container, a negative electrode, a positive electrode and an electrolyte. The negative active material comprises lithium metal or a lithium alloy. The cell body may comprise a set of a positive electrode, a negative electrode and an electrolyte or alternatively an assembled cell comprising a plurality of cells. Further, it may comprise an integrated cell comprising a plurality of assembled cells.

The sensor is means for sensing a predetermined impact force or a higher impact force. That is, it senses a strong impact force that may break the cell body. For example, a sensor used in the so-called "air bag device", which senses a strong impact such as in a car crash to inflate an air bag between the driver and the steering wheel, as such, may be used as the sensor in the present invention. Mechanical, electric and electronic sensors are known as the sensor of the type described above, and any of them may be used in the present invention. Further, the sensor may be any of the conventional sensors and novel sensors which will be developed in the future, so far as it can serve to sense a strong certain impact force or a higher impact force.

The barrier spray means is specifically means for spraying a barrier gas, which reacts with active lithium metal or a lithium alloy to form a more inert surface layer on the surface thereof, or alternatively spraying a raw material solution, which forms a foam capable of covering the periphery of the cell body or the periphery of the lithium metal or alloy released from the cell container due to the breaking of the cell container.

Nitrogen or carbon dioxide gas may be used as the barrier gas. Nitrogen reacts with lithium to form relatively stable lithium nitride on the surface of the lithium metal or alloy. When lithium nitride comes into contact with water, it mildly reacts with water while evolving ammonia and is gradually decomposed to form lithium oxide. Therefore, there is no danger of firing or explosion. The carbon dioxide gas reacts with lithium to form lithium carbonate on the surface of the lithium metal or alloy. The lithium metal and alloy having a surface covered with lithium carbonate does not react with water even when they come into contact with water, so that the contact of the covered lithium metal and alloy with water does not give rise to the evolution of hydrogen gas.

Conventional nitrogen gas generation means, wherein sodium nitride is reacted with copper oxide, may be used as means for generating nitrogen gas in the present invention. This nitrogen gas generation means instantaneously (30 msec) evolves nitrogen gas through the reaction: $2NaN_3 + CuO \rightarrow Na_2O + Cu + 3N_2 \uparrow$ A miniature bomb filled with carbon dioxide gas may be uses as means for generating carbon dioxide gas. With respect to the mounting of the miniature bomb, the use of an inert gas bomb as an air bag inflation gas is presently in practical use. Further, it has been verified that the carbon dioxide bomb has a durability of 10 years or more as a pressure build-up source.

The nitrogen gas generation means and the carbon dioxide gas generation means are not limited to the above-described examples only.

The barrier spray means comprises the barrier gas generation means and a lead-out portion which opens the barrier gas generation source upon being instructed by said sensor to spray the barrier gas on the cell body. The lead-out portion may comprise a valve for opening the barrier gas generation source upon being instructed by the sensor or alternatively comprise the above-described valve and a gas pipe for leading the barrier gas to the cell body. The valve and gas pipe may also be those used in the air back device. The valve can range from an electromagnetic valve to a valve wherein a pressure vessel is cut-opened with a knife.

In order to confine the barrier gas within or around the cell body as much as possible, it is preferred to place the cell body in a cell chamber or container that can be filled with a barrier gas. Further, the cell chamber and container are preferably made of a rubber or a soft resin to prevent them from being broken by impact or the like.

In the means for spraying a raw material solution for forming a foam, the raw material may comprise two liquids, that is, a resin solution for forming a urethane resin foam and a curing solution. For example, use may be made of a resin solution and a curing solution that are used in rapid molding and are known to cause a rapid reaction. Further, the modulus of elasticity of the resultant urethane resin foam can be regulated as desired through the selection of a proper urethane material. For example, when the cell container is very strongly constructed and a further reinforcement with a urethane resin foam is intended, the foam may comprise a hard urethane resin foam. On the other hand, when the formation of a rubber-like urethane resin foam which is less liable to break around a breakable cell container is intended, the foam may comprise a soft urethane resin foam. The raw material solution is not limited to urethane, and use may be made of any raw material solution so far as it can foam and cure to form a foam. The foam is interposed between the lithium metal or alloy and the water present outside the cell, which prevents the contact of lithium with water.

Both the resin solution and the curing solution are preferably in a pressurized state with a high-pressure gas so that, as soon as the sensor senses a strong impact, the resin solution and the curing solution could be homogeneously mixed with each other and sprayed into or around the body. Upon input of instructions by the sensor, nozzles for both solutions are simultaneously opened to instantaneously mix the two solutions with each other by collision and, at the same time, the raw material solution before curing is sprayed on the cell body by taking advantage of the ejection pressure and the pressure caused by foaming.

Also in the case of a foam, in order to deposit the foam within or around the cell body as much as possible, it is preferred to place the cell body in a cell chamber or container that can be filled with the foam. Further, the cell chamber and container are preferably made of a rubber or a soft resin to prevent them from being broken by impact or the like.

In the lithium secondary cell according to the fifteenth aspect of the present invention, as soon as the sensor senses a strong impact enough to break the cell body, the barrier spraying means goes into action by the input of instructions from the sensor to spray the barrier fluid into or around the cell body. When the cell body has been broken by a strong impact to expose the lithium metal or lithium alloy constituting the negative active substance outside the cell, the barrier fluid reacts with the lithium metal or lithium alloy to form an inert surface layer on the surface of the lithium metal or lithium alloy, thereby inhibiting a rapid reaction of the lithium metal or lithium alloy with water. Alternatively, the barrier fluid is cured to form a foam within or around the cell body to inhibit the impact from directly acting on the cell body, thereby preventing the breaking of the cell body. Even though the cell body is broken, since the foam is interposed between the lithium metal or lithium alloy and water, the contact of the lithium metal or lithium alloy with water is inhibited.

Therefore, in the lithium secondary cell, even though the cell body is broken, lithium is inactivated with the barrier fluid or alternatively a foam is interposed between lithium and water present outside the cell to inhibit lithium from coming into contact with water, so that a rapid reaction of lithium with water can be avoided, which can eliminate a problem attributable to the rapid reaction of lithium with water.

The present invention will now be described in more detail with reference to the following Examples.

EXAMPLE 1

In Example 1, an ultrafine powder was added to a raw material powder, and the mixture was heat-sintered to produce a metallic compound capable of occluding or releasing lithium that was then used as an electrode active material.

In the present Example, the ultrafine powder was a powder of SiC (silicon carbide) of a hexagonal system having a particle diameter of 0.3 $\mu$m.

The raw material powder was provided by weighing LiI (lithium iodide) and $MnO_2$ (manganese dioxide) to have a Li to Mn molar ratio of 1:2 and mixing them with each other.

The mixed powder comprising the raw material powder and the ultrafine powder was heat-sintered by hot pressing at 900° C. and 30 MPa in a $N_2$ atmosphere for 60 min to provide a metallic compound capable of occluding or releasing lithium.

The ultrafine powder content of the mixed powder was 3% by volume.

The microstructure of the metallic compound thus produced was observed under an electron microscope and subjected to X-ray diffraction analysis.

As a result, the observation under an electron microscope have revealed that, as shown in FIG. 1, acicular particles 1 having a minor axis of 1 $\mu$m or less and a major axis of about 3 $\mu$m were grown.

Further, $LiMn_2O_4$ and SiC could be identified by X-ray diffraction analysis.

Separately, hot pressing was effected in the same manner as that described above, except that the particle diameter of the ultrafine powder was 3 $\mu$m. As a result, the growth of acicular particles was not observed. The reason for this is believed to reside in that an increase in the particle diameter of the ultrafine powder renders the ultrafine powder ineffective as the nucleus for the formation and growth of $LiMn_2O_4$.

The size of the acicular particle can be regulated by regulating the particle diameter and amount of addition of the SiC powder and sintering temperature and pressure after mixing.

Thereafter, for comparison, $Li_2CO_3$ and $MnO_2$ were weighed in a Li to Mn molar ratio of 1:2, and they were mixed with each other without adding an ultrafine powder. The mixture was sintered at 900° C. under the same conditions as those described above to provide a metallic compound.

The observation of the microstructure of the metallic compound has revealed the formation of an aggregate of spherical particles 2 having a diameter of about 5 $\mu$m as shown in FIG. 2. Further, the metallic compound was subjected to X-ray diffraction analysis. As a result, it was found that the metallic compound comprised a single phase of $LiMn_2O_4$. It is considered that $Li_2CO_3$ and $MnO_2$ were reacted with each other to form a single phase and this reaction homogeneously proceeded in all directions to render the metallic compound spherical.

Then, the metallic compound capable of occluding or releasing lithium according to Example 1 and the above-described comparative metallic compound were subjected to a charge-discharge cycle test.

Specifically, individual metallic compounds were kneaded with a conductive agent and a binder to provide positive electrode composites that were then press-molded on a collector to prepare positive electrodes. Then, button cells were assembled using the positive electrodes.

In this case, metallic lithium was used as a negative electrode. A solution of lithium perchlorate dissolved in propylene carbonate was used as an electrolyte. The button cells had a diameter of 20 mm and a height of 3.2 mm.

The button cells were subjected to a chargedischarge cycle test wherein the cell was charged at a constant current of 2 mA/cm$^2$ and an upper limit voltage of 4.1 V for 5 hr and then discharged to 2 V. The results are shown in FIG. 3.

Figure 3:
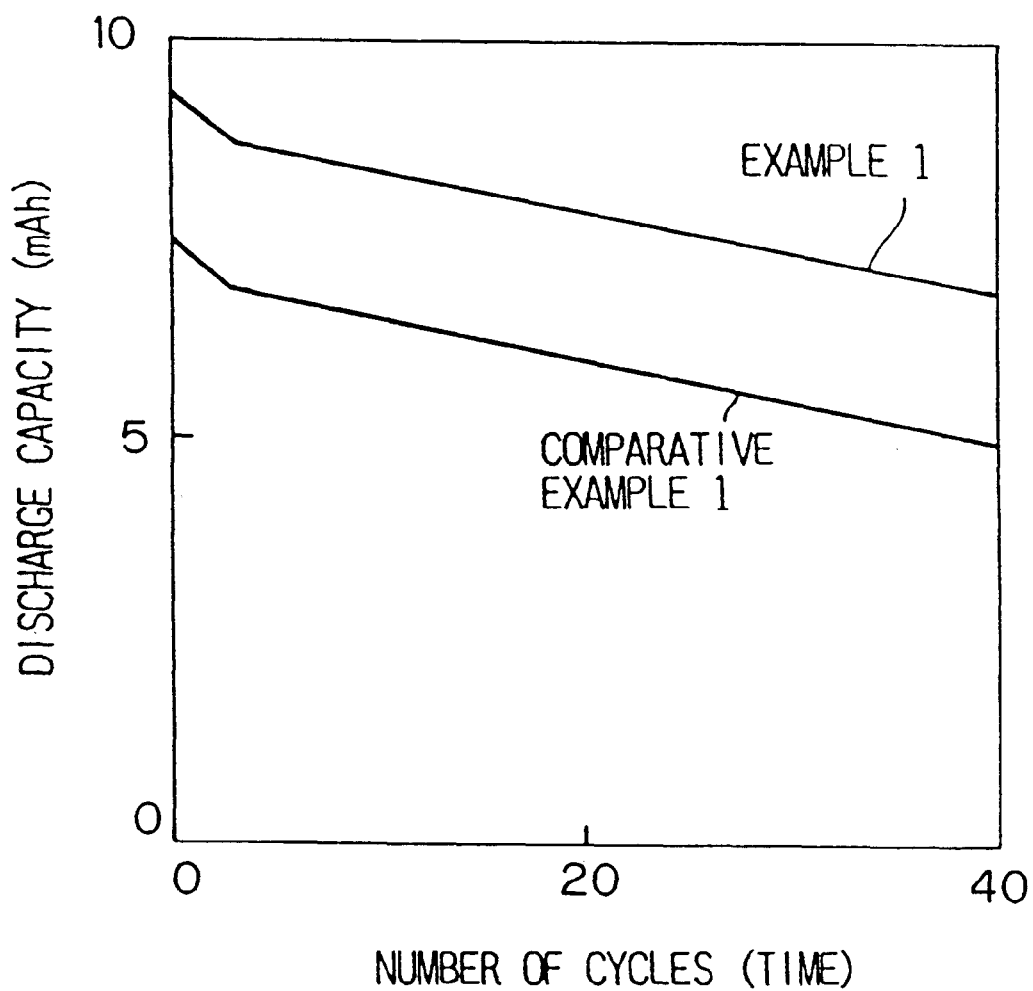
FIG. 3 is a relational diagram showing the results of a charge-discharge cycle test in Example 1.

As can be seen from FIG. 3, the cell according to the example of the present invention maintained a higher charge-discharge capacity than the comparative cell.

As is apparent from Example 1, the electrode for a cell with a nonaqueous electrolyte using an acicular metallic compound capable of occluding or releasing acicular lithium facilitates charging and discharging of a high current, so that a high charge-discharge energy density can be provided.

EXAMPLE 2

In Example 2, a $MnSO_4$ solution and a LiOH solution were used as the raw material solution.

Specifically, at the outset, 75 g of $MnSO_4$ was dissolved in 500 ml of water to prepare a $MnSO_4$ solution. Then, 1.5 g of $TiO_2$ having a particle diameter of 0.2 $\mu$m was added as an ultrafine powder to the $MnSO_4$ solution. 1 N aqueous ammonia was gradually added to the solution with stirring. Oxygen was blown into the solution containing the resultant precipitate at a flow rate of 100 ml/min for 5 hr to effect an oxidation treatment. The precipitate was collected by filtration, dried and heat-treated in air at 300° C. for 10 hr to provide manganese dioxide ($MnO_2$).

The microstructure of the precipitate was observed under an electron microscope. As a result, it was found that, as shown in FIG. 1, acicular particles 1 having a minor axis of 1 $\mu$m or less and a major axis of about 3 $\mu$m were grown.

Then, 40 g of the $MnO_2$ precipitate was placed in 500 ml of a 4 N LiOH solution, and a reaction was allowed to proceed at 70° C. for 5 hr. The reaction mixture was filtered and dried. The dried product was heat-treated at 900° C. for 24 hr.

The resultant powder was subjected to X-ray diffraction analysis. As a result, $LiMn_2O_4$ and $TiO_2$ were identified. The microstructure of the powder was the same as that of the metallic compound of Example 1.

EXAMPLE 3

In Example 3, an ultrafine powder was added to a raw material solution containing $MnSO_4$ and $Li_2SO_4$, and a reaction was allowed to proceed.

Specifically, at the outset, 75 g of $MnSO_4$ and 30 g of $Li_2SO_4$ were dissolved in 500 ml of water, and 1.5 g of $TiO_2$ having a particle diameter of 0.2 μm was added as an ultrafine powder to the solution. 1 N aqueous ammonia was gradually added to the solution with stirring. Then, oxygen was blown into the solution containing the resultant precipitate at a flow rate of 100 ml/min for 5 hr to effect an oxidation treatment. The precipitate was collected by filtration, dried and heat-treated in air at 900° C. for 24 hr.

The microstructure of the resultant powder was analyzed by X-ray diffractometry. As a result, $LiMn_2O_4$ and $TiO_2$ were identified. The microstructure was as shown in FIG. 1, that is, the same as that of the metallic compound of Example 1.

EXAMPLE 4

In Example 4, use was made of an ultrafine powder which, as such, was acicular.

The ultrafine powder comprised $TiO_2$ having a major axis of 3 μm and a minor axis of 0.05 μm. Other conditions were the same as those used in Example 3. Thus, a metallic compound was provided.

The resultant powder was analyzed by X-ray diffractometry. As a result, $LiMn_2O_4$ and $TiO_2$ were identified. In this Example as well, the metallic compound was the same as that of Example 3.

EXAMPLE 5

In this Example, a chelating agent was added to a raw material solution to prepare a precipitate of a metallic compound.

Specifically, 75 g of $MnSO_4$ was dissolved in 500 ml of water, and 60 ml of ethylenediamine was added as a chelating agent to the solution. 1 N aqueous ammonia was gradually added to the solution with stirring. Oxygen was blown into the solution containing the resultant precipitate at a flow rate of 100 ml/min for 5 hr to effect an oxidation treatment. The precipitate was collected by filtration, dried and heat-treated in air at 300° C. for 10 hr to provide a manganese dioxide ($MnO_2$) powder.

The microstructure of the precipitate was observed under an electron microscope. As a result, it was found that, as shown in FIG. 1, acicular particles 1 having a minor axis of 1 μm or less and a major axis of about 3 μm were grown.

Then, 40 g of the $MnO_2$ precipitate was placed in 500 ml of a 4 N LiOH solution, and a reaction was allowed to proceed at 70° C. for 5 hr. The reaction mixture was filtered and dried. The dried product was heat-treated at 900° C. for 24 hr.

The resultant powder was subjected to X-ray diffraction analysis. As a result, $LiMn_2O_4$ was identified. The microstructure of the powder was the same as that of the metallic compound of Example 1.

The formation of the above-described acicular microstructure will now be discussed.

In this example, a chelating agent which coordinates to a manganese ion is added to a manganese salt solution to partially effect the manganese ion. As a result, when the skeleton of the crystal of manganese oxide is formed to cause the growth of grains, the chelating agent exhibits a steric hindrance action to limit the direction of growth of grains. Therefore, it is considered that this causes the growth of grains to become unidirectional and renders the microstructure of the resultant manganese oxide acicular. When the manganese oxide thus obtained is reacted with a lithium compound, lithium is introduced into the manganese crystal to cause a structural change. Although this reaction brings the crystal of manganese to a new crystal structure, the acicular microstructure remains unchanged.

EXAMPLE 6

In Example 6, an acicular whisker was formed on the surface of a copper plate, peeled from the copper plate and used as an ultrafine powder.

Figure 4:
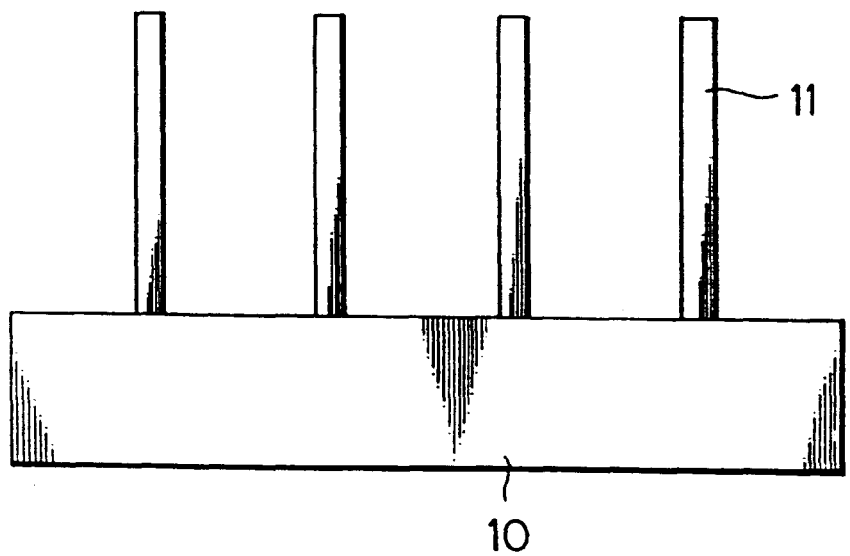
FIG. 4 is an explanatory view showing a method for the production of a metallic compound in Example 6.

Specifically, as shown in FIG. 4, at the outset, a copper plate 10 was subjected to an oxidation treatment in a 10% oxygen atmosphere at 730° C. for 1 hr to form an acicular whisker 11 having a minor axis of 0.3 μm and a major axis of 30 μm on the surface of the copper plate 10 as shown in the same drawing. The whisker 11 comprised copper oxide (CuO). The whisker 11 was peeled from the copper plate 10 and filtered for collection.

The CuO whisker 11 was placed in a raw material solution comprising 75 g of $MnSO_4$, 30 g of $Li_2SO_4$ and 500 ml of water. 1 N aqueous ammonia was gradually added to the solution with stirring. Oxygen was blown into the solution containing the resultant precipitate at a flow rate of 100 ml/min for 5 hr to effect an oxidation treatment. The precipitate was collected by filtration, dried and heat-treated in air at 600° C. for 24 hr.

Figure 5:
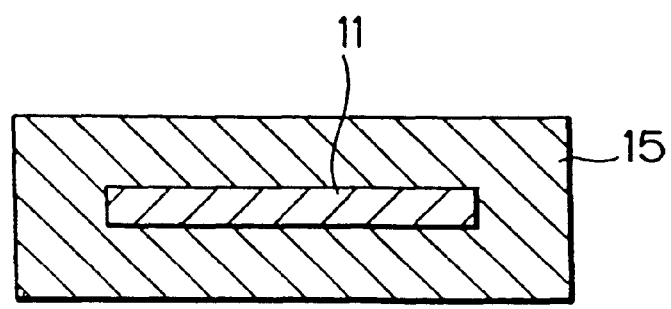
FIG. 5 is an explanatory view of a microstructure of a metallic compound produced in Example 6.

The resultant powder was observed. As a result, it was found that, as shown in FIG. 5, the whole surface of the whisker 11 was covered with a metallic compound 15 ($LiMn_2O_4$). The microstructure of the metallic compound was the same as that of the metallic compound produced in Example 1. Thickness of the metallic compound 15 was 1 μm.

EXAMPLE 7

In this Example, an acicular whisker 11 was formed on the surface of the copper plate 10 in the same manner as that of Example 6 and, as such, used without peeling from the copper plate to provide an acicular metallic compound.

Figure 6:
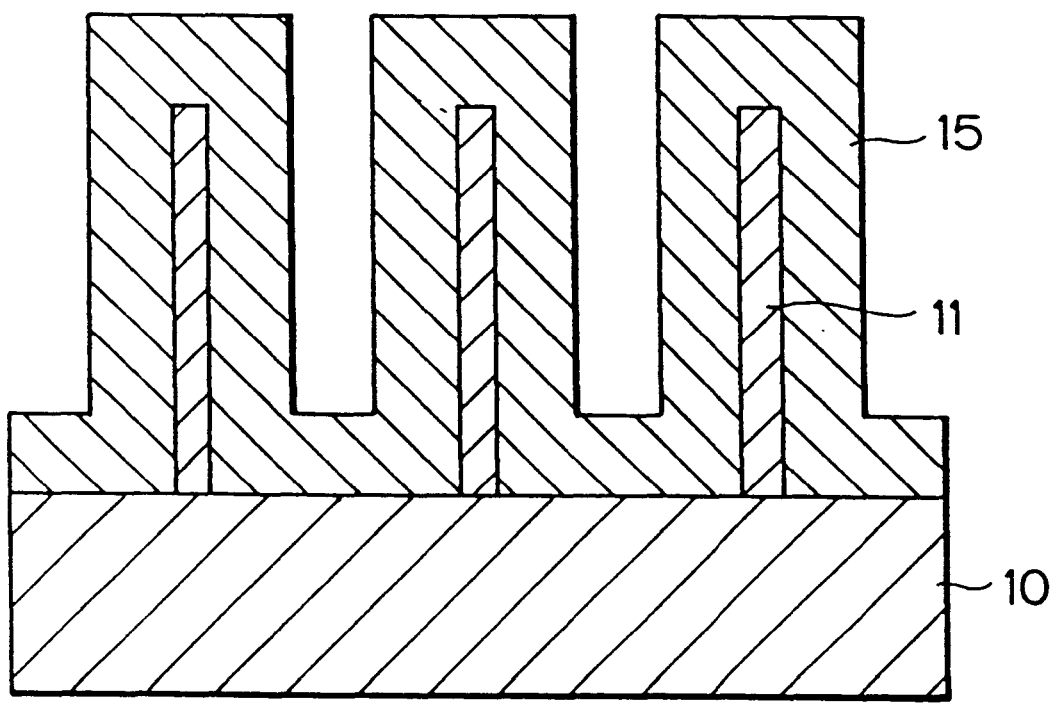
FIG. 6 is an explanatory view of a microstructure of a metallic compound produced in Example 7.

Specifically, at the outset, 0.5 mol of $LiOC_2H_5$ and 1 mol of $Mn(o-i-C_3H_7)$ were dissolved in 500 ml of ethanol, and water was added dropwise while heating and stirring the solution to provide a raw material solution in a sol form. The copper plate 10 provided with the whisker 11 was dipped in the raw material solution, taken out of the solution and heat-treated in air at 600° C. for 24 hr. Thus, as shown in FIG. 6, an acicular metallic compound 15 ($LiMn_2O_4$) covering the whisker 11 was formed on the copper plate 10.

The acicular metallic compound 15 together with the whisker 11 can be peeled from the copper plate 10 and used as an electrode active material. In FIG. 6, since the whisker 11 of copper oxide (CuO) is a semiconductor material, it has an electric conductivity. Further, since the copper plate 10 is a collector material, it can be used also as a positive electrode.

Other conditions are the same as those of Example 6.

EXAMPLE 8

A charge-discharge cycle test was effected in the same manner as that of Example 1, except that use was made of the metallic compounds capable of occluding or releasing lithium according to Examples 2 to 7. As a result, as with the metallic compound of Example 1, these metallic compounds exhibited excellent charge-discharge characteristics.

EXAMPLE 9

In Example 9, an increase in the apparent area of the positive electrode, a reduction or elimination of the amorphous region and an elimination of crystal defects and grain boundaries are attempted for the purpose of enhancing the apparent mobility of lithium ion in the positive electrode of a cell with a nonaqueous electrolyte, particularly a lithium secondary cell.

Specifically, the positive electrode for a lithium secondary cell is provided with a substrate and a positive active material comprising a lithium-containing metal oxide crystal grown into such a columnar form that the axis is inclined at the angle $0°≦θ<90°$ to the normal direction of the surface of the substrate.

A method for the production of a positive electrode according to the second aspect of the present invention using $Li_xWO_3$ as the positive active material will now be described.

A conductive plate was used as the substrate. $WO_3$ was used as a target. The substrate 22 and the target 24 were placed in a vacuum vessel 20, and the angle θ of the incident direction of particles from the target 24 to the normal of the substrate 22 was set at 75°. The vacuum vessel 20 was evacuated to $6.66×10^{-6}$ mbar, the temperature of the substrate 22 was maintained at 26° C., and sputtering was effected by applying an electron beam to the target 24 to deposit $WO_3$ at a deposition rate of 10 Å/sec.

Figure 8:
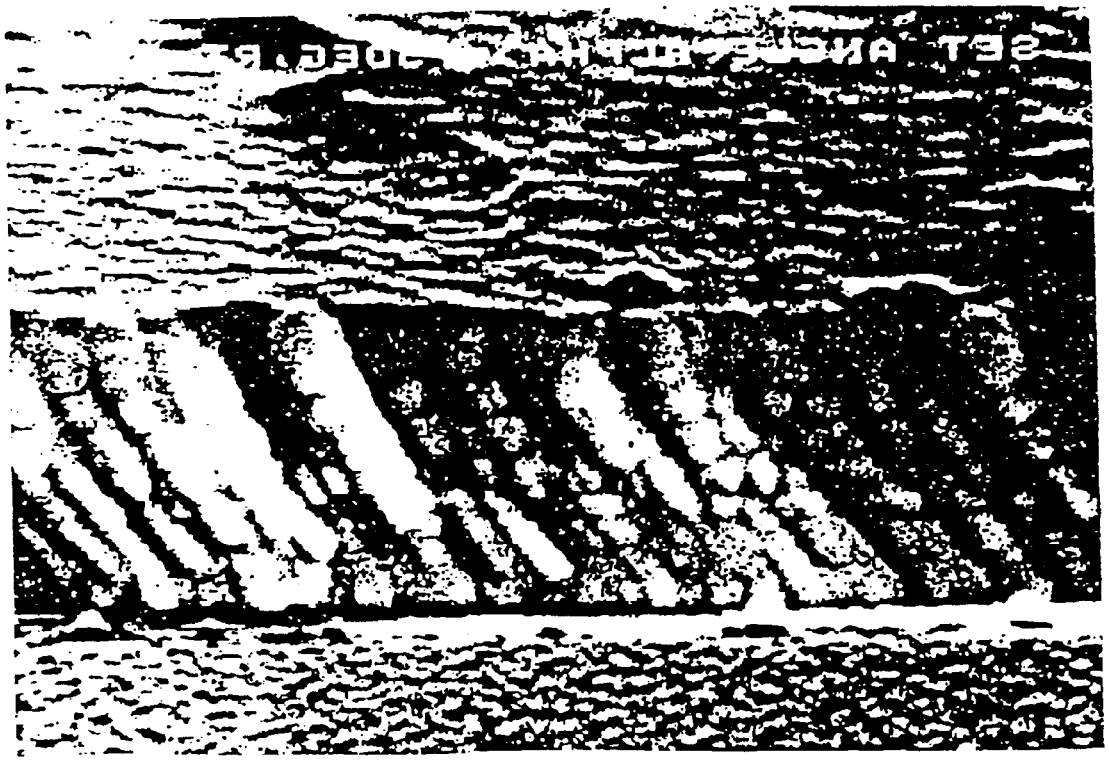
FIG. 8 is an electron photomicrograph showing a columnar crystal structure of $WO_3$ provided by an oblique incident vacuum deposition in Example 9.

Thus, a thin film of a metal oxide as shown in FIG. 8 was provided wherein columnar protrusions of $WO_3$ stood close together on the substrate 22. The columnar protrusions had a height of about 0.3 μm and a diameter of 0.04 μm. The adsorption of lithium on the columnar $WO_3$ provides a positive electrode for a lithium secondary cell of Example 9 wherein columnar protrusions of the positive active material $Li_xWO_3$ stand close together on the surface of the substrate.

EXAMPLE 10

Example 10 provides a positive electrode for a lithium secondary cell, comprising a conductive substrate and, provided on the surface of the substrate, a positive active material comprising a $LiMn_2O_4$ crystal consisting of one single crystal in the direction of the thickness thereof.

The thin film of a positive active material for a lithium secondary cell according to the third aspect of the present invention may be formed, for example, by the following method.

Figure 12A:
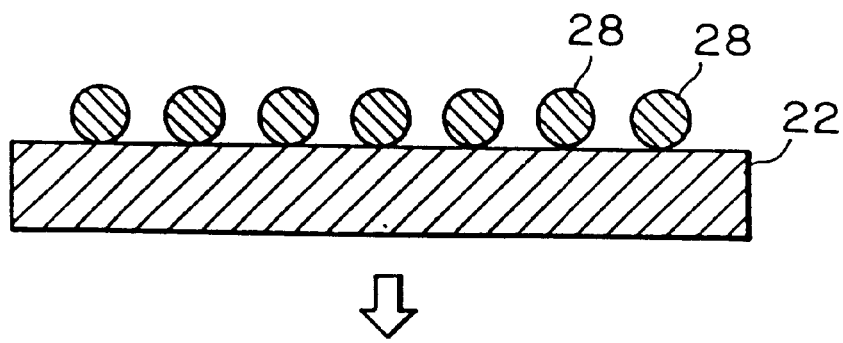
FIGS. 12A to 12C are explanatory conceptual diagrams showing a method for the formation of a single layer of a $LiMn_2O_4$ single crystal on a substrate in Example 10.
Figure 12B:
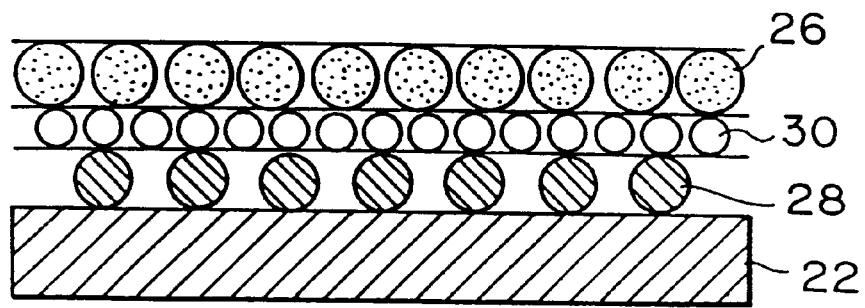
Figure 12C:
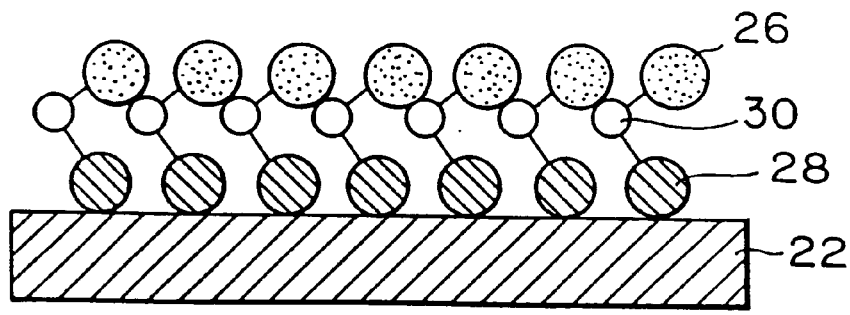

This method is based on atomic manipulation. As shown in FIGS. 12A to 12C, manganese atoms 28 are arranged on the surface of a substrate 22 in such a manner that they are coincident with the lattice constant of the Mn layer of $LiMn_2O_4$. Lithium atoms 30 and oxygen atoms 26 are separately laminated on the manganese atoms 28. The laminate is then heat-treated to form, on the substrate, a seed crystal comprising a single crystal of $LiMn_2O_4$ homogeneously formed on the whole surface of the substrate. Thereafter, using the seed crystal, $LiMn_2O_4$ is grown in the thicknesswise direction of the substrate to form a crystal in a thin film form.

One method for the growth of $LiMn_2O_4$ in the thicknesswise direction of the substrate is a solid phase epitaxial growth method which adopts the concept of single crystal growth by strip melting. In this method, each atomic layer of lithium, manganese and oxygen is laminated on the above-described single crystal formed on the substrate to a practical positive electrode thickness. Thereafter, the laminate is heated linearly from one end of the substrate with a heater to linearly heat-treat the each atomic layer laminated on the substrate. The heater is slowly moved to the other end of the substrate so that the heated portion is linearly moved with the other end to the movement of the heater. Thus, a crystal is grown from one end to the other end. Defects present in each atomic layer are collected at the other end by heating with the heater. The removal of the other end portion can provide a single crystal of $LiMn_2O_4$ grown on the whole surface of the substrate.

Another method is a method which can be called a "raw material melt immersion/pull-up method". In this method, a seed crystal comprising a single crystal of $LiMn_2O_4$ having several atomic layers is produced in the same manner as that used in the production of a single crystal of $LiMn_2O_4$ having a single layer structure on the surface of the substrate. The seed crystal is dipped in a raw material melt for $LiMn_2O_4$ and slowly pulled up to grow a single crystal of $LiMn_2O_4$ to a thickness suitable as the positive electrode.

EXAMPLE 11

Example 11 provides a positive electrode for a cell with a nonaqueous electrolyte using as the positive active material a metallic compound capable of occluding or releasing lithium, wherein the positive electrode comprises a collector core and a positive active material covering the surface of the collector core, the collector core comprises a collector material selected from a metal, a carbon fiber and a graphite fiber and has a surface provided with a collector protrusion protruded into the positive active material. In Example 11, the most noticeable feature is that the collector core has a surface provided with a collector protrusion protruded into the positive active material.

The positive electrode for a cell with a nonaqueous electrolyte according to Example 11 will now be described in more detail with reference to FIG. 13.

In a positive electrode 32 for the cell with a nonaqueous electrolyte, a metallic compound capable of occluding or releasing lithium is used as a positive active material 34. The positive electrode 32 comprises a collector core 36 and a positive active material 34 covering the surface of the collector core. The collector core 36 comprises a metallic collector material. The surface of the collector core 36 is provided with a collector protrusion 38 protruded into the positive active material 34.

The collector protrusion 38 comprises a protrusion 40 and a recess 42 and is in a striped uneven form. The collector protrusion 38 is formed by chemical processing using photolithography and etching. The width of the protrusion 40 is 2 μm. The width of the recess 42 is 15 μm. The difference in level between the protrusion 40 and the recess 42 is 20 μm. The thickness of the positive active material 34 is 25 μm.

The positive active material 34 comprises 90% by weight of a metallic compound comprising $LiMn_2O_4$, 6% by weight of a conductive agent comprising carbon and a binder comprising teflon. The collector core 36 comprises a collector material of Al (aluminum). The positive active material 34 is coated on the surface of the surface of the collector core 36 at its portions between the collector protrusions 38.

When the positive electrode 32 according to the present example is used, it is irmnersed together with a negative electrode in an electrolyte containing lithium.

The function and effect of the present example will now be described.

In the present example, the collector core 36 comprises a collector material of aluminum having a good electric conductivity. Therefore, the collector core 36 serves as an excellent electron transfer passage.

On the other hand, the positive active material 34 covering the surface of the collector core 36 serves as a site for the oxidation and reduction reactions of lithium.

The surface of the collector 36 is provided with an uneven collector protrusion 38 protruded into the positive active material 34, so that the migration distance of electrons to the site for the oxidation and reduction reactions becomes short. Further, the electronic conductivity within the positive active material 34 becomes homogeneous.

This reduces the internal resistance of the positive electrode 32. Therefore, it becomes possible to prevent the heterogeneous oxidation and reduction reaction within the positive electrode 32 and the voltage drop attributable to the internal resistance, which contributes to an increase in the energy capacity.

Further, since the surface of the collector core 36 is provided with the collector protrusion 38 protruded into the positive active material 34, the surface area of the collector core 36 is so large that the area of emission of electrons within the collector core 36 to the positive active material 34 becomes large. This enables a large amount of electrons to be emitted, which contributes to an increase in the energy capacity of the positive electrode 32 in the charging and discharging.

EXAMPLE 12

Figure 14:
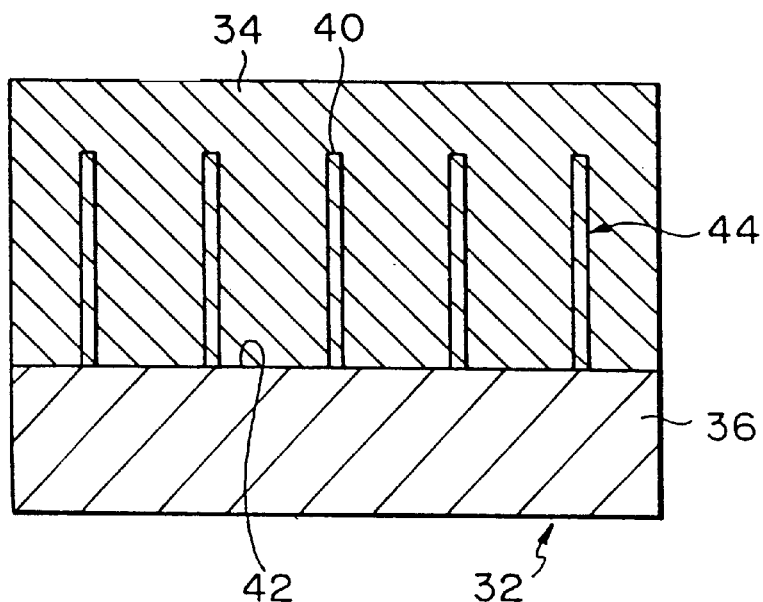
FIG. 14 is a cross-sectional view of a positive electrode in Example 12.
Figure 15:
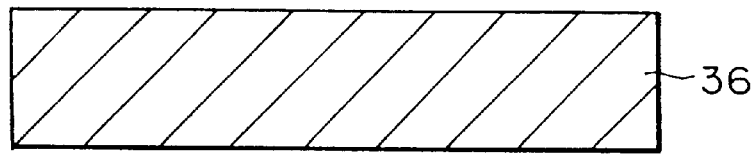
FIG. 15 is an explanatory view of a method for the production of a positive electrode in Example 12.
Figure 16:
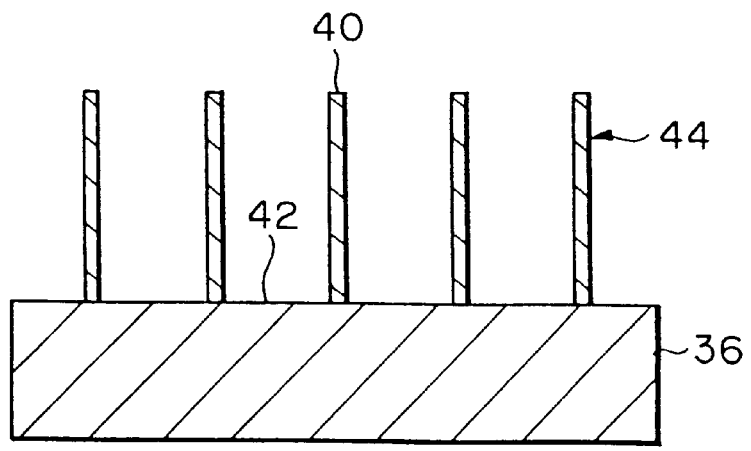
FIG. 16 is an explanatory view of a method for the production of a positive electrode in Example 12.

Example 12 provides a positive electrode as shown in FIGS. 14 to 16, wherein the collector protrusion comprises an oxide semiconductor produced by oxidizing a collector core. The oxide semiconductor comprises CuO.

Specifically, as shown in FIG. 14, the collector protrusion 44 is protruded from the surface of the collector core 36 into the positive active material 34.

In the formation of the collector protrusion 44, at the outset, a collector core 36 comprising a copper plate as shown in FIG. 15 is provided. Then, it is subjected to an oxidation treatment in a 10% oxygen atmosphere at 730° C. for 1 hr. This causes an acicular collector protrusion 44 as shown in FIG. 16 to be formed on the surface of the collector core 36. The collector protrusion 44 comprises a CuO whisker.

In the collector protrusion 44, the width of the protrusion 40 and the width of the recess 42 are about 0.2 $\mu$m and about 1.5 $\mu$m, respectively. The difference in level between the protrusion 40 and the recess 42 is 30 $\mu$m. The thickness and height of the collector protrusion 44 can be regulated by varying the oxygen atmosphere, temperature, time and other conditions of the oxidation treatment.

Other conditions are the same as those of Example 11.

Further, it is possible to attain the same effect of that of Example 11.

In the present example, although the collector protrusion comprises CuO, it is also possible for the collector protrusion to comprise other material, such as $TiO_2$ or ZnO. In this case, titanium, zinc or the like can be used as the collector material that is subjected to an oxidation treatment in the same manner as that described above to form a collector protrusion as an oxide whisker.

EXAMPLE 13

Figure 17:
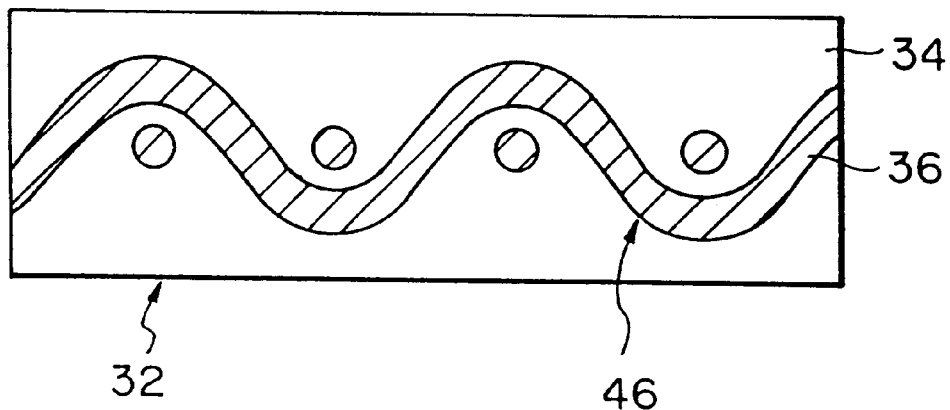
FIG. 17 is a cross-sectional view of a positive electrode in Example 13.

In Example 13, as shown in FIG. 17, the collector core 36, as such, comprises a material 46 in a network form. The network material 46 is formed by molding a collector material having a diameter of 18 $\mu$m and comprising Al-1% Si into filaments that are then put together for a network.

The positive active material 34 comprises $LiMn_2O_4$ as a metallic compound. Other conditions are the same as those used in Example 11. Also in this example, it is possible to attain the same effect as that of Example 11.

Example 14

Figure 18:
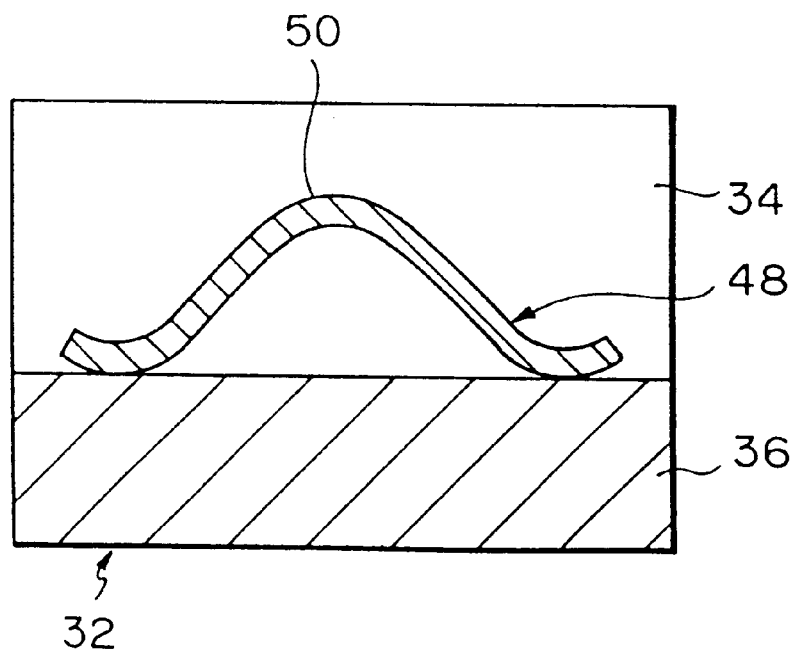
FIG. 18 is a cross-sectional view of a positive electrode in Example 14.

In Example 14, as shown in FIG. 18, the collector protrusion 48 formed on the surface of the collector core 36 comprises a loop material. The loop material is formed by forming a number of wires 50 comprising a collector material into a loop in an arc form that is intermittently adhered to the surface of the collector core 36.

That is, the wire 50 is adhered to the surface of the collector core 36 with part of the wire protruded into the positive active material 34. The wire 50 has a difference in level of 30 $\mu$m and is joined to the surface of the collector core at intervals of 200 $\mu$m, and the wire 50 intermittently forms the collector protrusion 48 on the surface of the collector core 36. The wire 50 comprises Al-1% Si as the collector material and has a diameter of 18 $\mu$m.

The collector core 36 Al as a collector material, and the positive active material 34 comprises $LiMn_2O_4$ as a metallic compound. Other conditions are the same as those used in Example 11.

Also in this example, it is possible to attain the same effect as that of Example 11.

EXAMPLE 15

Example 15 provides a positive electrode for a cell with a nonaqueous electrolyte using as a positive active material a metallic compound capable of occluding or releasing lithium, wherein the positive electrode comprises a collector core, a positive active material covering the surface of the collector core, the collector core comprises a collector material selected from the group consisting of a metal, a carbon fiber and a graphite fiber and the positive active material contains a conductive chip.

In Example 15, the most noticeable feature is that the positive active material contains a number of conductive chips.

Figure 19:
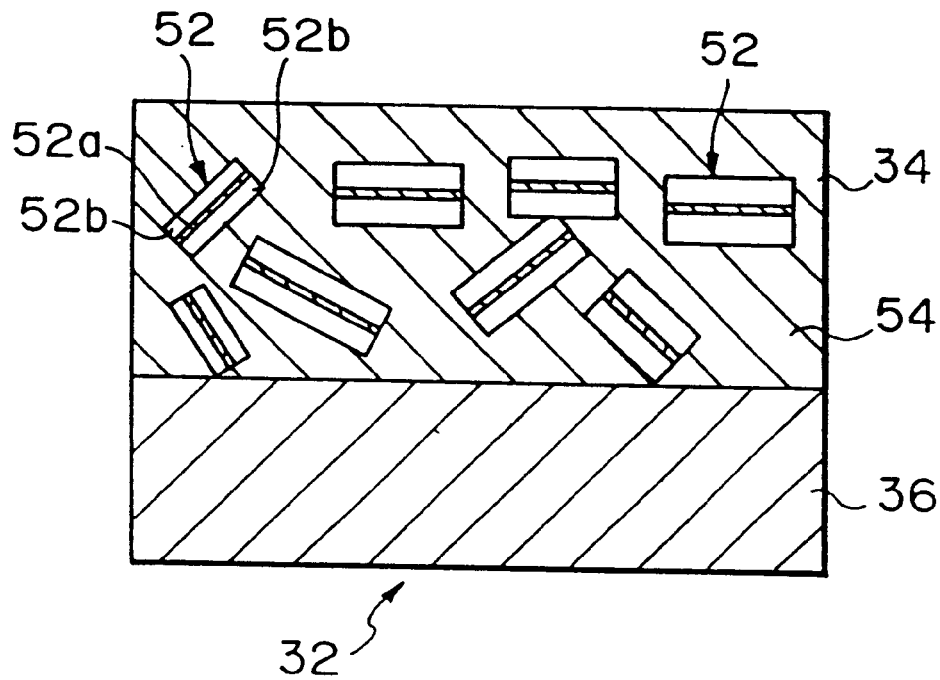
FIG. 19 is a cross-sectional view of a positive electrode in Example 15.

The positive electrode according to Example 15, as shown in FIG. 19, the positive active material 34 contains a laminate 52 as the conductive chip. The laminate 52 comprises a conductive foil 52a and, laminated thereon, a compound foil 52b of the above-described metallic compound. The laminate 52 is provided on the surface of the collector core 36 by molding with a binder 54.

The laminate 52 comprises a conductive foil 52a and, laminated on both surfaces thereof, a compound foil 52b. The conductive foil 52a comprises Al (aluminum) as a collector material, and the compound foil 52b comprises $LiMn_2O_4$ as a metallic compound. The laminate 52 is in the form of a strip having a length of about 50 $\mu$m, a width of 50 $\mu$m and a thickness of about 10 $\mu$m. The compound foil 52b has a thickness of 5 $\mu$m, and the conductive foil 52a has a thickness of 100 nm. The thickness of the positive active material 34 is about 100 $\mu$m.

In the present example, although the positive active material 34 contains a laminate 52 as the conductive chip, an aggregate of laminates 52 may also be used as the positive active material 34 and provided on the surface of the collector core 36 by molding with a binder 54.

A method for the production of the laminate 52 will now be described.

Figure 20:
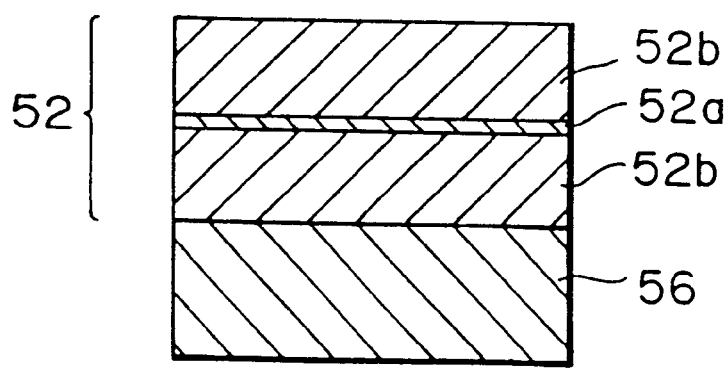
FIG. 20 is an explanatory view showing a method for the production of a laminate in Example 15.

As shown in FIG. 20, a metallic compound is vapor-deposited on a temporary substrate 56 for vapor deposition, thereby forming a compound foil 52b. A collector material is then vapor-deposited on the surface of the compound foil 52b to form a conductive foil 52a. Thereafter, the same metallic compound as described above is vapor-deposited on the surface of the conductive foil 52a to form a compound foil 52b. Thus, a laminate 52 is formed on the substrate 56. Then, the laminate 52 is peeled from the substrate 56, collected and ground, thereby providing a laminate 52 comprising a conductive foil 52a and a compound foil 52b covering the surface of the conductive foil 52a as shown in FIG. 19. Thereafter, the laminate 52 is mixed with a binder 54, and the mixture is coated on the surface of the collector core 36.

Other conditions are the same as those of Example 11.

The function and effect of the present example will now be described.

In the present example, since the positive active material 34 contains a laminate 52 as the conductive chip, the electronic conductivity within, the positive active material 34 becomes so homogeneous that the internal resistance can be reduced.

This enables the heterogeneous oxidation and reduction reactions within the positive electrode 32 and the voltage drop attributable to the internal resistance to be prevented, which contributes to an increase in the energy capacity.

Further, it is possible to attain the same effect as that of Example 11.

EXAMPLE 16

Figure 21:
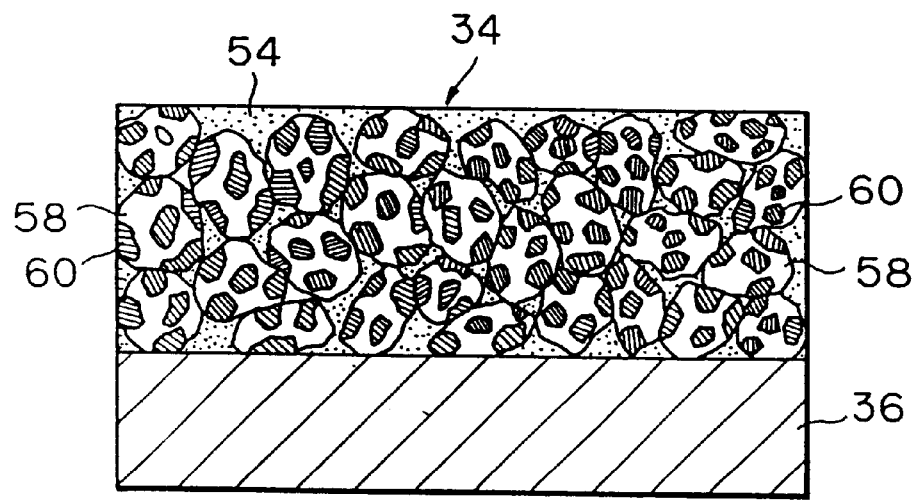
FIG. 21 is a cross-sectional view of a positive electrode in Example 16.

Example 16 provides a positive active material wherein, as shown in FIG. 21, the conductive chip comprises a coating 60 covering part of the surface of grains 58 of a metallic compound.

The positive active material is formed by mixing grains 58 having a surface covered with a coating 60 with a binder 54. The coating 60 comprises copper as a collector material. On the other hand, the grains 58 comprise $LiMn_2O_4$ as a metallic compound powder. The thickness of the coating 60 is 0.05 $\mu$m, and the coverage is about 35%. The coating 60 is formed by electroless plating. Specifically, the metallic compound powder is dipped in a plating solution containing copper to deposit copper on the surface of the grains 58.

Other conditions are the same as those of Example 15.

The function and effect of the present invention will now be described.

In the present example, since the coating 60 having a high electric conductivity covers part of the surface of the grains 58, the coating 60 comes into contact with adjacent other grains 58.

As a result, a three-dimensional electronic channel is formed within the positive active material 34, which imparts an excellent electric conductivity to the positive active material 34 according to the present example.

Further, it is possible to attain the same effect as that of Example 15.

EXAMPLE 17

Figure 22:
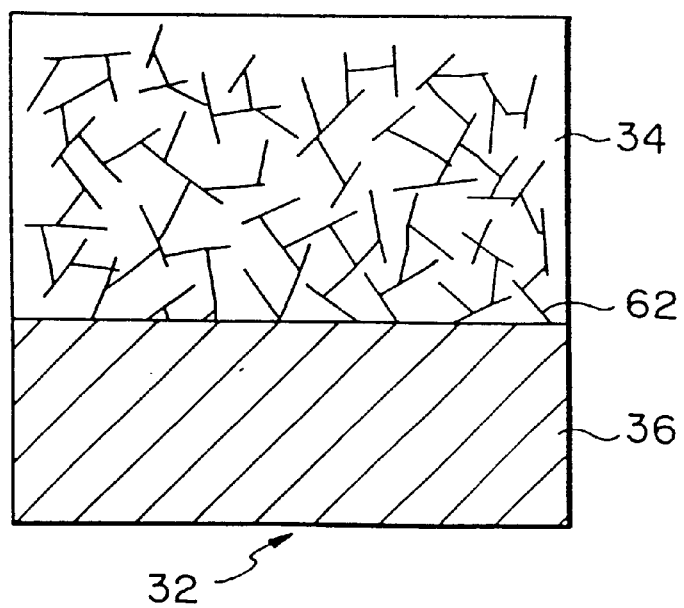
FIG. 22 is a cross-sectional view of a positive electrode in Example 17.

Example 17 provides a positive electrode wherein, as shown in FIG. 22, the positive active material 34 contains a number of fibers 62 as a conductive chip. The individual fibers 62 are in contact with one another. The fiber 62 comprises a graphite fiber as a collector material. The fiber 62 has a diameter of 2 to 7 $\mu$m and an aspect ratio of 5 to 70. The fiber 62 is mixed with a metallic compound and a binder to form a positive active material 34. The content of the fiber 62 of the positive active material 34 is 6% by weight.

Other conditions are the same as those of Example 15.

In the present example, a number of fibers 62 having a high electric conductivity is incorporated into the positive active material 34, and the fibers 62 are in contact with one another. As a result, a three-dimensional electronic channel is formed within the positive active material 34, which imparts an excellent electric conductivity to the positive active material 34. Further, also in this example, it is possible to attain the same effect as that of Example 15.

EXAMPLE 18

In this example, charge-discharge cycle tests as in Examples 11 to 17 were effected using the positive electrode according to Example 11. In this test, a cell with a nonaqueous electrolyte was assembled using the above-described positive electrode, metallic lithium as a negative electrode, an electrolyte comprising a solution of lithium perchlorate dissolved in propylene carbonate. The cell with a nonaqueous electrolyte is a button cell having a diameter of 20 mm and a height of 3.2 mm. The button cell was subjected to the repetition of a charge-discharge test wherein the cell was charged at a constant current of 0.5 mA/cm$^2$ and an upper limit voltage of 4.1 V for 5 hr and then discharged to 2 V. At that time, the discharge capacity for each discharging was measured.

For comparison, a collector core having no collector protrusion on its surface was formed, and the surface thereof was covered with a positive active material to a positive electrode. Other conditions were the same as those of Example 11. The comparative positive electrode thus obtained was applied as Comparative Example 2 to the above-described test.

Figure 23:
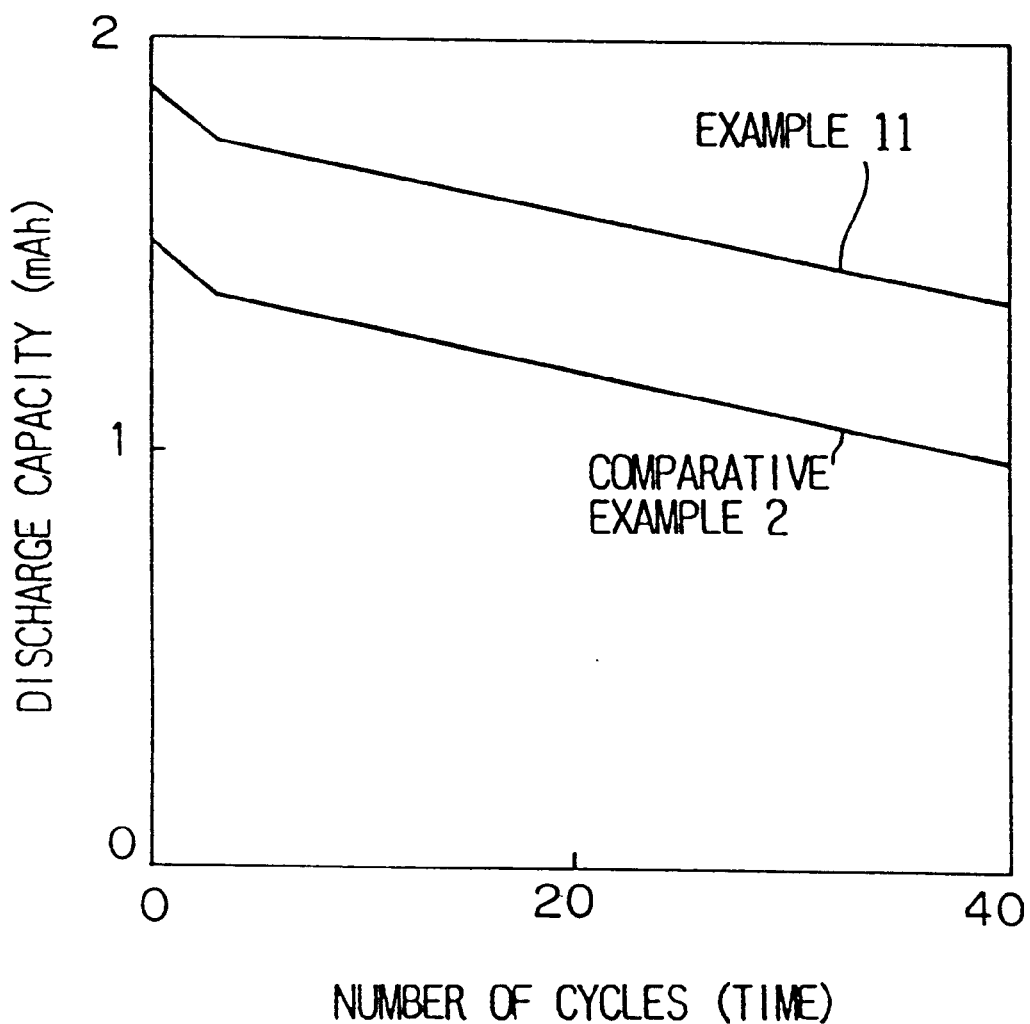
FIG. 23 is a diagram showing the results of a charge-discharge cycle test in Example 18.

Test results are shown in FIG. 23. As can be seen from the drawing, the positive electrode according to Example 11 exhibited a higher discharge capacity than that according to Comparative Example 2.

The positive electrodes according to Examples 12 to 17 were also subjected to a charge-discharge cycle test in the same manner as that described above. As a result, as with the positive electrode according to Example 11, they exhibited an excellent discharge capacity.

EXAMPLE 19

Example 19 provides a positive electrode for a lithium secondary cell using as a positive active material a metallic compound powder capable of occluding or releasing lithium, wherein the metallic compound powder comprises a single crystal or an aggregate of a plurality of single crystals and has a particle diameter in the range of from 1 to 20 $\mu$m and the single crystal has a grain diameter in the range of from 0.1 to 20 $\mu$m.

The positive electrode for a lithium secondary cell according to Example 19 will now be described with reference to FIGS. 24 and 25.

Figure 24:
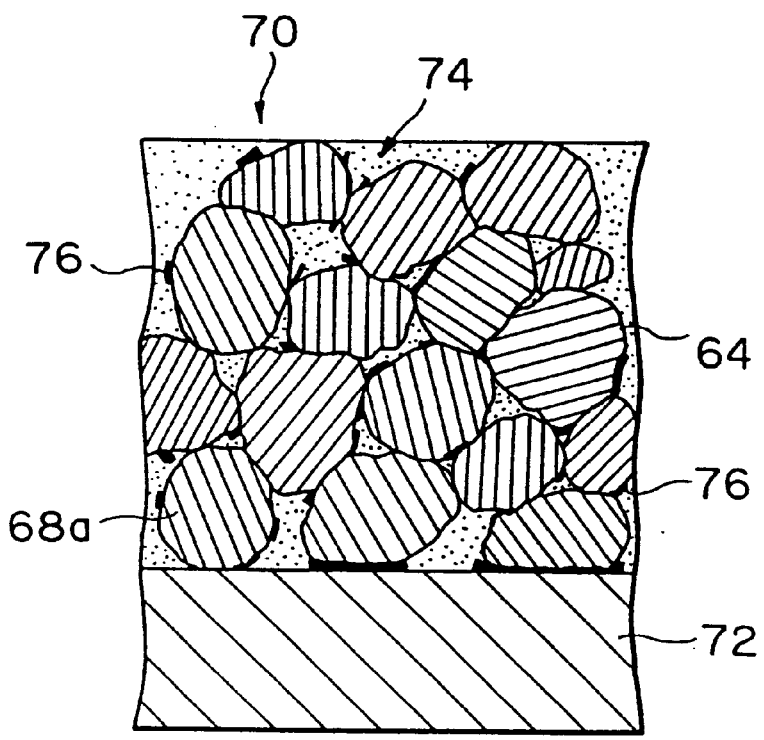
FIG. 24 is a cross-sectional view of a positive electrode for a lithium secondary cell in Example 19.

As shown in FIG. 24, in the positive electrode for a lithium secondary cell according to this example, a metallic compound powder 64 capable of occluding or releasing lithium is used as a positive active material. The metallic compound powder 64 comprises a single crystal or an aggregate of a plurality of single crystals.

Figures 25A, 25B:
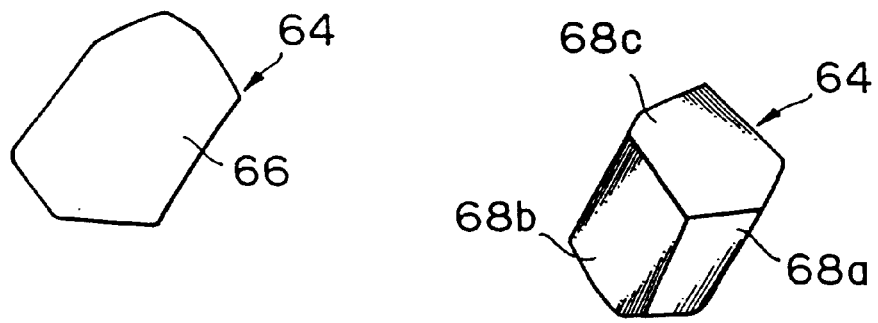
FIG. 25 is an explanatory view of a metallic compound powder in Example 19.

Specifically, the metallic compound powder 64 comprises a single crystal 66 shown in FIG. 25A or an aggregate of a plurality of single crystals 68a, 68b and 68c shown in FIG. 25B. When the metallic compound powder 64 comprises an aggregate of a plurality of single crystals, the number of single crystals is as small as possible and the aggregate has a structure close to a single crystal. The metallic compound powder 64 comprises $LiMn_2O_4$ and has a particle diameter in the range of from 1 to 20 μm. As shown in FIG. 24, the positive electrode 70 for a lithium secondary cell comprises a collector 72 of an aluminum foil and a positive electrode material 74 covering the collector 72. The positive electrode material 74 can be provided by adding an admixture 76 comprising a conductive agent and a binder to the metallic compound powder 70 and kneading them with each other. The positive active material 74 can be provided also by stirring the metallic compound powder 70 with the admixture 76 in a liquid phase. Carbon materials, such as graphite particles, are used as the conductive agent. Fluororesins, such as teflon, are used as the binder.

A method for the production of the positive electrode for a lithium secondary cell will now be described.

In the production of the metallic compound powder, at the outset, LiOH and $MnO_2$ were weighed in a Li to Mn molar ratio of 1:2, 0.5% by weight of $Li_3PO_4$ as a lithium salt was added thereto, and they were mixed with each other. The mixture was heat-sintered in air at 850° C. for 3 hr to provide a metallic compound powder.

The metallic compound powder was subjected to X-ray diffraction analysis. As a result, $LiMn_2O_4$ was identified, and particles having an average particle diameter of 5 μm were observed. Further, the metallic compound powder was observed under a transmission electron microscope. As a result, it was confirmed that the above-described particles are substantially in a single crystal form.

Then, the metallic compound powder, conductive agent and binder were mixed with each other in a weight ratio of 9:0.6:0.4, and the mixture was coated on a collector. Thus, a positive electrode for a lithium secondary cell was provided.

EXAMPLE 20

In Example 20, a metallic compound powder was produced in the same manner as that of Example 19, except that 1% by weight of $LiNO_3$ as a lithium salt was added to raw materials constituting the metallic compound powder 64 of Example 19, that is, a mixture of LiOH with $MnO_2$, and the mixture was sintered in air at 470° C. for 3 hr.

A positive electrode for a lithium secondary cell was prepared in the same manner as that of Example 19, except that use was made of this metallic compound powder.

EXAMPLE 21

In Example 21, lithium secondary cells were prepared using positive electrodes for a lithium secondary cell provided in Examples 19 and 20 and subjected to the measurement of a change in the cell capacity of the positive electrode with the discharge current density.

In the above-described lithium secondary cells, lithium metal was used as a negative electrode, and polypropylene carbonate containing 1 mol/liter of lithium perchlorate was used as an electrolyte, and a polypropylene nonwoven fabric was used as a separator. The lithium secondary cells are a button cell having a diameter of 20 mm and a thickness of 3.2 mm.

The above-described measurement was effected at a discharge current density of 0.2 $mA/cm^2$.

For comparison, a metallic compound powder (Comparative Example 3) was produced without adding any lithium salt. The positive active material comprised an aggregate of polycrystal grains. This positive electrode was used to provide a lithium secondary cell that was then subjected to the measurement of a change in the cell capacity of the positive electrode with the discharge current density in the same manner as that described above.

Figure 26:
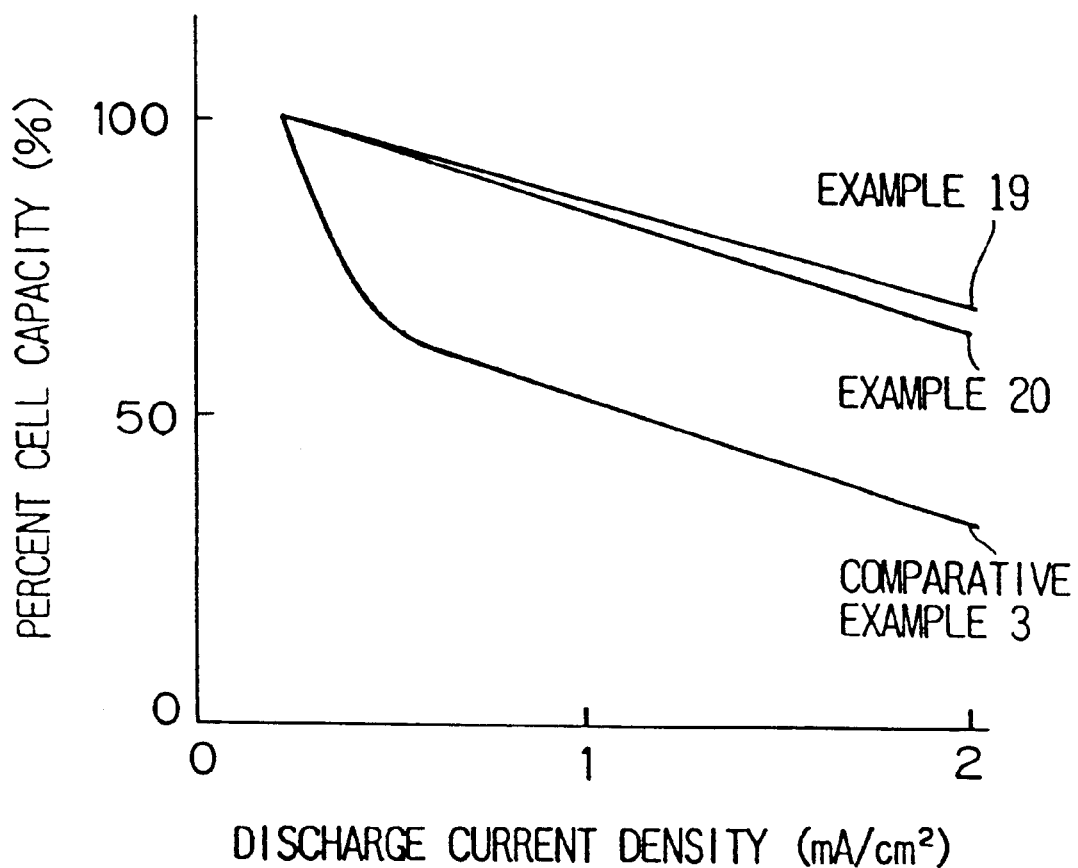
FIG. 26 is a graph showing the relationship between the discharge current density and the percentage cell capacity of a lithium secondary cell in Example 21.

The results are shown in FIG. 26.

As can be seen from the drawing, the degree of a lowering in the cell capacity for the metallic compound powders (Examples 19 and 20) according to the present invention was smaller than that for the metallic compound powder (Comparative Example 3) comprising an aggregate of polycrystal grains. Further, the metallic compound powders according to the present invention offered excellent charge-discharge cycle characteristics.

EXAMPLE 22

Example 22 provides a positive electrode for a lithium secondary cell using as a positive active material a metallic compound powder capable of occluding or releasing lithium, wherein the metallic compound powder comprises a Li—Mn—Cu—O-based lithium compound having a Cu to Mn molar ratio of 0.2 or less.

A method for the production of the positive electrode for a lithium secondary cell will now be described.

In the production of a positive active material, at the outset, LiOH, $MnO_2$ and CuO were used as raw materials for constituting the positive active material. These raw materials were mixed with each other in a Li:Mn:Cu molar ratio of substantially 0.5:1:x ($0.01 \leq x \leq 0.2$). Then, the raw material mixture was sintered in air at 800° C. to provide a metallic compound powder.

Figure 27:
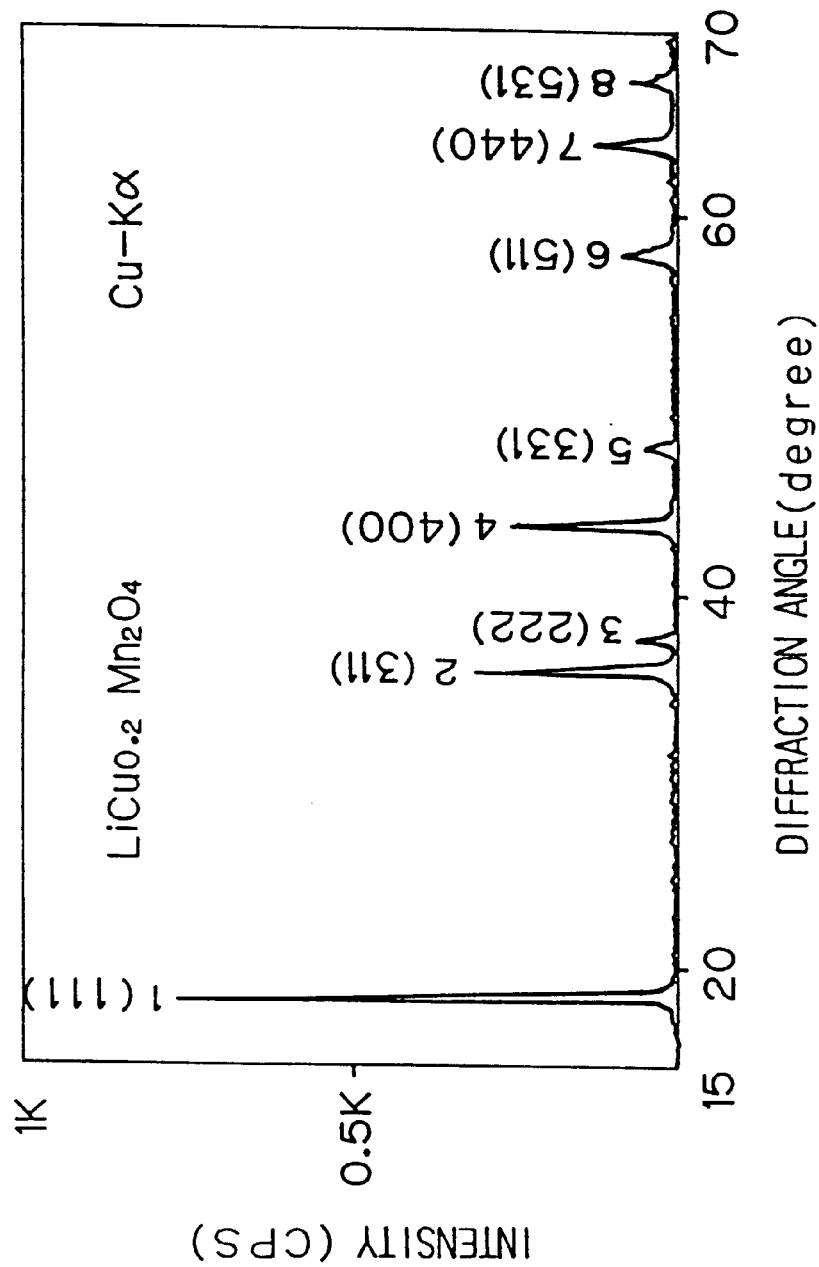
FIG. 27 is a diagram showing the results of an X-ray diffraction of a metallic compound powder in Example 22.

The metallic compound powder was analyzed by X-ray diffractometry. As a result, it was found that, as shown in FIG. 27, the metallic compound powder had a structure comprising a spinel phase in a single phase form.

Figure 28:
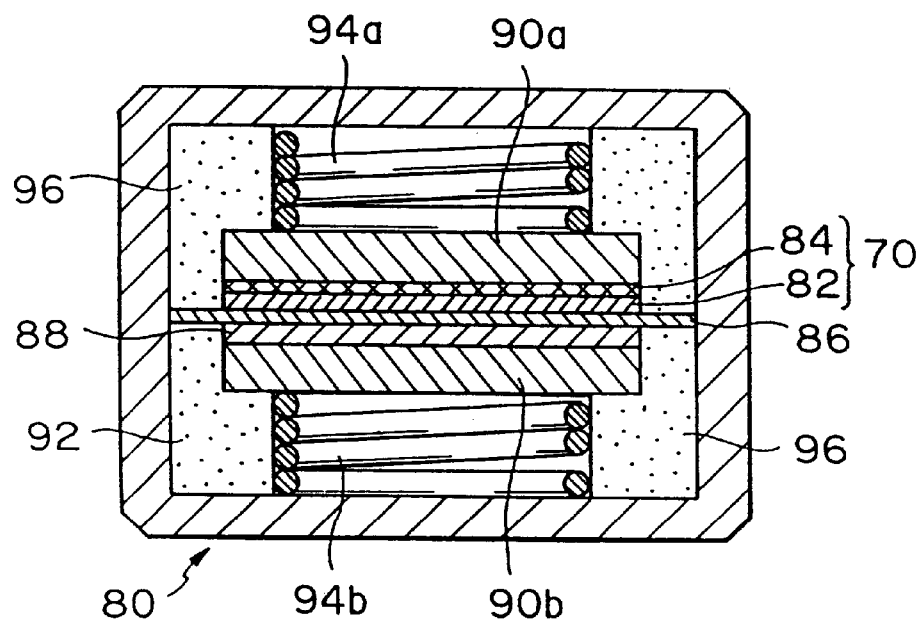
FIG. 28 is a cross-sectional view of a test cell of a lithium secondary cell in Example 22.

A test cell 80 for a lithium secondary cell shown in FIG. 28 was prepared using the above-described metallic compound powder as the positive active material, and the charge-discharge cycle characteristics were examined.

Specifically, 90% by weight of the metallic compound powder, 6% by weight of Ketjen Black and 4% by weight of teflon were mixed with each other to provide a positive electrode composite 82. The positive electrode composite 82 was then contact-bonded on a collector 84 to provide a positive electrode 70. The collector 84 comprised a stainless steel mesh. Then, a separator 86 comprising a polypropylene was provided, and the positive electrode 70 was disposed on one surface thereof with a negative electrode 88 comprising lithium metal disposed on the other surface thereof. Thereafter, stainless steel electrodes 90a, 90b were laminated respectively on the upper surface of the collector 84 and the lower surface of the negative electrode 88. These laminates were fixed by springs 94a, 94b fastened to the cell 92. The cell 92 was filled with an electrolyte 96. The electrolyte 96 comprised a solvent comprising a mixture of PC (polypropylene carbonate) with an equal volume of DME (1,2-dimethoxyethane) and, added thereto, 1 mol/liter of lithium perchlorate.

For comparison, a comparative test cell for a lithium secondary cell was prepared in the same manner as that described above, except that a Li—Mn—O-based metallic compound powder not containing copper was used as the positive active material (Comparative Example 4).

The above-described test cells were charged and discharged repeatedly to measure a change in the cell capacity.

Figure 29:
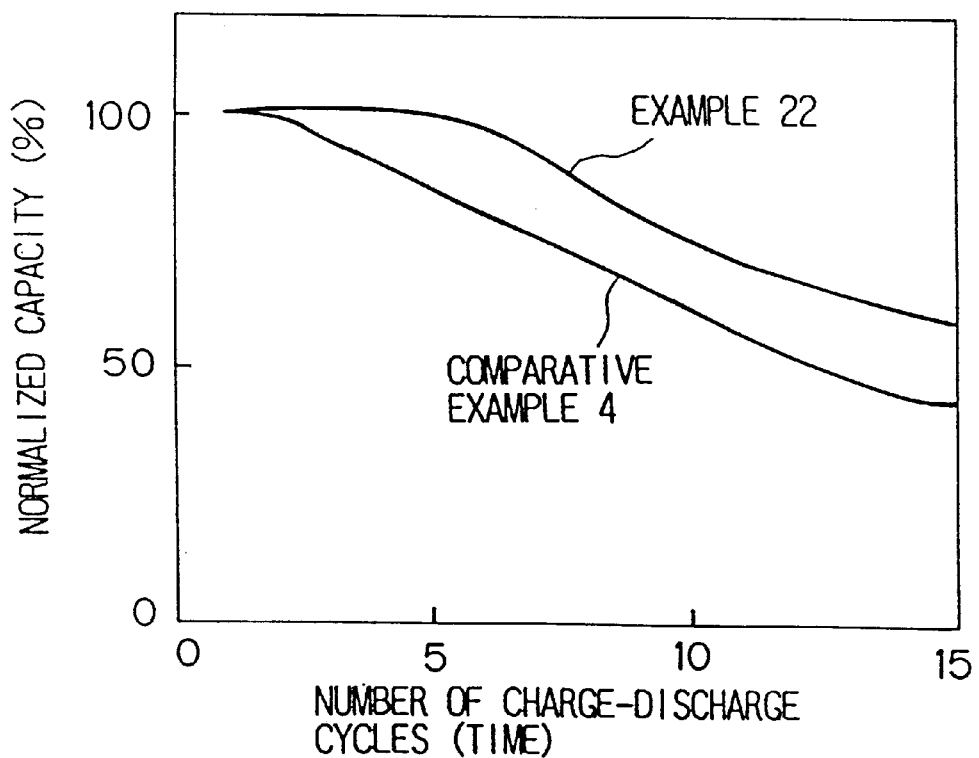
FIG. 29 is a graph showing the relationship between the number of cycles and the normalized capacity of a lithium secondary cell in Example 22.

Charging was effected to 4.1 V at 1.5 mA/cm$^2$, and discharging was effected to 2.0 V at 1.5 mA/cm$^2$. The results are shown in FIG. 29. In the drawing, the abscissa represents the number of charge-discharge cycles for the test cell, and the ordinate represents the normalized capacity for the lithium secondary cell. The term "normalized capacity" used herein is intended to mean the ratio of discharge capacity in each cycle to the initial discharge capacity.

As can be seen from the drawing, the positive electrode for a lithium secondary cell according to the present example (Example 22) always exhibited a higher cell capacity than the positive electrode according to Comparative Example 2 even when the number of charge-discharge cycles were increased.

EXAMPLE 23

Example 23 provides an electrode for a cell with a nonaqueous electrolyte using as an electrode active material a metallic compound powder capable of occluding or releasing lithium, wherein the metallic compound powder comprises an aggregate of polycrystal grains and contains an ultrafine powder, and the ultrafine powder is present within the grains and/or at grain boundaries of the polycrystal grains.

In the present example, the most noticeable feature is that the ultrafine powder is present within the grains and/or at grain boundaries of the polycrystal grains of the metallic compound.

The electrode for a cell with a nonaqueous electrolyte according to Example 23 will now be described with reference to FIG. 30.

In the electrode for a cell with a nonaqueous electrolyte according to the present example, a powder 100 of a metallic compound capable of occluding or releasing lithium is used as an electrode active material. The powder 100 of the metallic compound comprises an aggregate of polycrystal grains 102 and contains an ultrafine powder 104. The ultrafine powder 104 is present within the polycrystal grains 102.

In the production of the above-described powder 100 of the metallic compound, at the outset, LiI (lithium iodide) and MnO$_2$ (manganese dioxide) were weighed in a Li to Mn molar ratio of 1:2 and mixed with each other. An ultrafine powder of Si$_3$N$_4$ was added to the mixture so as to provide a Si$_3$N$_4$ content of the metallic compound of 3% by volume, and they were mixed with each other. The added ultrafine powder is nonreactive with the mixture of LiI with MnO$_2$.

The mixture was heat-sintered by hot pressing in a N$_2$ atmosphere at 900° C. and 30 MPa for 60 min. Thus, a powder 168 of a metallic compound was provided.

Thereafter, the microstructure of the metallic compound was observed. As a result, it was found that, as shown in FIG. 30, an ultrafine powder 104 having a particle diameter of about 0.5 µm was present within polycrystal particles 102 having a grain diameter of about 5 µm. Further, the metallic compound was analyzed by X-ray diffractometry. As a result, polycrystal grains 102 of LiMn$_2$O$_4$ and an ultrafine powder 104 of Si$_3$N$_4$ were identified.

The powder 100 of the metallic compound was kneaded with a conductive agent and a binder to prepare an electrode active material. Carbon was used as the conductive agent, and teflon was used as the binder. The electrode active material was adhered to the periphery of a collector to provide an electrode for a cell with a nonaqueous electrolyte.

EXAMPLE 24

Example 24 provides a powder 100 of a metallic compound as shown in FIG. 31, wherein an ultrafine powder 104 is present within grains and at grain boundaries of the polycrystal grains 102.

In the production of the above-described powder of the metallic compound, at the outset, LiI and MnO$_2$ were weighed in a Li to Mn molar ratio of 1:2 and mixed with each other. An ultrafine powder of Si$_3$N$_4$ was added to the mixture so as to provide a Si$_3$N$_4$ content of the metallic compound of 20% by volume, and they were mixed with each other.

The mixture was heat-sintered in the same manner as that of Example 23 to provide a powder 100 of a metallic compound.

Thereafter, the microstructure of the metallic compound was observed. As a result, it was found that, as shown in FIG. 31, an ultrafine powder 104 having a particle diameter of about 0.5 µm was present within grains of the polycrystal grains 102 and an ultrafine powder 104 having a particle diameter of 1 µm or more was present at grain boundaries of the polycrystal grains 102.

An electrode for a cell with a nonaqueous electrolyte was prepared in the same manner as that of Example 23, except that use was made of the powder 100 of the metallic compound according to Example 24.

Other conditions were the same as that of Example 23.

EXAMPLE 25

In Example 25, manganese dioxide was first precipitated around an ultrafine powder in an aqueous MnSO$_4$, and LiMn$_2$O$_4$ was then grown in an aqueous Li$_2$SO$_4$ solution to provide a metallic compound.

Specifically, at the outset, 75 g of MnSO$_4$ was dissolved in 500 ml of water, and 1.5 g of an ultrafine powder of Si$_3$N$_4$ having a particle diameter of 0.5 µm was added to the MnSO$_4$ solution. 1 N aqueous ammonia was gradually added to the solution with stirring to produce a precipitate. Oxygen was then blown into the solution at a flow rate of 100 ml/min for 5 hr to effect an oxidation treatment. The precipitate was collected by filtration, dried-and heat-treated in air at 300° C. for 10 hr to provide manganese dioxide. Then, 40 g of manganese dioxide thus obtained was placed in 500 ml of a 4 N LiOH solution, and a reaction was allowed to proceed at 70° C. for 5 hr with stirring. The reaction mixture was filtered and dried. The dried product was heat-treated at 900° C. for 24 hr.

The resultant powder was analyzed by X-ray diffractometry. As a result, polycrystal grains of LiMn$_2$O$_4$ and an ultrafine powder of Si$_3$N$_4$ were identified. The microstructure of the powder was as shown in FIG. 30, that is, the same as the metallic compound of Example 23.

An electrode for a cell with a nonaqueous electrolyte was prepared in the same manner as that of Example 23, except that use was made of the powder 100 of the metallic compound according to the present example.

Other conditions were the same as that of Example 23.

EXAMPLE 26

In Example 26, LiMn$_2$O$_4$ was precipitated and grown around an ultrafine powder in a solution of MnSO$_4$ and Li$_2$SO$_4$ to provide a metallic compound.

Specifically, at the outset, 75 g of $MnSO_4$ and 30 g of $Li_2SO_4$ were dissolved in 500 ml of water, and 1.5 g of an ultrafine powder of $Si_3N_4$ having a particle diameter of 0.5 $\mu$m was added to the solution. 1 N aqueous ammonia was gradually added to the solution with stirring to produce a precipitate. Oxygen was then blown into the solution at a flow rate of 100 ml/min for 5 hr to effect an oxidation treatment. The precipitate was collected by filtration, dried and heat-treated in air at 900° C. for 24 hr. The resultant powder was analyzed by X-ray diffractometry. As a result, polycrystal grains of $LiMn_2O_4$ and an ultrafine powder of $Si_3N_4$ were identified. The microstructure of the powder was as shown in FIG. 30, that is, the same as the metallic compound of Example 23.

An electrode for a cell with a nonaqueous electrolyte was prepared in the same manner as that of Example 23, except that use was made of the powder 100 of the metallic compound according to the present example.

Other conditions were the same as that of Example 23.

EXAMPLE 27

In Example 27, a powder of a metallic compound (Comparative Example 5) was prepared in the same manner as that of Examples 23 to 26, except that no ultrafine powder was used. The resultant metallic compound comprised an aggregate of polycrystal grains. The diameter of the polycrystal grains was about 5 $\mu$m. An electrode for a cell with a nonaqueous electrolyte was prepared in the same manner as that of Examples 23 to 26, except that use was made of the powder 100 of the metallic compound according to the present example. Other conditions were the same as that of Examples 23 to 26.

In the present example, secondary cells with a nonaqueous electrolyte were assembled using electrodes for a cell with a nonaqueous electrolyte according to Examples 23 to 26 and Comparative Example 5 and subjected to the measurement of a change in the retention of the energy capacity with the number of charge-discharge cycles for each electrode for a cell with a nonaqueous electrolyte.

The secondary cells with a nonaqueous electrolyte is a button cell having a diameter of 20 mm and a thickness of 3.2 mm. Metallic lithium was used as a negative electrode. A solution of lithium perchlorate dissolved in propylene carbonate was used as an electrolyte.

The button cells were subjected to a charge-discharge cycle test wherein the cell was charged at a constant current of 2 $mA/cm^2$ and an upper limit voltage of 4.1 V for 5 hr and then discharged to 2 V. The results are shown in FIG. 32.

Figure 32:
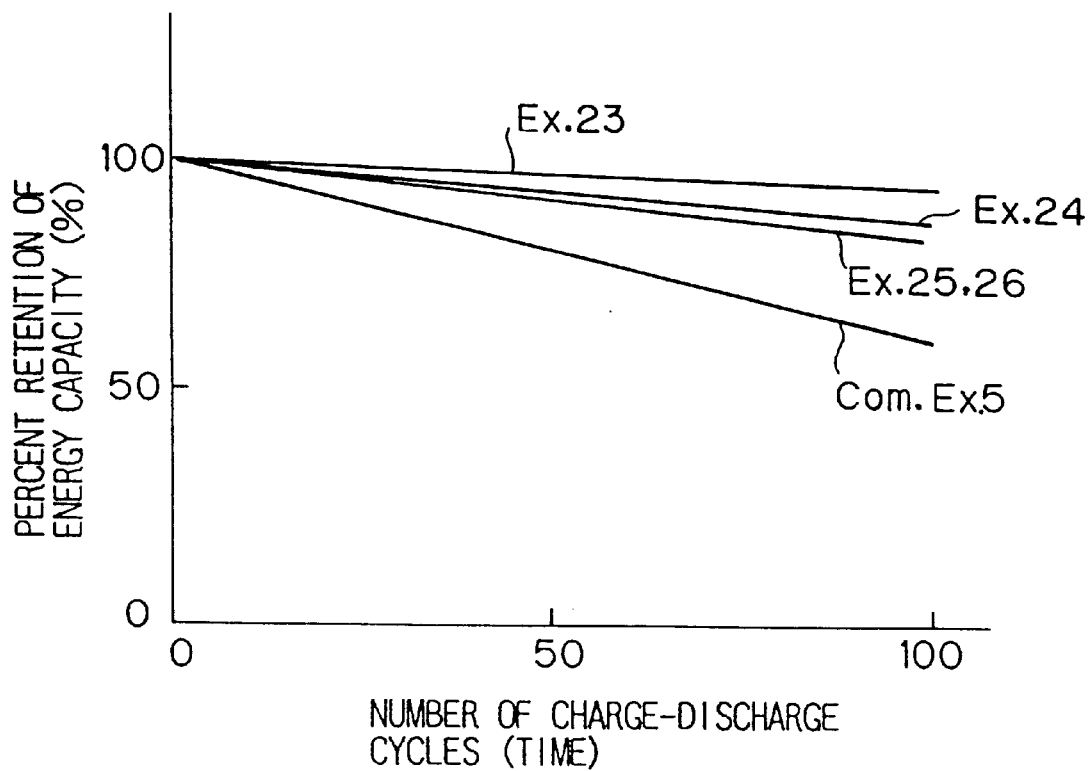
FIG. 32 is a diagram showing the relationship between the number of charge-discharge cycles and the retention of energy capacity of an electrode for a cell with a nonaqueous electrolyte in Example 27.

As can be seen from FIG. 32, when the charging and discharging were repeated 100 times, the electrodes for a cell with a nonaqueous electrolyte according to Examples 23 to 26 exhibited no significant lowering in the retention of the energy capacity, whereas the electrode for a cell with a nonaqueous electrolyte according to Comparative Example 5 exhibited a 60% lowering in the retention of the energy capacity when the number of cycles reached 100.

This shows that the electrodes for a cell with a nonaqueous electrolyte according to examples of the present invention has a long charge-discharge cycle life by virtue of the prevention of not only grain size reduction of the electrode active material but also breaking of the crystal structure caused by the repetition of charging and discharging.

EXAMPLE 28

Regarding the growth of a crystal, it is known that a large crystal is provided when the number of crystalline nuclei is small, and the size of the crystal decreases with an increase in the number of crystalline nuclei. In the present example, this principle is utilized, and a number of crystals are formed through the formation of a number of crystalline nuclei serving as a crystal growing site in the negative electrode to inhibit the formation of large dendrites.

That is, Example 28 provides a negative electrode for a lithium secondary cell, wherein at least the surface portion of the substrate comprises metallic lithium constituting a matrix and, dispersed and held in the matrix and exposed on the surface of the substrate, a metallic element other than lithium or a cluster of the metallic element.

The formation of lithium nucleation sites and deposition of lithium metal by ion implantation and the formed lithium deposit layer in the negative electrode for a lithium secondary cell according to Example 28 are conceptually shown in FIGS. 33A to 33D.

FIGS. 33A to 33D respectively illustrate the implantation of metallic ion $M^+$ into a lithium metal substrate 124 at its surface portion, the formation of a number of nucleation sites 128 by the implantation of a dissimilar metal 126 into the substrate at its surface portion to provide the negative electrode 130 for a lithium secondary cell according to Example 28, the deposition of lithium in the negative electrode 130 to form a number of crystalline nuclei 132 and the build-up and deposition of lithium on the negative electrode 130 to form a lithium layer 134.

As is apparent from FIGS. 33A to 33D, since a number of lithium nucleation sites 128 are formed on the surface of the negative electrode 130 for a lithium secondary cell, a number of lithium crystalline nuclei 132 are formed in an early stage of charging. These lithium crystalline nuclei 132 are adjacent to one another, so that lithium is continuously deposited charging. The growth of the crystals causes adjacent crystals to come into contact with one another and be united, thereby forming a lithium layer 134. The whole surface of the lithium layer 134 serves as a crystal growth face. Therefore, a phenomenon, which causes the crystal to be locally protruded, such as the formation of dendrites, is inhibited.

In FIGS. 33A to 33D, although the lithium nucleation sites are formed on only one surface of the substrate, it is preferred for the nucleation sites to be formed on the whole surface of the substrate on which lithium is precipitated.

EXAMPLE 29

Example 29 provides a negative electrode wherein at least the surface portion of the substrate comprises a lithium alloy or a metal other than lithium and the surface of the substrate is finely uneven and has recesses and protrusions each having an average width of 10 $\mu$m or less. It is known that sites for the nucleation of crystals are largely formed at kinks of the substrate. This invention is based on such finding, and recesses and protrusions are finely formed on the surface of the substrate.

The formation of an uneven surface of a negative electrode for a lithium secondary cell, the deposition of lithium metal and the lithium deposit layer according to Example 29 are conceptually shown in FIGS. 34A to 34D.

FIGS. 34A to 34D respectively illustrate a substrate 136 for the negative electrode for a lithium secondary cell according to Example 29, the formation of uneven portions 138 by fine fabrication of the surface of the substrate 136 to provide the negative electrode 140 for a lithium secondary cell according to Example 29, the deposition of lithium in the negative electrode 140 to form a number of crystalline nuclei 142 and the build-up and deposition of lithium on the negative electrode 140 to form a lithium layer 144.

As is apparent from FIGS. 34A to 34D, since a number of uneven portions 138 serving as a lithium nucleation site are formed on the surface of the negative electrode 140 for a lithium secondary cell, a number of lithium crystalline nuclei 142 are formed in an early stage of charging. These lithium crystalline nuclei 142 are adjacent to one another, so that lithium is continuously deposited during charging. The growth of the crystals causes adjacent crystals to come into contact with one another and be united, thereby forming a lithium layer 144. The whole surface of the lithium layer 144 serves as a crystal growth face. Therefore, a phenomenon, which causes the crystal to be locally protruded, such as the formation of dendrites, is inhibited.

Further, since the substrate is dissolved at a much lower rate than pure lithium metal or is not dissolved, there is no possibility that the repetition of charging and discharging reduces the effect of the present example. Further, in the present example, high discharging and rapid charging become possible by virtue of an increase in the surface area of the electrode.

In FIGS. 34A to 34D, although the uneven portions are formed on only one surface of the substrate, it is preferred for the uneven portions to be formed on the whole surface of the substrate on which lithium is deposited.

Further, in FIGS. 34A to 34D, it is noted that, although uneven portions 138 are drawn in an enlarged state, in fact, the width of the recesses and protrusions is as small as 0.5 μm.

EXAMPLE 30

The present examples provide a lithium secondary cell comprising a positive electrode, a negative electrode comprising lithium metal and a nonaqueous electrolyte interposed between the positive electrode and the negative electrode, wherein the negative electrode has on its surface a lithium ion conductive layer comprising any one of a solid electrolyte layer, an amorphous layer, a fine grain layer and a dissimilar metal diffused layer. In the present example, the most noticeable feature is that the negative electrode has on its surface the above-described lithium ion conductive layer.

The lithium secondary cell according to Example 30 will now be described with reference to FIG. 35.

Figure 35:
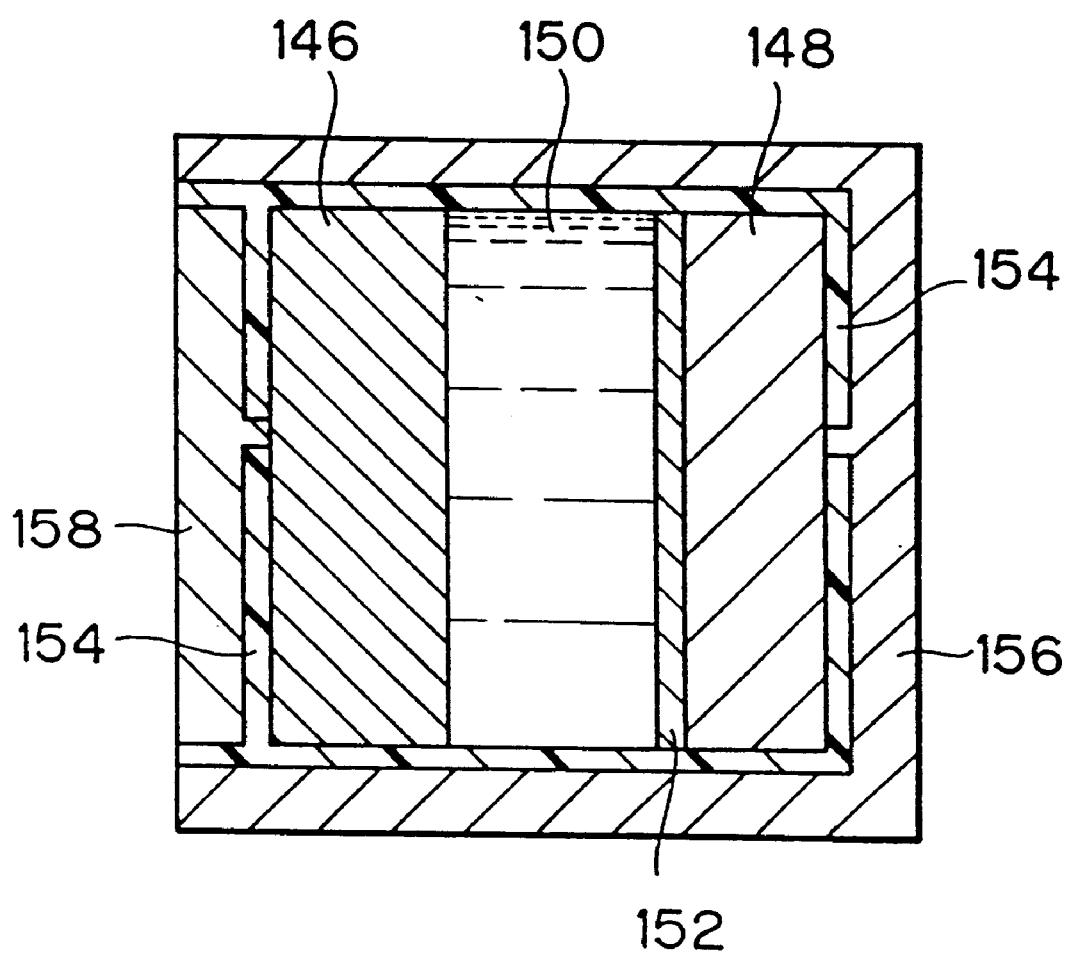
FIG. 35 is a cross-sectional view of a lithium secondary cell in Example 30.

As shown in FIG. 35, the lithium secondary cell comprises a positive electrode 146, a negative electrode 148 comprising lithium metal and a nonaqueous electrolyte 150 interposed between the positive electrode and the negative electrode. The negative electrode 148 has on its surface a solid electrolyte layer 152 as a lithium ion conductive layer. Further, as shown in the same drawing, the positive electrode 146, negative electrode 148 and nonaqueous electrolyte 150 are housed in an insulator 154 in a box form. The periphery of the insulator 154 is covered with a negative terminal 156 of a stainless steel case. Further, the negative terminal 156 is connected to the negative electrode 148, while the positive terminal 158 is connected to the positive electrode 146.

The solid electrolyte layer 152 is a film of a glass layer comprising $P_2S_5$—LiS—LiI.

The lithium secondary cell of Example 30 will now be described together with a method for the production of the solid electrolyte layer 152.

At the outset, lithium metal for a negative electrode was provided, and surface etching was effected by sputtering using an argon ion for the purpose of removing the oxide film present on the surface of the lithium metal. Thereafter, the lithium metal was set on a collector. Separately, a target containing first additive elements, which will be described later, that is, $P_2S_5$—LiS—LiI in an amorphous form was set as a material for the formation of a solid electrolyte layer. Then, sputtering was effected at room temperature and 1 mA/cm$^2$ for 3 hr. This causes a $P_2S_5$—LiS—LiI film, that is, a solid electrolyte layer, to be formed on the surface of the negative electrode. The thickness of the film was about 1 μm.

In the construction of the lithium secondary cell, use was made of the negative electrode 124 on which the solid electrolyte layer had been formed. Further, $LiMn_2O_4$ was used as a positive electrode 122. PC (polypropylene carbonate) containing 1 mol/liter of LiCl was used as an electrolyte.

The lithium secondary cell was repeatedly charged and discharged under conditions of a current of 1 mA/cM$^2$ and a voltage of 4.1 to 2.0 V (volts).

For comparison, a comparative lithium secondary cell was constructed in the same manner as that described above, except that use was made of a comparative negative electrode not provided with the solid electrolyte layer. The comparative lithium secondary cell was repeatedly charged and discharged.

The cell capacity was measured when the number of charge-discharge cycles reached 100.

As a result, the cell capacity of the latter comparative lithium was as small as about 50% of the initial cell capacity. Further, a large amount of dendrites were observed on the surface of the negative electrode.

By contrast, the cell capacity of the former lithium secondary cell according to the present example was about 70% of the initial cell capacity. In this lithium secondary cell, substantially no dendrite was formed on the surface of the negative electrode.

As described above, the reason why the lithium secondary cell of the present example has excellent charge-discharge cycle characteristics resides in the prevention of the dendrite on the negative electrode. Specifically, since the surface energy of the negative electrode is homogenized and dispersed, the lithium ion is deposited and homogeneously dispersed by the solid electrolyte layer without local concentration of the lithium ion on the surface of the negative electrode during charging. Therefore, the lithium ion reaches the interface of the solid electrolyte layer and the lithium metal in a dispersed state, so that no local concentration of the energy occurs, which inhibits the formation of dendrites. As described above, since the solid electrolyte layer 152 is in a very thin film form, the ionic conductivity between the positive electrode and the negative electrode is high and the internal resistance is low. Further, as opposed to the prior art, since the lithium metal is not alloyed, the lithium secondary cell of the present example has a high cell voltage.

EXAMPLE 31

In Example 31, a film is formed in the same manner as that of Example 30, except that, in the formation of the solid electrolyte layer, targets containing second additive elements, which will be described later, that is, $Li_3PO_4$ and $Li_3SiO_4$, were used and simultaneously sputtered to form a film. After the formation of the film, the negative electrode was heat-treated in an argon atmosphere at 150° C. for 10 hr to homogeneously form a solid electrolyte layer having a thickness of about 1 μm. The solid electrolyte layer is a lithium ion conductive ceramic having a composition of $LiTi_2(PO_4)_3$.

A lithium secondary cell was constructed using the above-described negative electrode. Other conditions are the same as those of Example 25.

The lithium secondary cell thus obtained was subjected to a charge-discharge cycle test in the same manner as that of Example 30. As a result, as with the lithium secondary cell of Example 30, the lithium secondary cell exhibited excellent charge-discharge cycle characteristics. Further, it is possible to attain the same effect as that of Example 30.

EXAMPLE 32

Example 32 provides a lithium secondary cell using a negative electrode wherein the lithium ion conductive layer comprises an amorphous layer.

The amorphous layer comprises lithium metal in an amorphous form. In the formation of the amorphous layer, at the outset, lithium metal as a negative electrode was provided. Then, $10^{16}/cm^2$ of P (phosphorus) was implanted into the negative electrode at its surface portion at room temperature and 400 KeV.

The implantation of P gave rise to breaking of the grain boundaries of the surface of the lithium metal to form an amorphous layer. The thickness of the amorphous layer was about 1 μm.

A lithium secondary cell was constructed in the same manner as that of Example 30, except that use was made of the above-described negative electrode. As a result, the lithium secondary cell gave rise to no variation in the charge-discharge cycle characteristics and exhibited the same effect as the of Example 30.

EXAMPLE 33

Example 33 provides a lithium secondary cell using a negative electrode wherein the lithium ion conductive layer comprises a fine grain layer.

In the production of the negative electrode having a fine grain layer, at the outset, lithium metal was heated and melted in an argon atmosphere. Then, the molten metal was poured and cast on a collector placed in a mold. The collector had a low temperature of about −20° C. Thus, a negative electrode having on its surface a fine grain layer was produced. The fine grain layer was formed by virtue of refining by rapid cooling in the casting. The fine grained surface of the lithium metal as the negative electrode constitutes the fine grain layer, and the thickness of the fine grain layer is about 50 μm.

A lithium secondary cell was constructed in the same manner as that of Example 30, except that use was made of the above-described negative electrode. As a result, this example also exhibited the same effect as the negative electrode of Example 30.

Further, according to the present example, a fine grain layer can be easily and surely formed so that it comes into close contact with a collector. This enables the production process to be simplified. Further, damage to the surface of the negative electrode has no adverse effect on the cell performance.

EXAMPLE 34

Example 34 provides a lithium secondary cell using a negative electrode wherein the lithium ion conductive layer comprises a dissimilar element diffused layer.

In the formation of the dissimilar element diffused layer, at the outset, a negative electrode of lithium metal was provided, and $10^{15}/cm^2$ of P was implanted into the negative electrode at its surface portion at room temperature and 400 KeV. The negative electrode was heat-treated in an argon atmosphere at 150° C. for 3 hr, thereby causing P to be diffused and migrated to defects of the lithium metal.

Figure 34A:
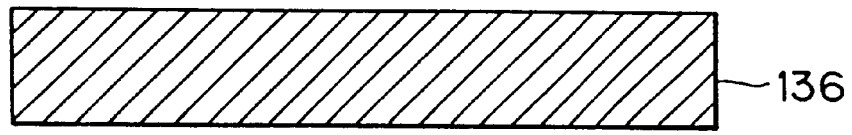
FIGS. 34A to 34D are conceptual diagrams of a lithium deposit layer of a negative electrode for a lithium secondary cell in Example 29.
Figure 34B:
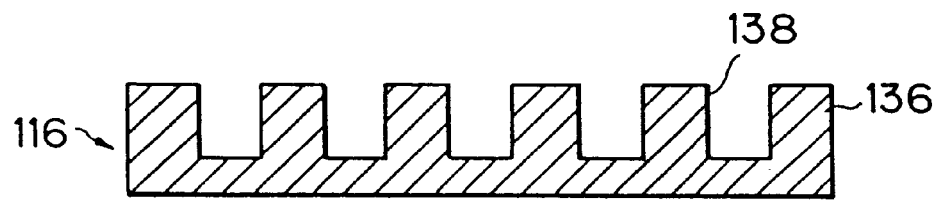
Figure 34C:
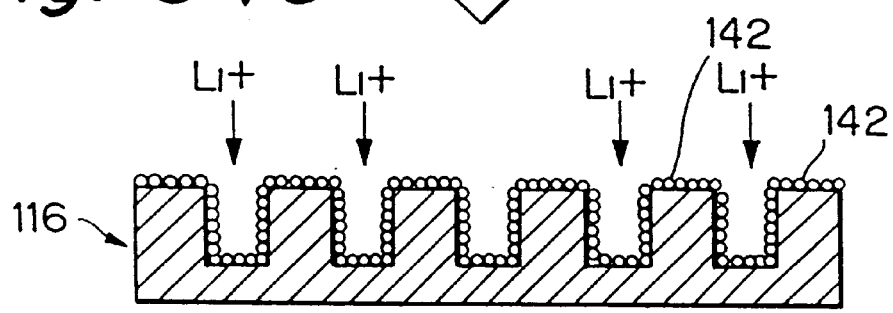
Figure 34D:
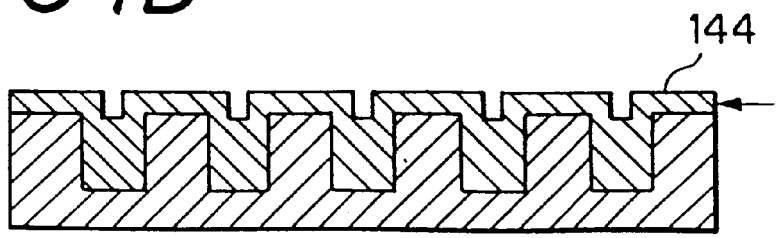

The above-described implantation and diffusion will now be described with reference to FIGS. 36A and 36B. FIG. 36A represents the surface portion of a negative electrode 148 that has many crack defects 160. The crack defects 160 have a high energy and, as described above, is the cause of the formation of dendrites. Accordingly, as described above, P (phosphorus) as a third additive element is implanted (not shown) into the negative electrode 148 at its surface portion. Then, heat treatment is effected as described above. As shown in FIG. 34A, this causes P to be migrated and diffused into the defects 160 to form an inhibitory zone 162, so that the surface energy of the negative electrode 148 is homogenized, which inhibits the occurrence of dendrites.

A lithium secondary cell was constructed in the same manner as that of Example 30, except that use was made of the above-described negative electrode. The lithium secondary cell was subjected to a charge-discharge cycle test in the same manner as that of Example 30. As a result, as with Example 30, the present example exhibited an excellent effect.

EXAMPLE 35

Example 35 provides a secondary cell with a nonaqueous electrolyte, comprising an electrode and an electrolyte, wherein the electrode comprises a sinter produced by mixing a carbon material with a thermosetting resin, heating the mixture to completely cure the thermosetting resin and sintering the cured product in an inert gas.

Figure 37:
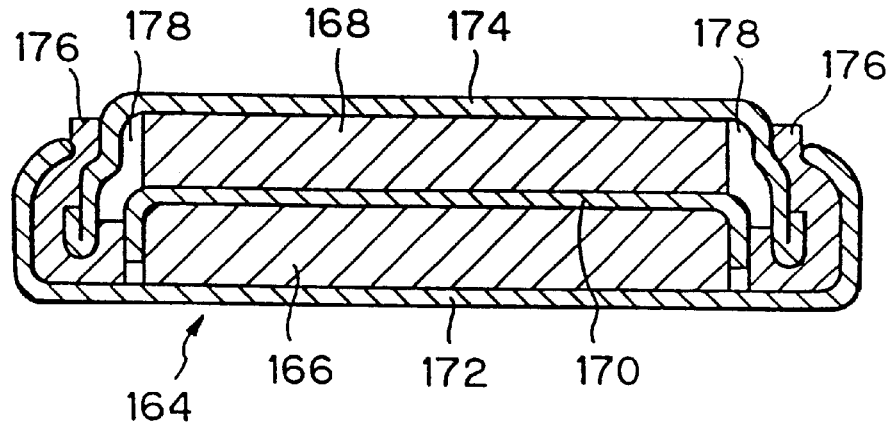
FIG. 37 is a cross-sectional view of a secondary cell with a nonaqueous electrolyte in Example 35.

The secondary cell with a nonaqueous electrolyte according to Example 35 will now be described with reference to FIG. 37.

A secondary cell 164 with a nonaqueous electrolyte according to the present example comprises a negative electrode 166 and a positive electrode 168, and a separator 170 is interposed between both the electrodes. The negative electrode 166 and the positive electrode 168 are sealed respectively into a negative electrode container 172 and a positive electrode container 174 through a gasket 176. The positive electrode 168 comprises a lithium-containing metal oxide electrode. A solution of 1 mol/liter of $LiClO_4$ in propylene carbonate is used as an electrolyte 178. The negative electrode 166 comprises a sinter produced by mixing a carbon material with a thermosetting resin, heating the mixture to completely cure the thermosetting resin and sintering the cured product in an inert gas. The sinter is porous, and particles of the carbon material and particles of a carbonized product (char) of the thermosetting resin are sintered to each other. The electrolyte is impregnated into voids of the sinter.

A method for the production of the above-described negative electrode will now be described.

At the outset, 75% by weight of a carbon material and 25% by weight of a thermosetting resin are sufficiently mixed with each other to provide a carbon mixture. Then, 3 parts by weight of polytetrafluoroethylene is added as a binder to 97 parts by weight of the carbon mixture to provide 0.105 g of a mixture. The mixture is press-molded to provide a molding in a disk form having a diameter of 15 mm and a thickness of 0.55 mm.

The molding is then placed in a firing oven and heated at 200° C. for 2 hr to cure the thermosetting resin. Thereafter, the cured product was heated in an argon gas stream as an inert gas at a rate of 100° C./hr and sintered at 1000° C. for 1 hr to provide a sinter. The weight of the sinter was reduced to 0.085 g due to carbonization of the thermosetting resin. A pitch coke breeze (LPC-U manufactured by Nippon Steel Chemical Co., Ltd., particle diameter: 75 µm or less) was used as the carbon material. A phenolic resin powder (50590B manufactured by Sumitomo Durez Co., Ltd.) was used as the thermosetting resin.

The function and effect of the present example will now be described.

In the present example, a mixture of the thermosetting resin with a carbon material is once heat-cured and then sintered in an inert gas. Therefore, when the sintering is effected, the carbon material particles are already in such a state that they are strongly bound to each other with the cured resin, so that the molding (negative electrode) of the mixture is not broken during firing. Further, since the thermosetting resin is carbonized by heating it in an inert atmosphere, the resultant sinter is strong.

Further, since the sinter comprises the carbon material particles and the carbonized product (char) particles bonded to each other, voids are present between the particles. Therefore, when the sinter is used as the above-described negative electrode, the electrolyte easily penetrates into the voids to exhibit an excellent function as a cell.

Further, since the negative electrode comprises the carbon material and the carbonized product (char), it has an excellent electric conductivity. Further, since the carbonized product (char) too serves as an active material, the capacity of the electrode can be improved with a high efficiency. Further, the electrode is stable without being attacked by the electrolyte, which enables a high charge-discharge effect to be attained for a long period of time.

Consequently, the secondary cell with a nonaqueous electrolyte can be used for a long period of time.

EXAMPLE 36

Example 36 provides a negative electrode comprising a sinter produced by mixing 50% by weight of a pitch coke as a carbon material with 50% by weight of a phenolic resin powder as a thermosetting resin and then repeating the procedure of Example 35. The sinter had a weight of 0.76 g and a sheet resistivity of 0.14 $\Omega/cm^2$.

Other conditions are the same as those of Example 35. Also in this example, it is possible to attain the same effect of Example 35.

EXAMPLE 37

In Example 37, a charge-discharge test of a secondary cell with a nonaqueous electrolyte was effected. In effecting the charge-discharge test, a secondary cell for evaluation was prepared.

Figure 38:
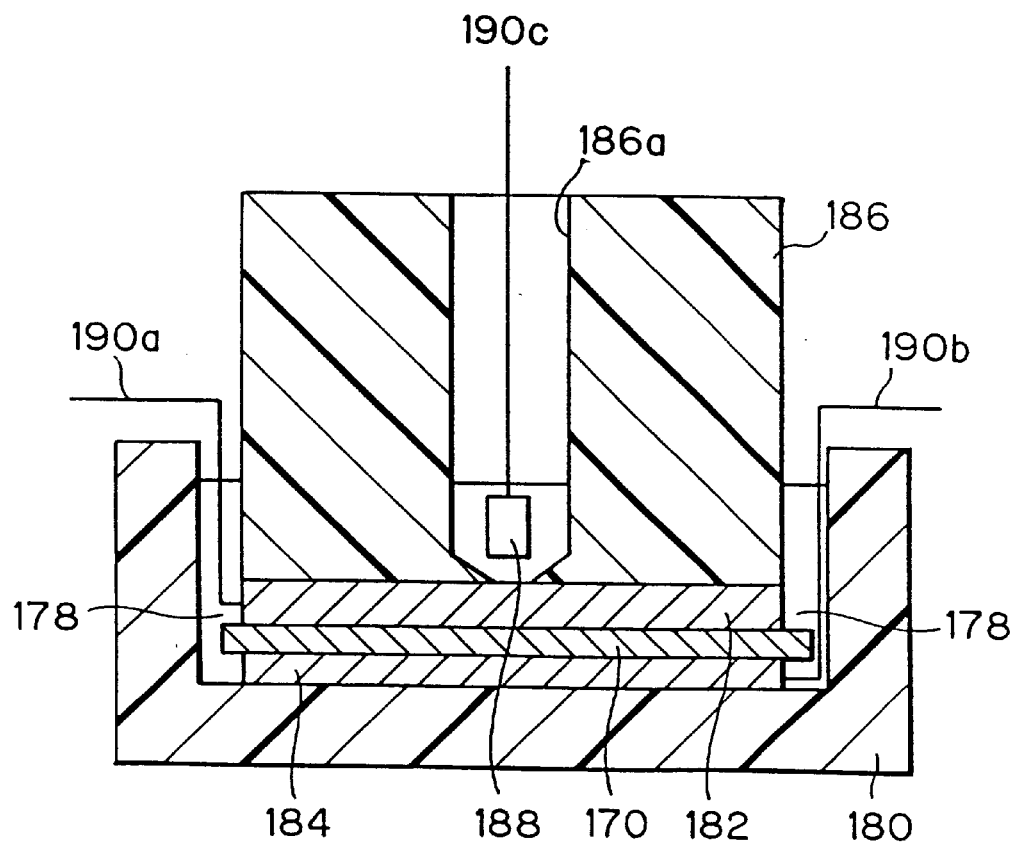
FIG. 38 is a cross-sectional view of an evaluation cell in Example 37.

As shown in FIG. 38, in the secondary cell for evaluation, the carbon electrode 182 produced in Example 35 and lithium electrode 184 are disposed within a container 180, and a separator 170 comprising a nonwoven fabric of polypropylene is interposed between both the electrodes. Further, both the electrodes are immersed in an electrolyte 178. A propylene carbonate solution containing 1 mol/liter of $LiClO_4$ is used as the electrolyte 178.

A weight 186 comprising a teflon material is put on the carbon material 182 through a collector mesh (SUS304). A reference electrode 188 comprising lithium metal is inserted into a through-hole 186a provided in the center portion of the weight 186.

The carbon electrode 182, lithium electrode 184 and reference electrode 188 are connected to an external measuring apparatus respectively through conductors 190a, 190b and 190c.

For comparison, a comparative cell for evaluation using the following comparative carbon electrode (Comparative Example 6) was prepared and subjected to a test under the same condition as that used for the secondary cell for evaluation.

Specifically, the comparative carbon electrode was prepared by mixing 97% by weight of a pitch coke as the carbon material with 3% by weight of polytetrafluoro-ethylene as the binder and press-molding the mixture. The measurement was effected under charging and discharging conditions of an electrode potential of 0 to 2.5 V and a current density of 1 $mA/cm^2$.

Figure 39:
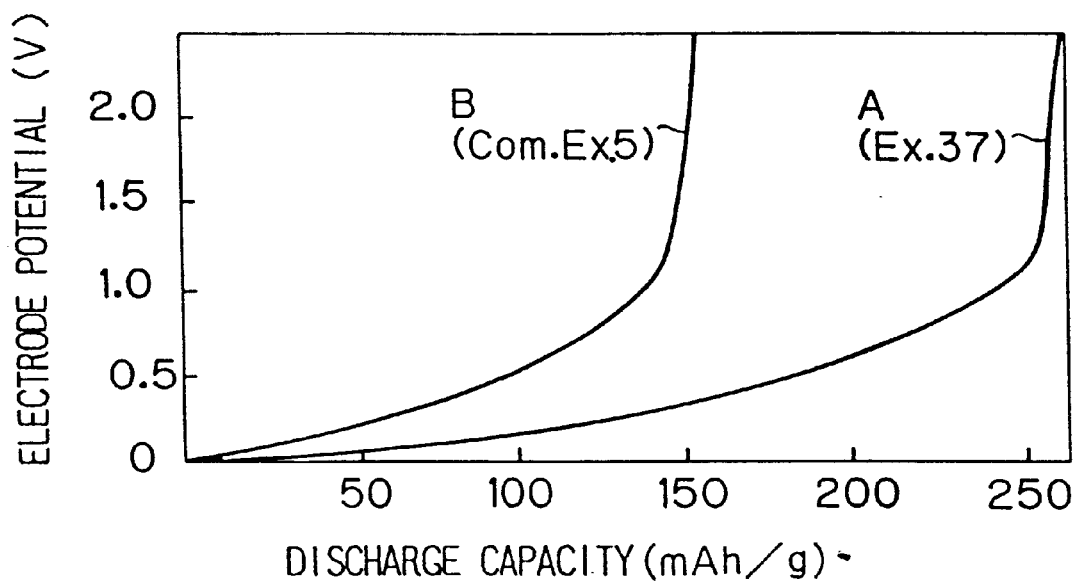
FIG. 39 is a diagram showing a discharge curve for an evaluation cell in Example 37.

The results are shown in terms of a discharge curve in FIG. 39, wherein the abscissa represents the discharge capacity (mAh/g) and the ordinate represents the electrode potential (V).

As can be seen from FIG. 39, the discharge capacity of the cell for evaluation according to the example of the present invention (curve A) is much higher than that of the cell of Comparative Example (curve B) 6.

With respect to the electric conductivity, the sheet resistivity was 5.1 $\Omega/cm^2$ for Comparative Example 6, whereas for the carbon electrode of Example 35 it was improved to 0.22 $\Omega/cm^2$, i.e., improved more than one order of magnitude over Comparative Example 6.

Further, the carbon electrode of the present example maintained the initial bonding strength even after the charging and discharging by virtue of the use of the above-described sinter. On the other hand, the comparative carbon electrode, wherein a carbon material has been bound with a binder, has become liable to break after the charging and discharging.

These results show that the secondary cell with a nonaqueous electrolyte according to the present example has an excellent electric conductivity and a high charge-discharge effect.

Further, in the above-described present example, although use was made of a sinter as the negative electrode, the sinter may be used also as the positive electrode.

EXAMPLE 38

Example 38 provides a secondary cell with a nonaqueous electrolyte, comprising a positive electrode capable of occluding or releasing lithium, a negative electrode using lithium or a lithium alloy as an active material, a nonaqueous electrolyte and a hydrophilic or hydrophilized separator. In the present example, the most noticeable feature is that the separator comprises a hydrophilic or hydrophilized material.

The secondary cell according to Example 38 will now be described with reference to FIG. 40.

Figure 40:
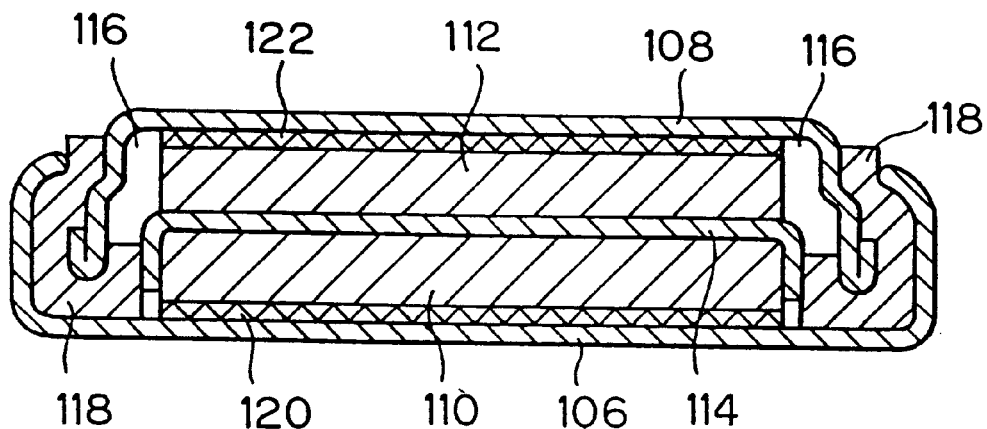
FIG. 40 is a cross-sectional view of a secondary cell with a nonaqueous electrolyte in Example 38.

FIG. 40 is a sectional view of the structure of a cell with a nonaqueous electrolyte in a coin form that comprises a positive electrode case 106 in a thin disk form and having an opening at its top and a negative electrode case 108 in a disk form fitted and fixed into the opening of the positive electrode case 106.

The positive electrode 110 and the negative electrode 112 are separated form each other with a separator 114. Further, a nonaqueous electrolyte 116 is filled into between the positive electrode case 106 and the negative electrode case 108, and the fitting portion between both the cases is hermetically sealed and fixed with a gasket 118.

A positive collector 120 is provided between the positive electrode case 106 and the positive electrode 108, and a negative electrode collector 122 is provided between the negative electrode case 10 and the negative electrode 112.

A positive electrode composite produced by mixing 90 parts by weight of a positive active material $LiMn_2O_4$ having an average particle diameter of 5 μm and a particle size distribution of ±20% of the average particle diameter, 6 parts by weight of Ketjen Black as a conductive agent and 4 parts by weight of polytetrafluoroethylene as a binder with each other was used as an active material for the positive electrode 106. The positive electrode composite was press-bonded onto a positive collector 120 comprising a stainless mesh.

On the other hand, a metallic lithium foil was used as an active material for the negative electrode 112 and press-bonded to a stainless steel negative collector 122. Polypropylene carbonate containing 1 mol/liter of lithium perchlorate was used as the nonaqueous electrolyte. A hydrophilized polypropylene porous film was used as the separator 114.

The above-described button cell was subjected to a charge-discharge cycle test wherein the cell was charged at a constant current of 2 mA/cm² and an upper voltage of 4.1 V for 5 hr and then discharged to 2 V.

A comparative cell as Comparative Example 6 was prepared in the same manner as that described above, except that use was made of a nonaqueous electrolyte produced by mixing propylene carbonate having a high viscosity and a high dielectric constant and diethyl carbonate having a high viscosity and a low dielectric constant with each other in a volume ratio of 1:1. The comparative cell was subjected to a charge-discharge cycle test in the same manner as that described above. The results are shown in FIG. 41.

Figure 41:
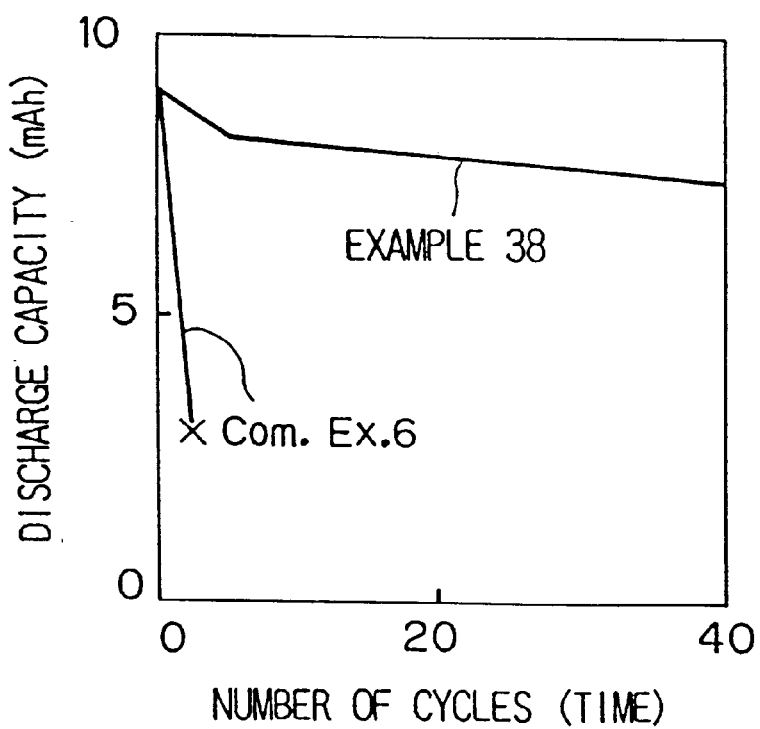
FIG. 41 is a diagram showing the relationship between the number of cycles and the discharge capacity in a charge-discharge cycle test in Example 38.

As can be seen from FIG. 41, the secondary cell with a nonaqueous electrolyte according to the present example exhibited a high cell capacity of about 90% of the initial cell capacity when the number of cycles reached 40. On the other hand, the cell of Comparative Example 6 became exhibited no cell characteristics in only two cycles of charging and discharging.

In this comparative cell, the negative electrode was in a blackened state after the charge-discharge cycle test.

EXAMPLE 39

Example 39 provides a secondary cell with a nonaqueous electrolyte constructed in the same manner as that of Example 38, except that use was made of a nonaqueous electrolyte produced by mixing propylene carbonate with γ-butyrolactone in a volume ratio of 1:1 and adding 1 mol/liter of lithium perchlorate to the mixture and a hydrophilic cellulosic porous film was used as the separator.

The secondary cell was subjected to a charge-discharge cycle test in the same manner as that of Example 38. As a result, it exhibited the same effect as the second cell of Example 38.

EXAMPLE 40

Example 40 provides a constant-voltage pulse charging method for a metallic lithium secondary cell, comprising charging a metallic lithium secondary cell while turning a constant voltage "on" and "off", wherein the "off" period is prolonged when the cell is in a low voltage state, and shortened with an increase in the voltage of the cell. In the present example, the most noticeable feature is that, in the constant-voltage pulse charging method, the "off" period is prolonged when the cell 196 is in a low voltage state, and shortened with an increase in the voltage of the cell.

Figure 42:
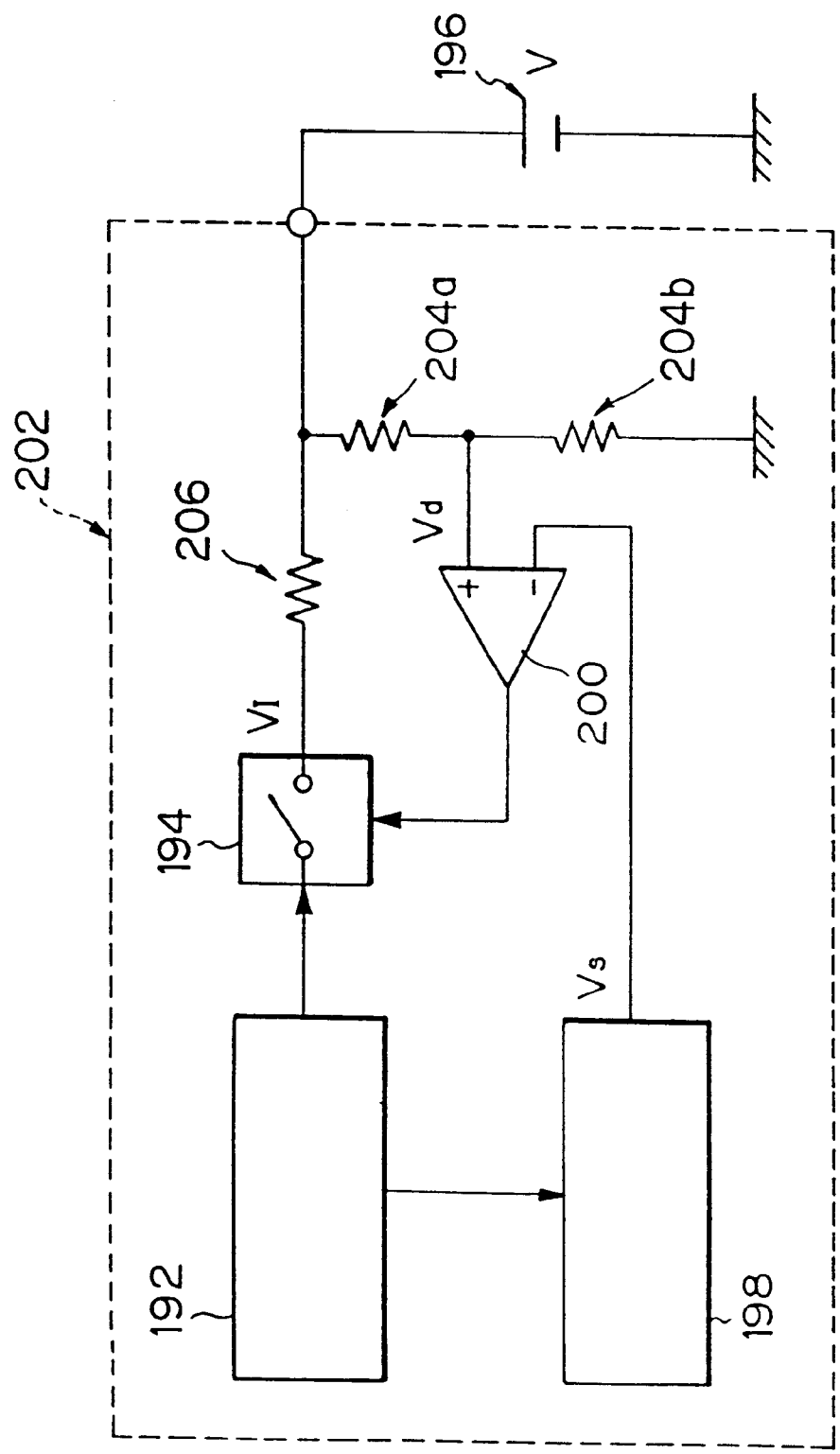
FIG. 42 is a circuit diagram for a charging method described in Example 40.

Example 40 demonstrates a constant-voltage pulse charging method for a metallic lithium secondary cell 196 as shown in FIG. 42, wherein charging is effected by turning "on" and "off" the output of a constant-voltage circuit 192 for generating a voltage of a constant magnitude by means of a switching circuit 194.

Figure 43A:
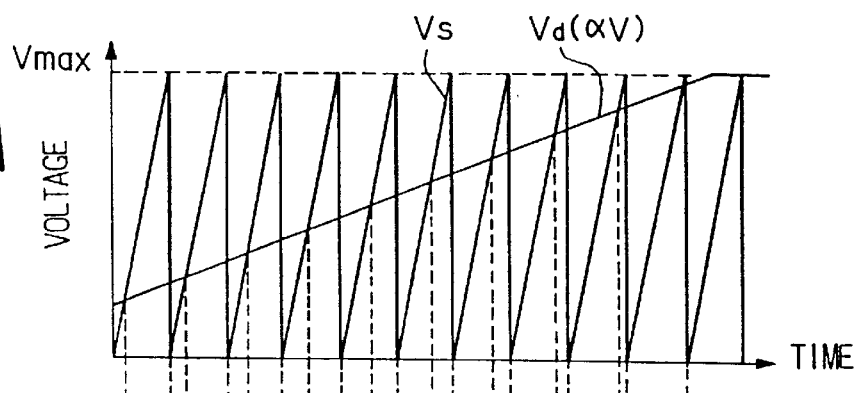
FIGS. 43A to 43C are time charts respectively for voltage and current in the charging in Example 40.
Figure 43B:
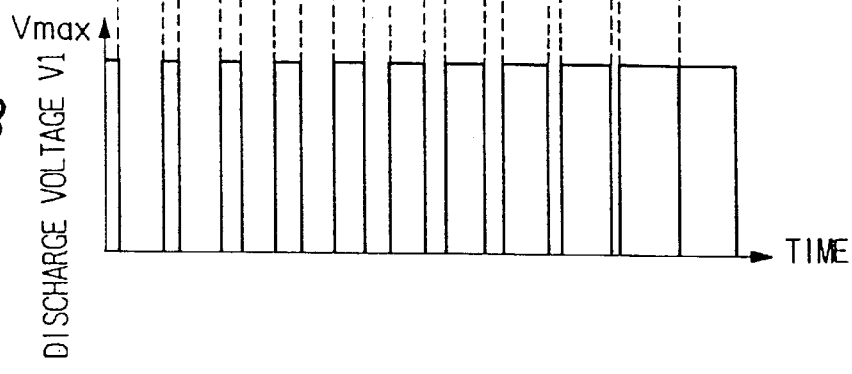

As shown in FIG. 43B, the "off" period is prolonged when the voltage V of the metallic lithium secondary cell 196 is in a low voltage state, and shortened with an increase in the voltage V of the cell. Specifically, as shown in FIG. 42, a standard voltage $V_s$ provided by a generator 198 and comprising a chopping wave or a sawtooth wave at a fixed cycle having a constant wave height is compared with a detected voltage $V_d$ proportional to the voltage V of the cell by using comparator 200, and the application of the voltage $V_I$ is turned "on" with the switching circuit 194 only when the absolute value of the detected voltage $V_d$ exceeds the absolute value of the standard voltage $V_s$.

Each constituent feature will now be described in more detail.

The metallic lithium secondary cell 196 is charged with a charging device 202 shown in FIG. 42. In the charging device 202, the constant-voltage circuit 192 is a circuit for generating a constant voltage $V_{max}$ equal to the upper limit of the cell voltage. The generator 198 is a circuit for generating a chopping wave or sawtooth wave at a fixed cycle of the constant voltage $V_{max}$ as an amplitude. The output is input as the standard voltage $V_s$ into the comparator 200. On the other hand, potential dividing resistances 204a, 204b divide the voltage V of the metallic lithium secondary cell 196 to generate a detected voltage $V_d$ proportional to V.

The detected voltage $V_d$ is input into another input terminal of the comparator 200 that outputs "on" command to the switching circuit 194 when the detected voltage $V_d$ is larger than the standard voltage $V_s$.

The switching circuit 194 is an on-off circuit which outputs the constant voltage $V_{max}$ only during the continuation of the "on" command from the comparator 200. The output voltage $V_I$ of the switching circuit 194 is supplied to the metallic lithium secondary cell 196 through a current-limiting resistance 206.

Figure 43C:
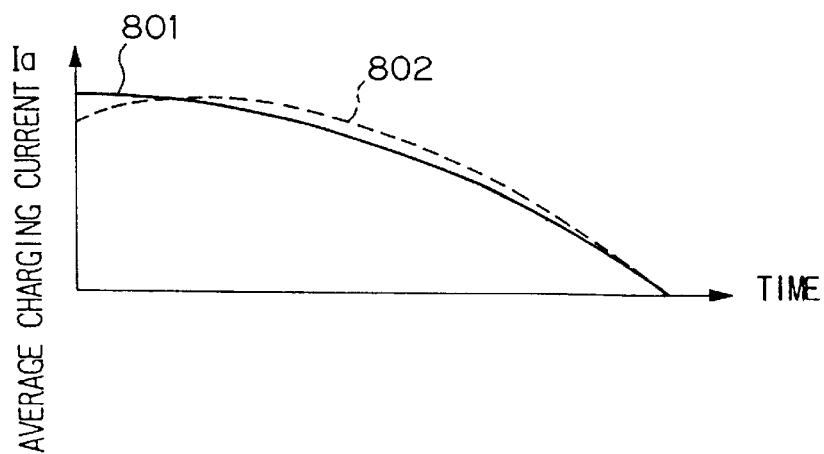

Time charts respectively for voltage and current during charging of the metallic lithium secondary cell 196 will now be described with reference to FIG. 43.

The standard voltage $V_s$ and the detected voltage $V_d$ change as shown in FIG. 43A. Since the comparator 200 outputs an "on" signal only when $V_d$ is larger than $V_s$, the charge voltage $V_I$ of the metallic lithium secondary cell 196 changes-as shown in FIG. 43B. The charge current for the cell flows in proportion to the voltage difference only when the difference in the voltage between the charge voltage $V_I$ and the cell voltage V is positive, so that the average charge current $I_a$ changes as indicated by a solid line in 801 FIG. 43C.

The average charge current $I_a$ can be changed as indicated by a broken line 802 by applying a suitable offset to the detected voltage $V_d$.

On the other hand, when a power is supplied from the metallic lithium secondary cell 196 according to the present example to a load, after the metallic lithium secondary cell 196 is separated from the charging device 202, the internal resistance and relaxation of the cell are measured by the following method and the powder is supplied while measuring the residual capacity and the state of deterioration.

Figure 44:
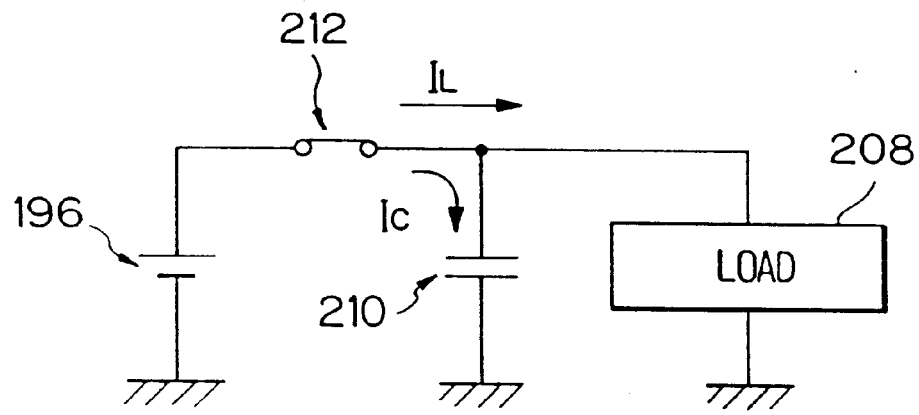
FIG. 44 is a main circuit diagram with a cell discharged (i.e., with a monitor circuit "off") in Example 40.
Figure 45:
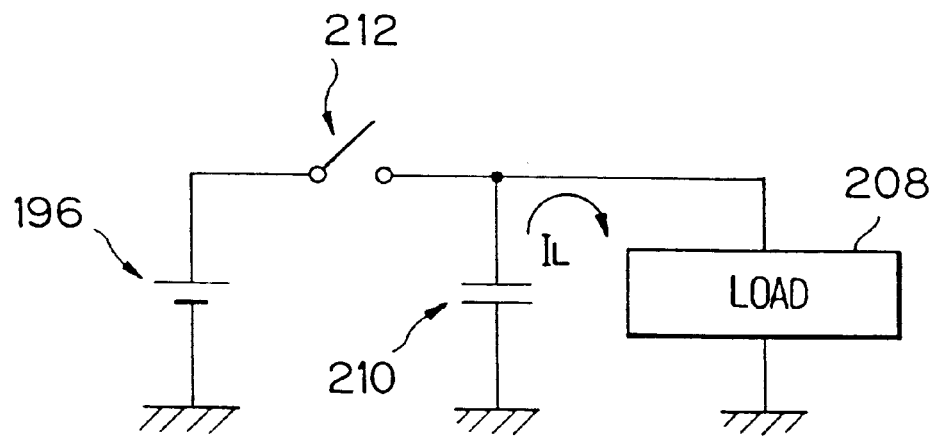
FIG. 45 is a main circuit diagram with the monitor circuit "on" in FIG. 44.

Specifically, as shown in FIGS. 44 and 45, a capacitor 210 for accumulating power and the load 208 of the metallic lithium secondary cell 196 are connected in parallel, and a switch 212 is provided between the metallic lithium secondary cell 196 and the load 208 and the capacitor 210. The switch 212 is periodically opened, and the internal resistance and relaxation of the cell are measured with a monitor 214, during which time, as shown in FIG. 45, the capacitor 210 is discharged to continue the supply of power ($I_L$) to the load 208.

Figure 46:
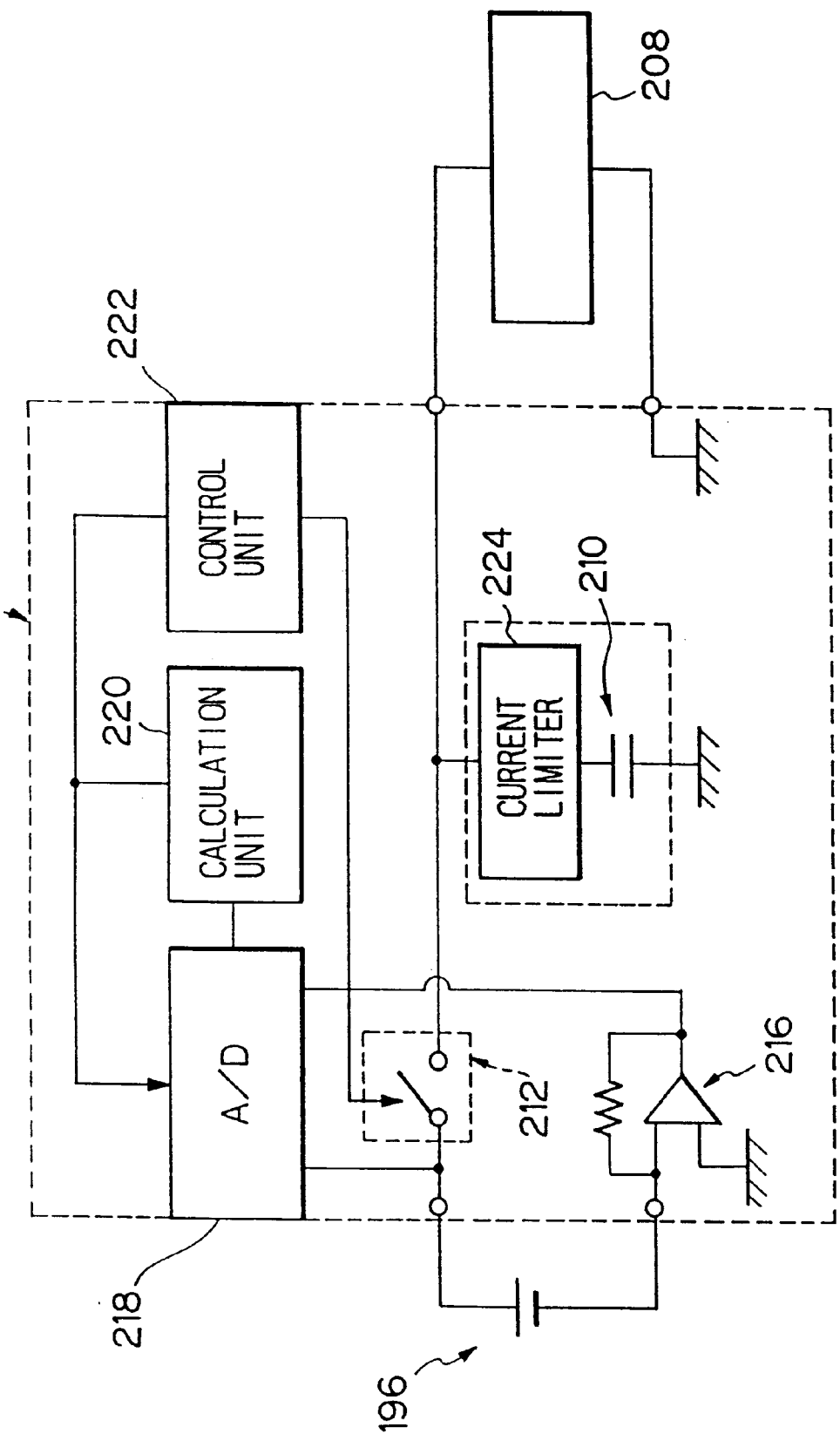
FIG. 46 is a general circuit diagram with the cell discharged in Example 40.

As shown in FIG. 46, the monitor 214 comprises a current detector 216 for detecting the discharge current of the cell, an A/D converter 218 for converting the current and cell voltage into digital values, an operation part 220 for computing the internal resistance from the voltage and current and analyzing the relaxation and a controller 222 for controlling the switching of the switch 212 and timing for measurement.

In FIG. 46, numeral 224 designates a current limiter (not shown in FIGS. 44 and 45) for limiting the charge current $I_a$ of the capacitor 210.

The function and effect of the present example will now be described.

In the charging method for the metallic lithium secondary cell 196 according to the present example, as shown in FIG. 43B, charging is effected while intermittently applying a charge voltage $V_l$ (a charge current).

Further, a particularly long charge "off" period is provided in an early stage of charging where the cell voltage $V_d$ is low.

This enables the nucleation of dendrites in the charging to be inhibited.

Further, in an early stage of the charging, the average charge current $I_a$ is not significantly increased but kept low, and in the latter stage of charging, the average charge voltage becomes substantially the rated value of the cell, so that not only overcharge can be prevented but also the charging efficiency can be increased.

Further, as described above, the application of an offset to the detected voltage $V_d$ enables a curve for showing a change in the charge current to be shifted as indicated by a broken line 802 to delay the timing that renders the current value maximum.

The shift of the maximum value in the current curve 802 can further suppress the initial charge current $I_a$ and further inhibits the nucleation of dendrites without prolongation of the charging time.

Further, in the discharging, as shown in FIGS. 44 to 46, the internal resistance and relaxation of the cell can be continuously monitored without stopping the supply of powder ($I_L$) to the load 208. That is, the residual capacity or deterioration of the cell can be monitored. Thus, it becomes possible to avoid overcharge or other unfavorable phenomena.

As described above, the present example can provide a charging method for a metallic lithium secondary cell that enables charging to be rapidly effected while inhibiting the formation of dendrites. Further, the residual capacity or deterioration of the metallic lithium secondary cell can be monitored while continuing the power supply, so that the cell can be used in a proper manner.

EXAMPLE 41

The secondary cell of the present example comprises: a cell body comprising a cell container and, held in the battery container, a negative electrode using lithium or a lithium alloy as a negative active material, a positive electrode and an electrolyte interposed between the negative electrode and the positive electrode; a sensor for sensing a predetermined impact force or a higher impact force; and a barrier spray means for spraying a barrier fluid within or around the cell body upon being instructed by the sensor.

Figure 47:
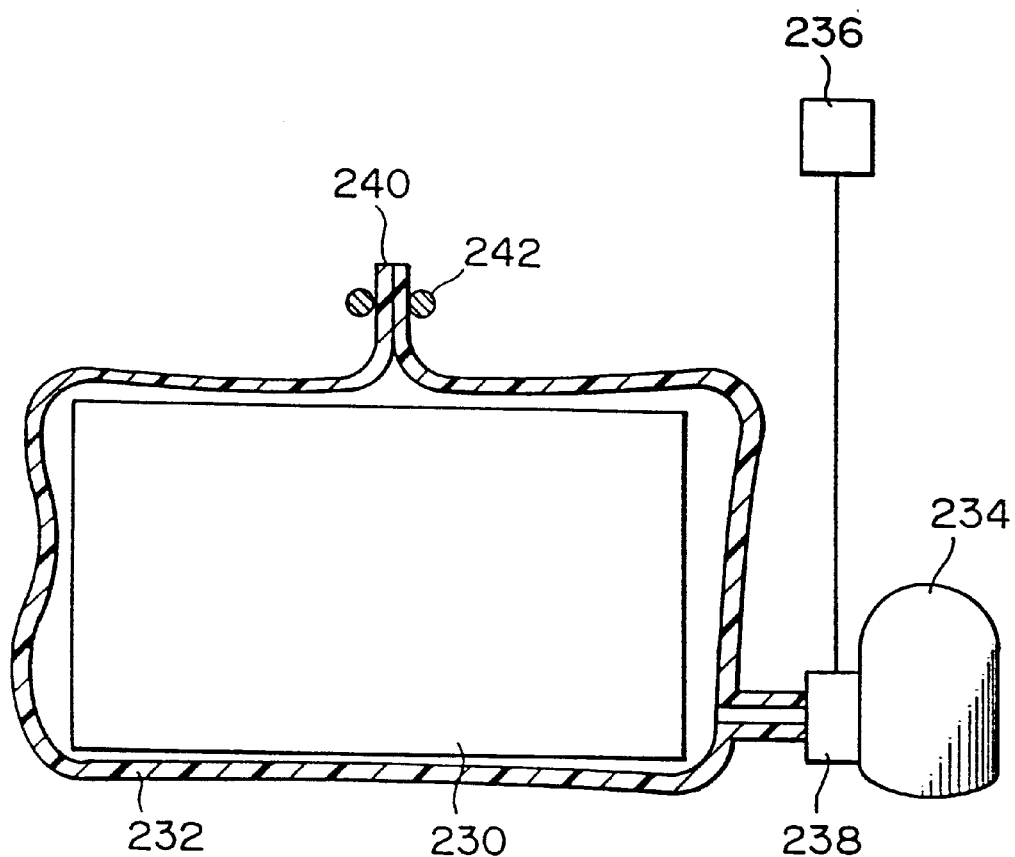
FIG. 47 is a schematic view showing the construction of a lithium secondary cell in Example 47.

The lithium secondary cell of Example 41 is schematically shown in FIG. 47. This lithium secondary cell comprises a cell body 230, a rubber bag 232 for housing the cell body 230, a carbon dioxide gas bomb 234, a sensor 236 and a valve 238 for leading a carbon dioxide gas in the carbon dioxide gas bomb 234 to the rubber bag 232 upon instructions from the sensor 236. The cell body 230 comprises a plurality of conventional lithium secondary cells that use lithium metal as a negative active material.

The rubber bag 232 comprises a rubber sheet in which reinforcing cords are buried. It has on its top an opening 240 from which the cell body 230 can be inserted. The opening 240 is hermetically sealed with a fitting 242.

A carbon dioxide gas bomb for extinguishment, as such, was used. The sensor 236 is an acceleration sensor that generates a signal upon sensing of a given acceleration. The valve 238 is an electromagnetic valve that is opened upon instructions from the sensor 236.

The lithium secondary cell according to the present example has the above-described construction.

The actuation thereof will now be described.

As soon as the sensor 236 senses a predetermined impact force or a higher impact force, it transmits a signal to the electromagnetic valve 238. This signal causes the electromagnetic valve 238 to be opened, so that carbon dioxide gas is released from the carbon dioxide bomb 234. The carbon dioxide gas enters the rubber bag 232, and the periphery of the cell body 230 is filled with the carbon dioxide gas. Even when the strong impact breaks the cell body 230 to expose the lithium metal constituting the negative electrode to be exposed from the cell container, the exposed lithium metal is reacted with the carbon dioxide gas within the rubber bag 232 to form inert lithium carbonate on the surface of the lithium metal. This renders the lithium metal substantially inert, and the contact of the lithium metal with water after that does not cause the lithium metal to react with water, so that neither heat generation nor evolution of hydrogen occurs, which can eliminate the problem caused by the breaking of the lithium secondary cell.

EXAMPLE 42

Figure 48:
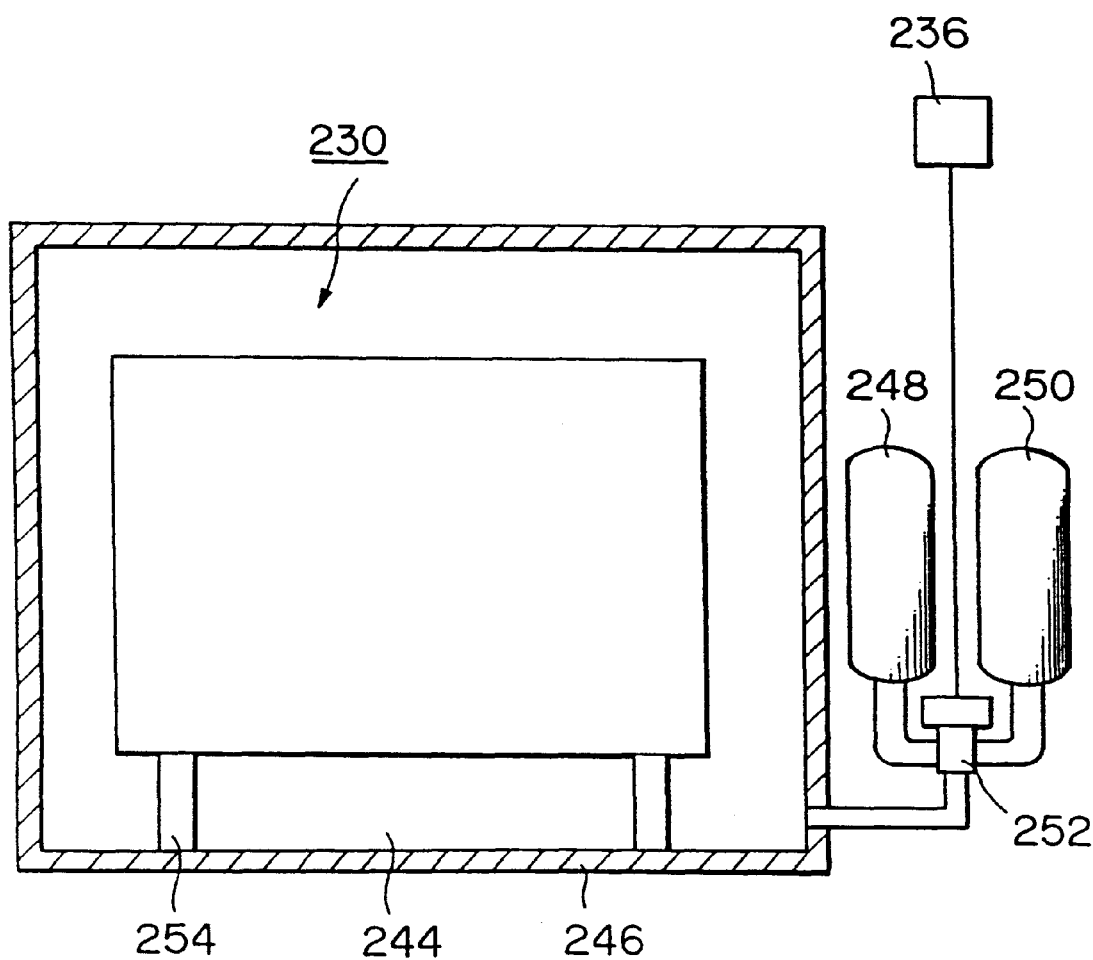
FIG. 48 is a schematic view showing the construction of a lithium secondary cell in Example 48.

The lithium secondary cell of Example 42 is schematically shown in FIG. 48. The lithium secondary cell comprises a cell body 230, a housing 246 constituting a housing chamber 244 for housing the cell body 230, a urethane resin solution bomb 248 pressurized with an inert gas, a curing solution bomb 250 pressurized with an inert gas, a sensor 236 and a collision mixing nozzle device 252 that opens a stopper upon instructions from the sensor 236. The cell body 230 and the sensor 236 are the same as those described above in connection with Example 47.

The housing 246 comprises a steel sheet, and the cell body 230 is disposed on a rubber spacer 254 put on the center of the housing chamber 244 so that a space having a substantially constant width is provided in the whole periphery of the cell body 230. The urethane resin solution bomb 248 contains a solution of a prepreg resin having an isocyanate group and an inert gas. The curing solution bomb 250 contains a polyol, a curing catalyst, etc., together with an inert gas. The collision mixing nozzle device 252 is the so-called "mixing head" wherein when a central stopper is pulled out, nozzle bores facing each other are opened and the resin solution and curing solution are ejected through both nozzle bores and collide against each other, so that they are instantaneously mixed with each other to form a homogeneous mixture that is passed through piping into the housing chamber 246 where the mixture is spontaneously foamed to form a urethane resin foam that fills up the space of the housing chamber 246 and cures.

In the lithium secondary cell of the present example, the cell body 230 is covered with a urethane resin foam and housed and protected within the housing 246. Therefore, the cell body 230 is not broken by a small impact. Even though the cell body is broken, since it is covered with a urethane resin foam, there is no high possibility that the lithium metal or alloy as a negative active material breaks through the urethane resin foam and housing 246 and goes out of the housing 246.

Therefore, the lithium secondary cell of the present example is very safe against impact.

EXAMPLE 43

Figure 49:
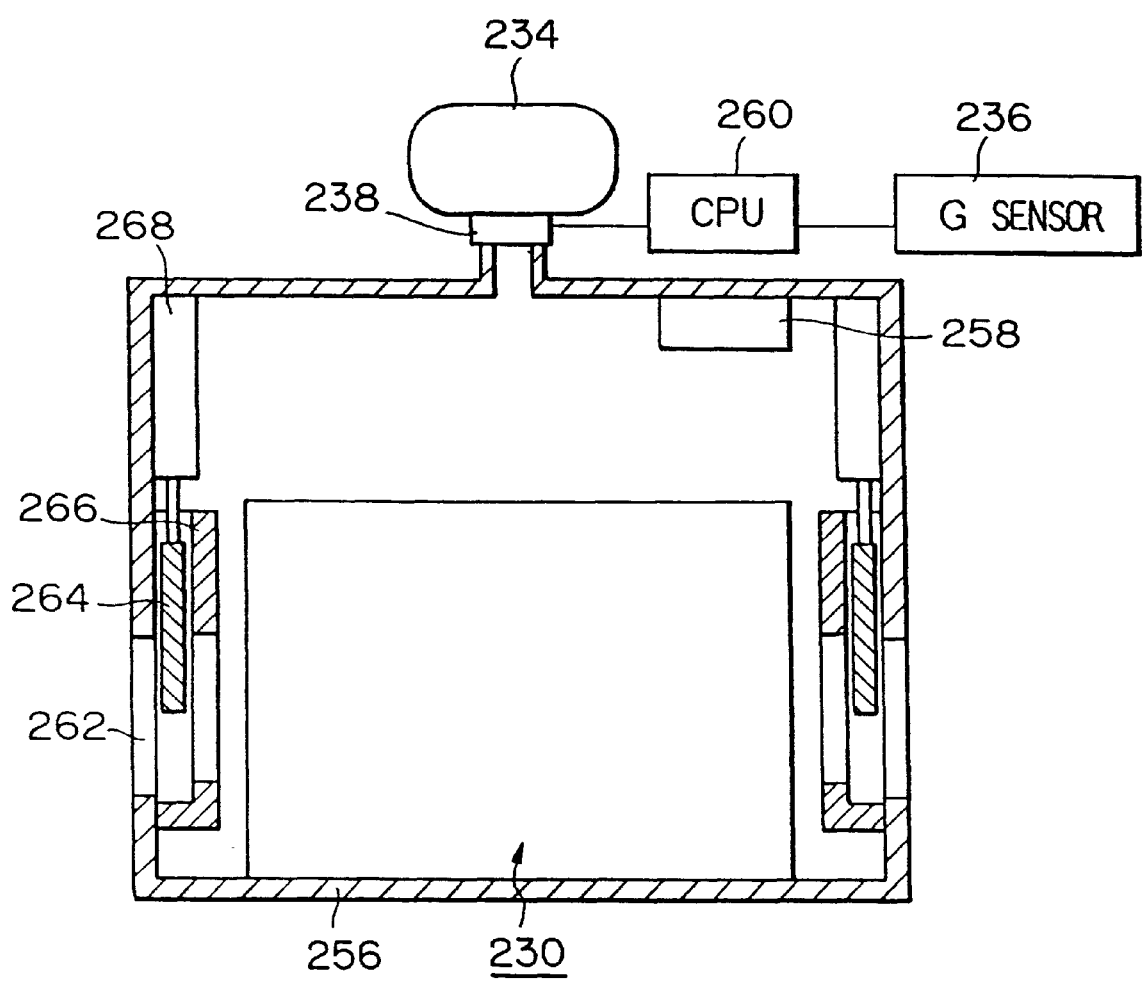
FIG. 49 is a schematic view showing the construction of a lithium secondary cell in Example 49.

The lithium secondary cell of Example 43 is schematically shown in FIG. 49. The lithium secondary cell comprises a cell body 230, a housing 256 for housing the cell body 230, a carbon dioxide gas bomb 234, an acceleration sensor 236 for detecting a shock by collision, a temperature sensor 258, CPU 260 and a valve 238 for leading carbon dioxide gas in the carbon dioxide gas bomb 234 to the housing 256.

The cell body 230, carbon dioxide gas bomb 234, acceleration sensor 236 and valve 238 are the same as those described above in connection with Example 41.

The housing 256 comprises a steel sheet or a resin and has a plurality of apertures 262. These apertures 262 are provided with a shutter 264 that is guided by a guide 266 to open or close the aperture 262. The degree of opening and closing of the aperture by the shutter 264 is regulated with an actuator 268 controlled by CPU 260.

The temperature of the inside of the housing 256 is detected by the temperature sensor 258, and the data are sent to CPU 260 where the degree of opening or closing of each shutter 264 is calculated. The actuator 268 is driven according to the control of CPU 260 to open each shutter 264 to the predetermined extent. Specifically, when the temperature of the inside of the housing 256 has become high, each shutter 264 is greatly driven upward to open the aperture 262 to a large extent. On the other hand, when the temperature of the inside of the housing 256 has become low, each shutter 264 is driven downward, the aperture 262 is closed. Thus, the temperature of the inside of the housing 256 can be maintained in a predetermined temperature range.

Further, when the acceleration sensor 236 has detected a predetermined amount or a larger amount of acceleration, the valve 238 is opened by CPU 260 to release carbon dioxide gas from the carbon dioxide gas bomb 234. Further, CPU 260 opens the valve 238, and when the time necessary for replacing the air in the housing 256 with the carbon dioxide gas has passed, the actuator 268 is driven to close each shutter 264.

This causes the inside of the housing 256 to be filled with the carbon dioxide gas, so that the periphery of the cell body 230 is filled with the carbon dioxide gas. Even though the cell body 230 is broken by strong impact to expose the lithium metal constituting the negative electrode from the cell container, the exposed lithium metal is reacted with carbon dioxide gas within the housing 256 to form inert lithium carbonate on the surface of the lithium metal. This renders the lithium metal substantially inert, and the contact of the lithium metal with water after that does not cause the lithium metal to react with water, so that neither heat generation nor evolution of hydrogen occurs, which can eliminate the problem caused by the breaking of the lithium secondary cell.

EXAMPLE 44

Figure 50:
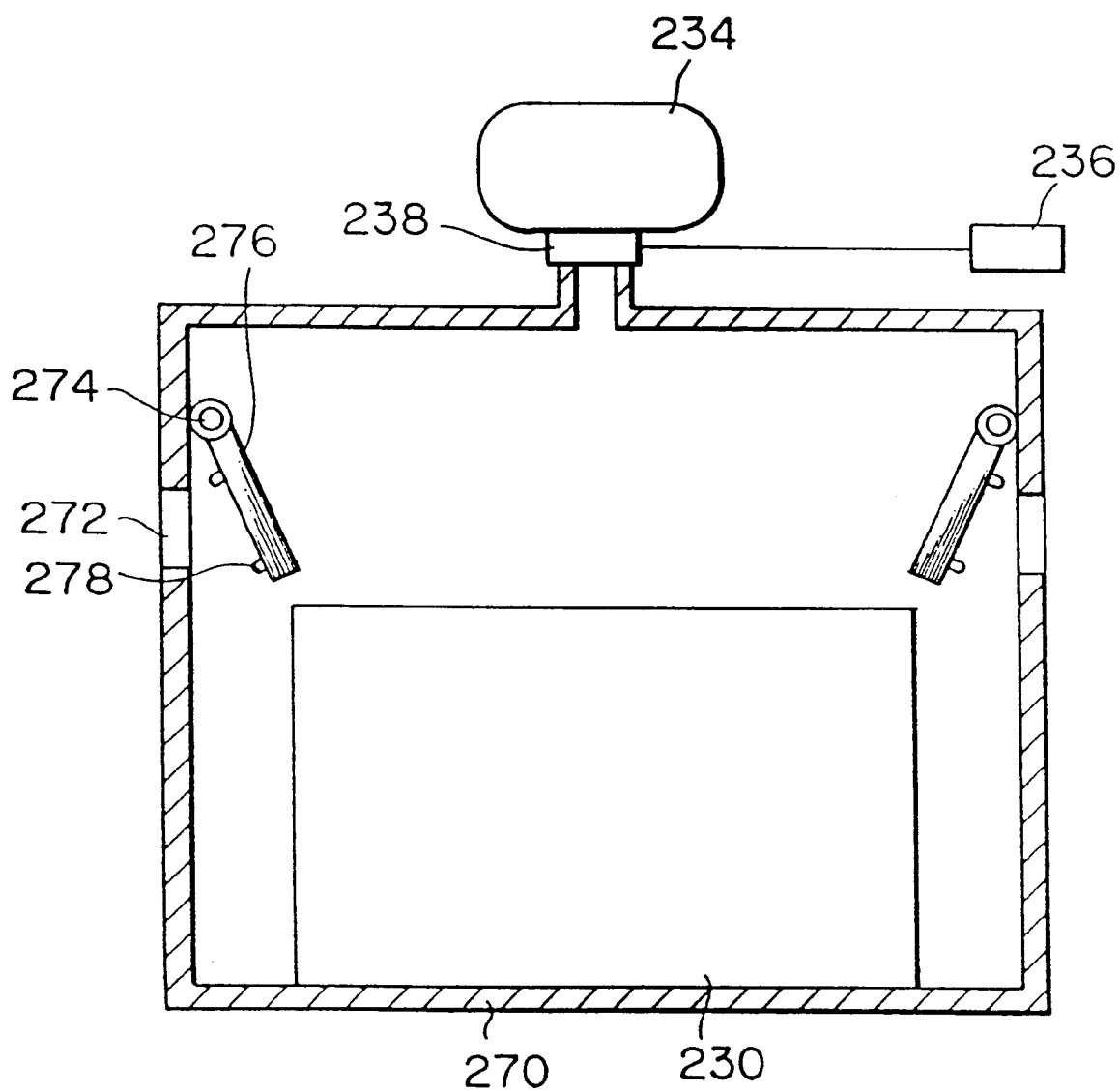
FIG. 50 is a schematic view showing the construction of a lithium secondary cell in Example 50.

The lithium secondary cell of Example 44 is schematically shown in FIG. 50.

The lithium secondary cell comprises a cell body 230, a housing 270 for housing the cell body 230, a carbon dioxide gas bomb 234, an acceleration sensor 236 for detecting a shock by collision and an electromagnetic valve 238. The cell body 230, carbon dioxide gas bomb 234, acceleration sensor 236 and valve 238 are the same as those described above in connection with Example 41.

The housing 270 has a plurality of apertures 272. These apertures 272 are provided with a shutter 264, and a rocking valve 276 pivotally supported on a pivot 274. A seal ring 278 is fixed on a side facing the aperture 272 of each rocking valve 276. When the rocking valve 276 closes the aperture 272, each sealing ring 278 is abutted against the inside of the housing in the periphery of the aperture 272 to more surely seal the aperture 272.

In the lithium secondary cell of this example, when the sensor 236 senses a predetermined strong impact force or a higher impact force, the sensor 236 generates a signal to the electromagnetic valve 238. This signal opens the electromagnetic valve 238 which releases carbon dioxide gas from the carbon dioxide gas bomb 234. The jetting pressure of the carbon dioxide gas causes the rocking valve 276 to be pressed against toward the aperture 272 to close the aperture 272, so that the aperture 272 is hermetically sealed with the sealing ring 278. Thus, the inside of the housing 270 is filled with carbon dioxide gas, so that, as with Example 41, the problem caused by the breaking of the lithium secondary cell can be eliminated.

What is claimed is:

1. A device for protecting a cell, comprising a container, a cell body arranged in said container,
opening and closing means, provided to said container, for conducting opening or closing between the exterior and interior of said container to open or close said cell body to an exterior atmosphere of said container,
a sensor for sensing an impact having a predetermined value where said impact is applied to said cell body, and
means for spraying a barrier fluid into the interior of said container when said impact sensed by said sensor is an impact above said predetermined value,
wherein said opening and closing means is operated such that when said barrier fluid is sprayed to interior of said container from said barrier spray means, the opening between said interior and exterior of said container is blocked to close said interior of said container from said exterior atmosphere.

2. The device for protecting a cell according to claim 1, wherein said container comprises a wall portion surrounding said cell body, and said opening and closing means comprises a communication portion provided in said wall portion for communicating the interior and the exterior of said container and a shutter means for opening and closing said communication portion.

3. The device for protecting a cell according to claim 2, wherein said shutter means comprises a shutter portion for opening and closing said communication portion and an actuator for driving said shutter portion and, when said impact sensed by said sensor is an impact beyond said predetermined value, said actuator is operated such that said shutter portion is driven to close said communication portion.

4. The device for protecting a cell according to claim 2, wherein said shutter means is a valve which is driven in a direction for closing said communication portion by being pressed by spraying pressure of said barrier fluid sprayed in the interior of said container by said spray means.

5. The device for protecting a cell according to claim 3, further comprising a control means for controlling the drive of said actuator by a signal input from said sensor.

6. The device for protecting a cell according to claim 5, wherein said device further comprises a temperature sensor arranged in said container for sensing the temperature of interior atmosphere of said container and said control means controls the drive of said actuator depending on the temperature of interior atmosphere of said container sensed by said temperature sensor in such a way that the level of the opening of said communication portion increases when the temperature of the interior atmosphere of said container is above a predetermined value and the level of the opening of said communication portion decreases when said temperature is below said predetermined value.

7. The device for protecting a cell according to claim 6, wherein said control means drives said actuator such that said communication portion is closed by said shutter portion after the atmosphere of the interior of said container is substituted by said barrier fluid which is sprayed from said spray means.

8. The device for protecting a cell according to any one of claims 1–7, wherein said barrier fluid is a gas.

9. The device for protecting a cell according to claim 8, wherein said gas is an inert gas which is one selected from carbon dioxide gas and nitrogen gas.

10. The device for protecting a cell according to claim 9, wherein said cell body comprises a cell container, a pair of electrodes arranged in said cell container and an electrolyte between said pair of electrodes, and one of said pair of electrodes comprises lithium.

11. The device for protecting a cell according to claim 10, wherein said container further comprises a gas bomb containing said gas.

12. A device for protecting a cell, comprising a container,
a cell body arranged in the interior of said container,
opening and closing means, provided to said container, for conducting opening or closing between the interior and exterior of said container to open or close said cell body to exterior atmosphere of said container,
a sensor for sensing an impact having a predetermined value where said impact is applied to said cell body,
means for spraying a barrier fluid into the interior of said container when said impact sensed by said sensor is an impact above said predetermined value, and
control means for controlling said opening and closing means such that the opening between the interior and the exterior of said container is blocked when said impact sensed by said sensor is above said predetermined value.

13. The device for protecting a cell according to claim 12, wherein said container comprises a wall portion surrounding said cell body and said opening and closing means comprises a communication portion provided to said wall portion of said container for communicating between the interior and the exterior of said container and a shutter means for opening and closing said communication portion.

14. The device for protecting a cell according to claim 13, wherein said shutter means comprises a shutter portion for opening and closing said communication portion and an electrical actuator for driving said shutter portion, and said control means outputs a drive signal to said actuator when the impact sensed by said sensor is above said predetermined value such that said shutter portion is driven to close said communication portion.

15. The device for protecting a cell according to claim 14, wherein said cell body comprises a cell container, a pair of electrodes arranged in the interior of said cell container, and an electrolyte between said pair of electrodes and one of said pair of electrodes comprises lithium.

16. The device according to any one of claims 12–15, wherein said barrier fluid is a gas.

* * * * *